United States Patent [19]

Hasegawa et al.

[11] Patent Number: 5,715,043
[45] Date of Patent: Feb. 3, 1998

[54] RANGE FINDER WITH COMPENSATION OF ROTATION ABOUT Z-AXIS

[75] Inventors: Jun Hasegawa; Eiji Watanabe, both of Miyagi, Japan

[73] Assignee: Fuji Photo Film Co., Ltd., Kanagawa, Japan

[21] Appl. No.: 580,345

[22] Filed: Dec. 28, 1995

[30] Foreign Application Priority Data

| Dec. 28, 1994 | [JP] | Japan | 6-327586 |
| Dec. 28, 1994 | [JP] | Japan | 6-327587 |
| Jan. 12, 1995 | [JP] | Japan | 7-003231 |
| Jan. 12, 1995 | [JP] | Japan | 7-003232 |

[51] Int. Cl.$^6$ ........................... G01C 3/00
[52] U.S. Cl. ........................... 356/3.14; 396/128
[58] Field of Search .................. 356/3.08, 3.14, 356/4.06; 396/128; 250/201.8

[56] References Cited

U.S. PATENT DOCUMENTS 5,357,310 10/1994 Kawamura et al. .................. 354/408
5,512,997 4/1996 Ogawa .................. 356/3.04

Primary Examiner—Mark Hellner
Attorney, Agent, or Firm—Sughrue, Mion, Zinn, Macpeak & Seas, PLLC

[57] ABSTRACT

A range finder having: first and second lenses for focussing an image of a subject via spatially different optical paths; first and second photosensor arrays disposed generally parallel and each having a plurality of pixels, an image being focussed on the first and second photosensor arrays by the first lens; a third photosensor array having a plurality of pixels, an image being focussed on the third photosensor array by the second lens, and a line extending through pixels of the first photosensor array and pixels of the third photosensor array having a slant from a line extending through the optical axes of the first and second lenses; a phase difference detecting unit for detecting a phase difference between images focussed by the first and second lenses and correcting an error to be caused by the slant in accordance with images focussed on the first to third photosensor arrays; and a distance calculating unit for calculating distance data to the subject in accordance with the phase difference detected by the phase difference detecting unit.

42 Claims, 35 Drawing Sheets

(PRIOR WORK)

(PRIOR WORK)

RANGE FINDER WITH COMPENSATION OF ROTATION ABOUT Z-AXIS

BACKGROUND OF THE INVENTION a) Field of the Invention

The present invention relates to a range finder, and more particularly to a range finer of a phase difference detection type.

b) Description of the Related Art

A range finder is used for measuring a distance from a camera to a subject. FIGS. 36A and 36B illustrate a conventional through-the-lens (TTL) range finder of a phase difference detection type. FIG. 36A illustrates an example of the structure of a conventional range finder, and FIG. 36B shows an example of the processor circuit of the range finder.

A light beam from a subject is converged by a taking lens 51, passes a film equivalent plane 52, and transmits through a condenser lens 53 and a separator lens 54. The separator lens 54 divides the incident light beam into two light fluxes which are projected on a base line sensor 55 and a reference line sensor 56. An image of the subject on an optical axis 58 of the taking lens 51 is divided by the separator lens 54 into two images which are focussed on the line sensors 55 and 56. The line sensor 55 has p photocells and is called a base line sensor because it is used as a basis for the phase difference detection. The line sensor has q photocells more than p photocells and is called a reference line sensor which is used for reading signals from p photocells among q photocells while changing the phases thereof, and for comparing the signals with signals from the base line sensor 55 to detect the phase difference. Signals detected from the base line sensor 55 and reference line sensor 56 are supplied to a processor circuit 57. While changing the read phase of the signals detected from the reference line sensor 56, the processor circuit 57 performs a correlation calculation to be described later, detects an extreme value of the correlation factor, and detects a distance to the subject.

Another range finding method has been proposed in which instead of the taking lens, external light is picked up by a pair of lenses having the same optical characteristics and disposed in front of the base and reference line sensors to measure a distance to the subject.

FIG. 36B shows an example of the processor circuit 57. Signals detected from the base line sensor 55 and reference line sensor 56 are supplied to an A/D converter 59 and converted from the analog signals into digital signals. These digital signals are temporarily stored in a RAM 61 under the control of a CPU 60. The digital signals stored in RAM 61 are thereafter read, and CPU 60 performs a correlation calculation to detect an extreme value of the correlation factor, and outputs a signal representative of a distance to the subject.

In the range finder or focus detector shown in FIGS. 36A and 36B, electric charges accumulated in the photocells are directly converted into a voltage signal which is converted into a digital signal, stored in RAM 61, and read therefrom to perform the correlation calculation.

The present applicant has proposed a focus detector in which electric charges accumulated in photocells upon application of light are read non-destructively and the correlation calculation is performed by using analog signals. FIG. 37A shows an example of the structure of a photocell of such a range finder. In FIG. 37A, the photocell is formed by a p-n junction 69 between a p-type well 66 formed on the surface of an $n^-$-type silicon substrate 64 and an $n^+$-type region 68 formed in the p-type well 66. As light is incident on the nearby area of the p-n junction 69, pairs of electrons and holes are generated, and electrons and holes are separated and accumulated in accordance with a potential gradient near the p-n junction 69.

The p-type well 66 extends to the left side of the p-n junction 69 as viewed in FIG. 37A. Insulated silicon gate electrodes 71 to 74 and a floating gate electrode 76 are formed over the p-type well 66. Adjacent to the photodiode, a barrier region 81 with the gate electrode 71 is formed. Adjacent to the barrier region 81, a storage region 82 with the gate electrode 72 is formed. Electric charges corresponding to the amount of light incident upon the photodiode are transported near from the p-n junction 69 over the barrier region 81 into the storage region 82. Adjacent to the storage region 82, a potential barrier 83 under the transfer gate 73 is formed and a shift register region 84 with the gate electrode 74 is formed. Formed adjacent to the shift register region 84 is a read region 86 under the floating gate 76 having a bias applying aluminum electrode 75 formed over the floating gate 74.

After pairs of electrons and holes are generated upon application of light to the photodiode, the carriers pass over the barrier region 81 and are accumulated in the storage region 82 under the gate electrode. Then, the carriers pass over the potential barrier region 83 under the transfer gate electrode 73 and are transferred to the shift register region 84 under the gate electrode 74. The charges accumulated in the shift register region 84 are transferred to the read region 86 under the floating gate 79 in accordance with a voltage applied to the gate electrode 75. Charges corresponding to the transferred charges are induced in the floating gate 76. The incident light amount is read non-destructively by the charges induced in the floating gate 76. After the light amount is read, the carriers are again transferred back to the shift register region 84 and shifted. In this manner, charges in the shift register region 84 are sequentially and non-destructively read.

If the photosensor shown in FIG. 37A is used together with a switched capacitor integrator circuit, an in-focus state can be obtained by the correlation calculation equation (1) to be described later, by using analog detection signals.

FIG. 37B shows an example of a switched capacitor integrator circuit.

In FIG. 37B, a charge signal B(K) from the base photosensor and a charge signal R(k) from the reference photosensor are applied to input terminals Pb and Pr of switched capacitor integrator circuits, respectively, and supplied via amplifiers to inverting and non-inverting input terminals of a differential amplifier 88. The differential amplifier 88 generates a sign signal $S_{gn}$ in accordance with a comparison between the input signals B(k) and R(k), and supplies the sign signal $S_{gn}$ to a channel select circuit 89. The channel select circuit 89 generates pairs of select signals $\Phi 1$, $\Phi 2$, KA, and KB whose relative phases are changed in accordance with the sign signal $S_{gn}$.

The input terminal Pr is connected to a capacitor CS1 via the amplifier and a switch 90 which is controlled by the select signal KB. Both electrodes of the capacitor CS1 are grounded via switches 93 and 94 which are controlled by the select signals KA and $\Phi 1$, respectively. The electrode of the capacitor CS1 on the switch 94 side is connected to the inverting input terminal of an operational amplifier 92 via a switch 91 which is controlled by the select signal $\Phi 2$.

Similarly, the input terminal Pb is connected to a capacitor CS2 via the amplifier and a switch 95 which is controlled by the select signal KA. Both electrodes of the capacitor CS2 are grounded via switches 97 and 98 which are controlled by the select signals KB and Φ2, respectively. The electrode of the capacitor CS2 on the switch 98 side is connected to the inverting input terminal of the operational amplifier 92 via a switch 96 which is controlled by the select signal Φ2.

The non-inverting input terminal of the operational amplifier 92 is grounded. An output terminal 99 of the operational amplifier 92 is fed back to the inverting input terminal via a parallel circuit of a capacitor $C_f$ and a switch 87 which is controlled by a select signal $\Phi_{SRT}$. Neither the select signals KA and KB nor the select signals Φ1 and Φ2 take the High level at the same time.

For example, when the select signals KB and Φ1 take the High level, the switches 90 and 94, and 97 and 98 are closed. The signal R(k) is charged in the capacitor CS1. Both the electrodes of the other capacitor CS2 are grounded and the charges are cleared.

When the select signals KA and Φ2 take the High level next, the switches 91 and 93, and 95 and 96 are closed. The capacitor CS1 changes its connection from the grounded right electrode to the grounded left electrode, and the right electrode is connected to the inverting input terminal of the operational amplifier 92. It means an effective inversion of the potential of R(k). The capacitor CS2 is connected via the switches 95 and 96 across the input terminal Pb and the inverting input terminal of the operational amplifier 92. The signal B(k) is therefore charged in the capacitor CS2. Accordingly, a difference voltage between the signals R(k) and B(k) is applied to the inverting input terminal of the operational amplifier 92.

If the amplitudes of the signals R(k) and B(k) become opposite, the channel select circuit 89 inverts the relative phases of the select signals KA, KB, Φ1, and Φ2 in accordance with the sign signal $S_{gn}$. In this case, the signal B(K) is first charged in the capacitor CS2, and the sign inverted signal is applied to the inverting input terminal of the operational amplifier 92. The signal R(k) is applied via the capacitor CS1 to the inverting input terminal of the operational amplifier 92.

Therefore, a signal corresponding to the absolute value of the difference between the signals B(k) and R(k) is always applied to the inverting input terminal of the operational amplifier 92. In the above manner, an absolute value of a difference between the corresponding base photosensor signal and reference photosensor signal is detected, and the sum of absolute values is calculated to obtain a value of a correlation function H, to detect a phase difference, and to detect a focus.

A detection of a phase difference through correlation calculation will be detailed with reference to FIGS. 38A to 38C.

As shown in FIG. 38A, an image of a subject is focussed by a base line sensor lens onto a base line sensor 55. The image of the subject is also focussed by a reference line sensor lens onto a reference line sensor 56 spaced by a base length from the base line sensor 55.

If a subject is at a predetermined position, the same image is focussed on the photocells of the base and reference line sensors 55 and 56. If the subject is at a position different from the predetermined position, the images on the base and reference line sensors 55 and 56 displace in the horizontal direction. If the subject moves from the predetermined position toward the camera, the distance between images becomes large, whereas if the subject moves away from the camera, the distance between images becomes short. In order to detect a change in the distance between images, the number of photocells of the reference line sensor 56 is set larger than that of the base line sensor 55.

A phase difference detection method using correlation calculation is applied to detecting a change in the distance between images.

In the phase detection by correlation calculation, a correlation factor between a pair of images focussed on the line sensors 55 and 56 is obtained by the following equation (1), and an in-focus state can be identified by obtaining a relative motion value (phase difference) between the focussed images at the minimum correlation factor.

$$H(m)=\Sigma(k=1 \text{ to } n) |B(k)-R(k+m)| \qquad (1)$$

Σ(k=1 to n) means a sum of a function from k=1 to k=n, and k identifies a photocell of the base line sensor 55. m represents the relative motion value and is an integer, for example, from −6 to 6.

B(k) represents an electrical signal outputted in time series from each pixel of the base line sensor 55, and R(k+m) represents an electric signal outputted in time series from each pixel of the reference line sensor 56. Each time m is changed from −6 to 6, the equation (1) is calculated to obtain correlation factors H(−6), H(−5) . . . H(6) such as shown in FIG. 38B. For example, if the correlation factor H(0) takes a minimum value, this state is set in correspondence with a predetermined position of a subject. If the minimum value is at a different correlation factor, a displacement of the subject from the predetermined position is obtained from the shift amount, i.e., a phase difference from m=0. In this manner, a distance to the subject can be detected.

Photosensor elements of the base and reference line sensors 55 and 56 are disposed, for example, at a pitch of 20 μm. The correlation factor is calculated from the focussed images at a distance pitch of each 20 μm. If a distance to the subject is at an intermediate position between this 20 μm pitch, the correlation factors become different between on the right side of the extreme value of the correlation factor and on the left side, as indicated by broken lines in FIG. 38B. In such a case, a resolution higher than the distance pitch can be obtained through interpolation calculation.

FIG. 38C is a schematic diagram illustrating a three-point interpolation.

The position at the minimum correlation factor is indicated by x2, and sample positions on both sides of the minimum correlation factor are indicated by x1 and x3. The correlation factors calculated are indicated by black circles. As shown, if the correlation factor y3 at x3 is smaller than the correlation factor y1 at x1, it can be considered that the actual minimum value is at the position moving from x2 toward x3. If the minimum value is correctly at x2, the correlation line bends at x2 as indicated by a broken line f1, and assuming a symmetry on the right and left sides, the correlation factor y3a at x3 is equal to the correlation factor y1 at x1. If the actual position of the minimum correlation factor is at the midpoint between x2 and x3, the correlation line bends at the midpoint between x2 and x3 as indicated by a broken line f2 and the correlation factor y2 at x3 is equal to the correlation factor y3b. As shown in FIG. 38C, a difference (y3a−y3b) between these correlation factors is equal to a difference (y1−y2) between the correlation factors at x1 and x2. Namely, the correlation factor changes by one unit at each half of the pitch. Therefore, the position of the actual minimum correlation factor can be obtained by checking the relationship between the calculated correlation factors. The displacement amount d is given by:

$$d = (y1-y3)/2(y1-y2) \quad (2)$$

The lens 54 and the line sensors 55 and 56 shown in FIG. 36A are manufactured independently, and thereafter they are assembled together. Although it is desirable that the lens 54 and the line sensors 55 and 56 have ideal relative positions even if they have different sizes, there are some errors in relative positions in the assembly. These errors result in an error of range finding and lower the precision of range finding.

SUMMARY OF THE INVENTION

It is an object of the present invention to provide a range finder capable of detecting a distance to a subject with high precision, even if the relative positions of the lens and sensors are displaced even a little.

According to one aspect of the present invention, there is provided a range finder comprising: first and second lenses for focussing an image of a subject via spatially different optical paths; first and second photosensor arrays disposed generally parallel and each having a plurality of pixels, an image being focussed on the first and second photosensor arrays by the first lens; a third photosensor array having a plurality of pixels, an image being focussed on the third photosensor array by the second lens, and a line extending through pixels of the first photosensor array and pixels of the third photosensor array having a slant from a line extending through the optical axes of the first and second lenses; phase difference detecting means for detecting a phase difference between images focussed by the first and second lenses and correcting an error to be caused by the slant in accordance with images focussed on the first to third photosensor arrays; and distance calculating means for calculating distance data to the subject in accordance with the phase difference detected by the phase difference detecting means.

The second photosensor array is provided in addition to the first and third photosensor arrays. It is therefore possible to correct an error caused by a relative displacement of the lens and sensors and obtain a high precision subject distance.

According to another aspect of the present invention, there is provided a range finder comprising: first and second lenses for focussing an image of a subject via spatially different optical paths; first and second photosensor arrays each having a plurality of pixels, an image being focussed on the first and second photosensor arrays by the first and second lenses; an auxiliary photosensor array having a plurality of pixels, an image being focussed on the auxiliary photosensor array by the first lens, and the auxiliary photosensor array being disposed generally parallel to, and vertically spaced from, the first photosensor array; phase difference detecting means for detecting a first phase difference between images focussed on the first and second photosensor arrays and a second phase difference between images focussed on the first and auxiliary photosensor arrays; and distance calculating means for calculating distance data to the subject in accordance with the first and second phase differences detected by the phase difference detecting means.

Not only a phase difference between images focussed on the first and second sensor arrays but also a phase difference between images focussed on the first and auxiliary photosensors are detected. It is therefore possible to correct an error of the subject distance even if there is a relative displacement of the lens and sensors.

According to a further aspect of the present invention, there is provided a range finder comprising: first and second lenses for focussing an image of a subject via spatially different optical paths; first and second photosensor arrays each having a plurality of pixels for photoelectric conversion, an image being focussed by the first lens; third and fourth photosensor arrays each having a plurality of pixels for photoelectric conversion, an image being focussed by the second lens; phase difference detecting means for detecting a first phase difference between images focussed on the first and fourth photosensor arrays and a second phase difference between images focussed on the second and third photosensor arrays; and distance calculating means for calculating distance data to the subject in accordance with the first and second phase differences detected by the phase difference detecting means, wherein a line extending through the first and fourth photosensor arrays intersects with a line extending through the second and third photosensor arrays.

Even if there is a relative displacement of the lens and sensors, a correct subject distance can be obtained by detecting a phase difference from the four sensors disposed in a crossed manner.

According to another aspect of the present invention, there is provided a range finder comprising: first and second lenses for focussing an image of a subject via spatially different optical paths; first and second photosensor arrays each having a plurality of pixels for photoelectric conversion, an image being focussed by the first lens; third and fourth photosensor arrays each having a plurality of pixels for photoelectric conversion, an image being focussed by the second lens; phase difference detecting means for detecting a first phase difference between images focussed on the second and third photosensor arrays and a second phase difference between images focussed on the first and fourth photosensor arrays; phase difference correcting means for calculating a phase difference with an error corrected, by interpolating the first and second phase differences detected by the phase difference detecting means; and distance calculating means for calculating distance data to the subject in accordance with the phase difference calculated by the phase difference correcting means, wherein a line extending through the first and fourth photosensor arrays intersects with a line extending through the second and third photosensor arrays.

Even if there is a relative displacement of the lens and sensors, a high precision subject distance can be obtained by detecting the first and second phase differences, because the line extending through the first and fourth photosensors intersects the line extending through the second and third photosensors.

According to still another aspect of the present invention, there is provided a range finder comprising: first and second lenses for focussing an image of a subject via spatially different optical paths; first and second photosensor arrays each having a plurality of pixels for photoelectric conversion, an image being focussed by the first lens; third and fourth photosensor arrays each having a plurality of pixels for photoelectric conversion, an image being focussed by the second lens; virtual photosensor array image calculating means for calculating an image to be focussed on a first virtual photosensor array in accordance with images focussed on the first and second photosensor arrays, the first virtual photosensor array being disposed along a line extending through the optical axes of the first and second lenses on the side of the first lens, and for calculating an image to be focussed on a second virtual photosensor array in accordance with images focussed on the third and fourth photosensor arrays, the second virtual photosensor array being disposed along a line extending through the optical axes of the first and second lenses on the side of the second lens; means for detecting a phase difference between images focussed on the first and second virtual photosensor arrays; and means for calculating distance data to the subject in accordance with the phase difference detected by the phase difference detecting means, wherein a line extending through the first and fourth photosensor arrays intersects with a line extending through the second and third photosensor arrays.

Even if there is a relative displacement of the lens and sensors, a high precision subject distance can be obtained by providing the four photosensors and calculating the images to be focussed on the first and second virtual sensor arrays.

Furthermore, since the relative positions of the lens and sensors are not necessarily required to be highly precise, the range finder can be manufactured easily and the cost is reduced.

DETAILED DESCRIPTION OF THE PREFERRED EMBODIMENTS

Figure 2:
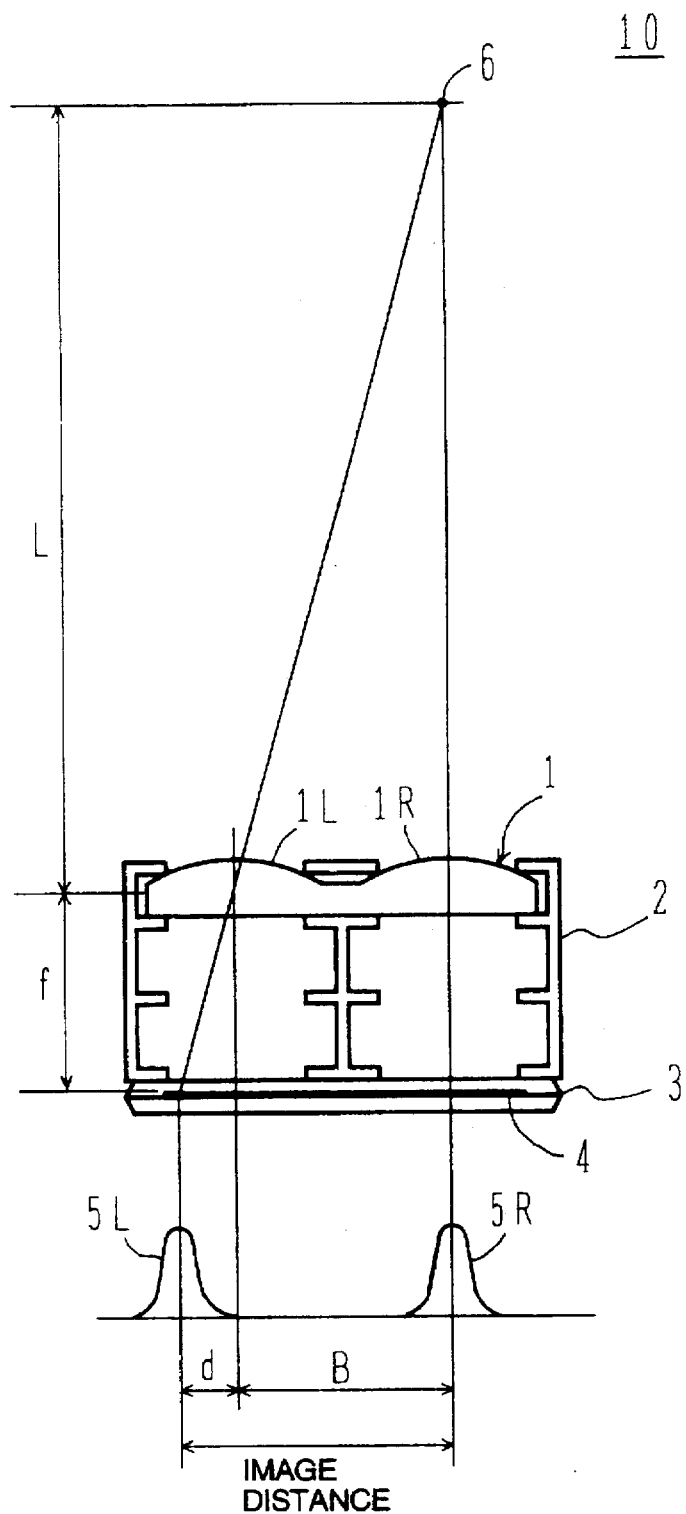
FIG. 2 is a schematic diagram showing a range finder module of the range finder of the first embodiment.

FIG. 2 is a schematic diagram showing a range finder module of a range finder according to the first embodiment of the invention.

The range finder has a range finder module 10 which is formed by a lens 1, a barrel 2, a package 8 and a sensor chip 4. The lens 1 is an integrated lens of right and left lenses 1R and 1L having parallel optical axes. The barrel 2 supports the lens 1 at its upper portion and the package 8 at its lower portion. The package 8 has the sensor chip 4 embedded therein. Light passed through the lens 1 is incident upon the sensor chip 4.

The barrel 2 shields external light, and guides light from a subject 6 to the sensor chip 4. The sensor chip 4 has light sensors for photoelectric conversion. Light from the subject 6 passes through the lenses 1L and 1R and focussed onto the sensor chip 4 to form images 5L and 5R.

Next, the principle of range finding by a trigonometrical survey method without using any radiation source for autofocusing will be described. The two images 5L and 5R are formed at the positions spaced by a distance of a base length B added with a length of the phase difference d. The distance between the two images 5L and 5R is B+d. The base length B is a distance between two images of a subject 6 at the infinite position formed on the sensor chip 4 via the two lenses 1L and 1R.

A lens/sensor distance f is a distance from the lens 1 to the surface of the sensor chip 4 on which images of the subject 6 are focussed. A distance L to the subject is a distance between the subject 6 and the lens 1, this distance L being measured as a subject distance. Since a right-angled triangle with a bottom side B and a height L is analog to a right-angled triangle with a bottom side d and a height f, the subject distance L is represented by a quotient obtained by dividing a product Bf of the base length B and lens/sensor distance f by the phase difference d, as in the following equation.

$$L = (B \times f)/d \quad (3)$$

Figure 1:
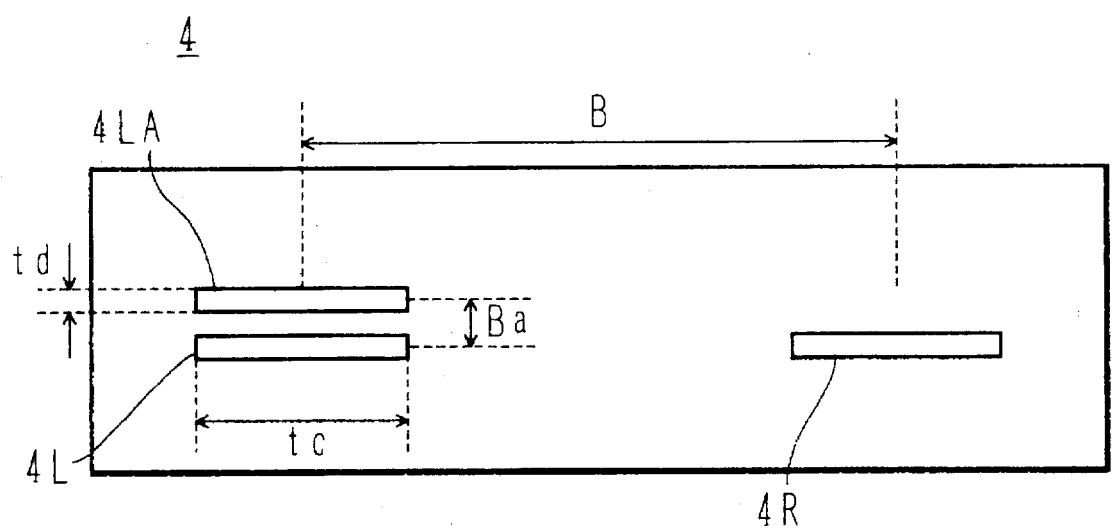
FIG. 1 is a schematic diagram showing the structure of a sensor chip according to a first embodiment of the invention.

FIG. 1 shows the structure of the sensor chip 4 shown in FIG. 2. The sensor chip 4 has three line photosensors 4R, 4L, and 4LA.

Each line sensor 4R, 4L, 4LA has, for example, 144 pixels at a pitch of 24 µm. The width td of each pixel is 100 µm. Therefore, the length tc of each sensor 4R, 4L, 4LA is 24 µm×143.

The right and left sensor 4R and 4L are positioned where light from the subject is applied via the right and left lenses 1R and 1L shown in FIG. 2. A line extending through the sensors 4R and 4L and a line extending through the lenses 1R and 1L are coarsely adjusted to be generally parallel. The phrase "generally parallel" means such a parallelism degree as obtained by simple position alignment, and for example, about +/−two degrees or smaller, or typically, +/−one degree or smaller.

The base length B is a distance between the two lenses 1R and 1L. The distance between the two sensors 4R and 4L is also B. The base length B is, for example, 7 mm.

The subject distance L can be calculated from the above equation (3). The base length B and lens/sensor distance f are determined from the structure of the range finder module shown in FIG. 2. The phase difference d is a phase difference between an image focussed on the sensor 4R and an image focussed on the sensor 4L.

Therefore, the subject distance L can be obtained from a phase difference d through correlation calculation or other calculations, by using the data detected from the sensors 4R and 4L. If the lenses 1R and 1L and the sensors 4R and 4L have ideal relative positions, no error is generated in the subject distance. However, if the positions displace even a little, an error is generated.

The sensor 4LA is positioned generally parallel to the sensor 4L, being spaced apart by a distance Ba from the sensor 4L. The distance Ba is, for example, 200 µm. This auxiliary sensor 4LA becomes necessary for correcting the subject distance L by taking into consideration an error of the relative positions between the lenses 1R and 1L and sensors 4R and 4L.

The subject distance L can be corrected by detecting data from the auxiliary sensor 4LA and sensor 4L and calculating the phase difference between the images on the sensors 4LA and 4L. The details of correcting the subject distance L will be given later.

Figure 3:
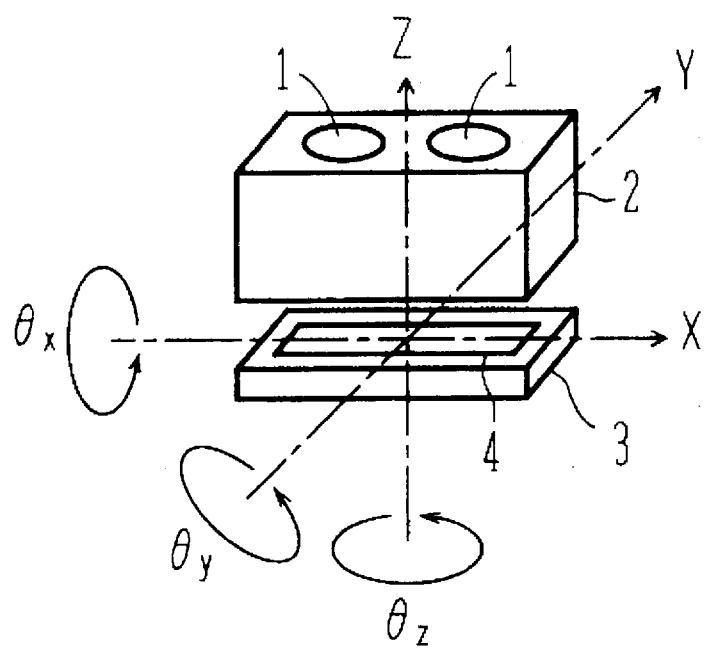
FIG. 3 is a schematic diagram showing adjustment axes for the position alignment of the range finder module shown in FIG. 2.

FIG. 3 is a schematic diagram showing adjustment axes for position alignment of the range finder module shown in FIG. 2.

In assembling the barrel 2 and the package 3 containing the sensor chip 4, position alignment is required to some degree. However, this position alignment is not necessary to be performed with high precision, but coarse adjustment is allowable.

An error of range finding caused by a position alignment error will be described. The position alignment errors of the range finder are possibly generated in three-dimensional (X, Y, Z) axes directions and in the rotation direction about each axis. The Z-axis is in the optical axis direction of the lens 1 and is vertical to the surface of the photosensors. The X- and Y-axes are two-dimensional axes defining the surface of the sensor chip 4. The pixel train of the line sensor is disposed along the X-direction. Rotary angles about the X-, Y-, and Z-axes are represented by θx, θy, and θz, respectively.

Some errors of the rotary angles θx and θy can be permitted because these errors do not greatly affect the range finding error. However, the rotary angle θz greatly affects the range finding error.

The reason for this will be clarified. With the range finder of this embodiment, the subject distance L is corrected by taking into consideration mainly the error of the rotary angle θz after the adjustment of the position alignment.

The position alignment errors in the X-, Y-, and Z-axes will be first studied. Since the lens is fixed to the barrel, a process of assembling the barrel and sensor chip will be considered first. The distance in the Z-axis between the lens and sensor is determined by the height of the barrel, the Z-axis position of the lens in the barrel, and the Z-axis position at the coupling point between the barrel and sensor chip. All these values can be set with high precision so that an error in the Z-axis direction is small and negligible. Even if there is some displacement in the Z-axis direction, this displacement has the same effects on both the right and left sensors. Therefore, although the image patterns focussed on the sensor surfaces change more or less, the right and left images change similarly and this change hardly affects the calculation of the distance between two images.

Figure 4:
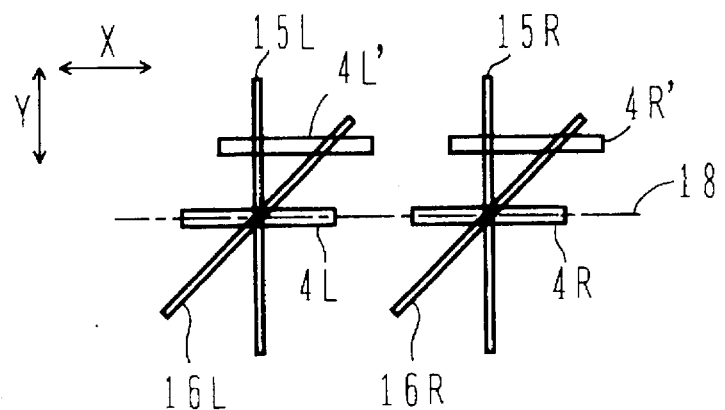
FIG. 4 is a schematic diagram illustrating a sensor chip displaced in the X- and Y-axes.

FIG. 4 is a schematic diagram showing a sensor chip having a displacement in the X- and Y-axes directions.

With the range finder of this embodiment, even if there is a displacement in the X- and Y-axes directions, the correct subject distance L can be obtained by detecting the phase difference between the images focussed on the sensors 4L and 4R. In FIG. 4, the sensor 4LA (FIG. 1) is not depicted because only the displacement in the X- and Y-axes directions is checked whether it generates any error of the phase difference between the images focussed on the sensors 4L and 4R.

The sensors 4L and 4R are set at the positions without displacement in both the X- and Y-axes, whereas sensors 4L' and 4R' are set at the positions with some displacement in the X- and Y-axes directions.

Vertical patterns 15L and 15R are subject patterns focussed on the sensors 4L and 4R, and vertical to a line 18 extending through the lens pair 1L and 1R (FIG. 2). Oblique patterns 16L and 16R are subject patterns focussed on the sensors 4L and 4R, and oblique to the line 18 extending through the lens pair 1L and 1R (FIG. 2).

As will be later described, if there is any rotation displacement about the Z-axis, although a range finding error of the vertical patterns is hard to be generated, the range finding error of the oblique patterns is easy to be generated. In the following, the range finding error is studied for both the vertical and oblique patterns 15L and 15R, and 16L and 16R.

Any error of the subject distance L means an error of the phase difference d because the base length B and sensor/lens distance f in the above equation (3) are finite values.

An error of the phase distance d corresponds to an error of the distance between, for example, the left pattern 15L and right pattern 15R. Therefore, it is sufficient if it is checked whether there is any error between an image distance on the sensors 4L and 4R at the correct positions and an image distance on the sensors 4L' and 4R' at the displaced positions.

No error is generated for the vertical patterns 15L and 15R because the image distance on the sensors 4L and 4R is the same as that on the sensors 4L' and 4R'. No error is generated also for the oblique patterns 16L and 16R because the image distance on the sensors 4L and 4R is the same as that on the sensors 4L' and 4R'.

As above, if the sensors 4L and 4R have a displacement in the X- and Y-axes directions, the sensors move in parallel to the surface of the X-Y plane and the image distance which is a relative distance between two images does not change. In other words, even if there is some displacement in the X- and Y-axes directions, the subject distance L is not affected.

As stated above, even if there is some position alignment error between the lens and sensor chips in the X- and Y-axes directions, no range finding error is generated. The position alignment error in the Z-axis direction is essentially small. Accordingly, a range finding error to be caused by the position alignment error in the X-, Y-, and Z-axes directions can be considered to be small. The remaining factors causing the range finding error are errors of θx, θy, and θz.

Figure 5:
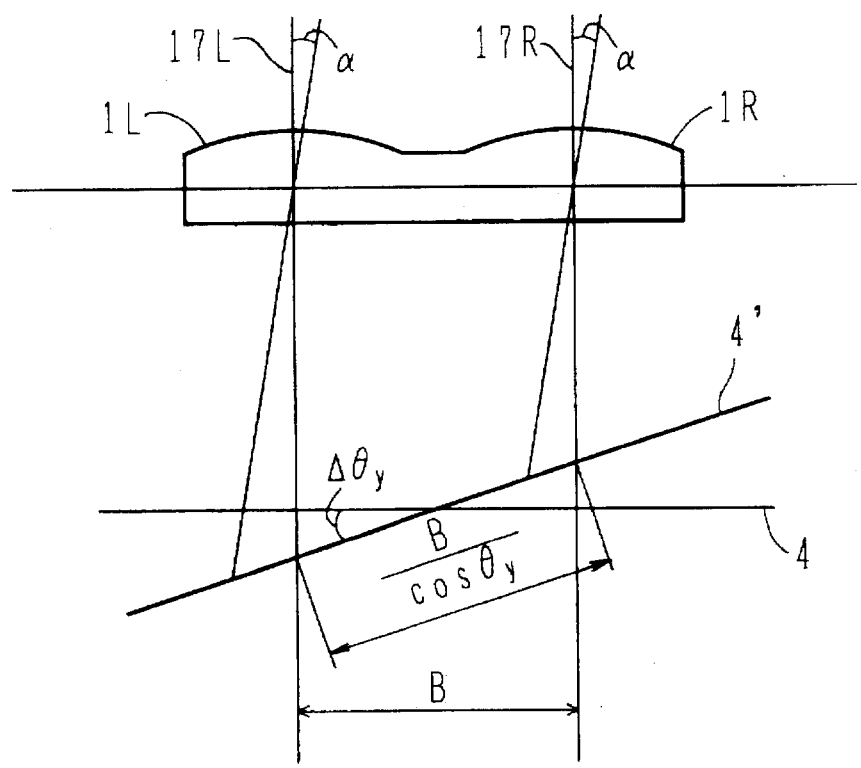
FIG. 5 is a schematic diagram illustrating a displacement of a rotary angle θy by Δθy about the Y-axis.

FIG. 5 is a schematic diagram illustrating a displacement of the rotary angle θy by Δθy about the Y-axis.

A sensor chip 4 has a displacement of the rotary angle θy, whereas a sensor chip 4' has a displacement of the rotary angle θy.

The optical axes of the lenses 1L and 1R are indicated at 17L and 17R, respectively. A distance between images focussed on the sensor chip 4 along the optical axes 17L and 17R is equal to the base length B. A distance between images focussed on the sensor chip 4' along the optical axes 17L and 17R is equal to B/cosΔθy.

Therefore, an error δ of the image distance caused by a displacement of the sensor chip 4 by Δθy is given by:

$$\delta = B - B/\cos\Delta\theta y$$

The position alignment of the lens and sensor chip in the Z-axis can be set with high precision. Therefore, the value of Δθy is not so large. If the value of Δθy is small, the error δ is very small as seen from the above equation and the subject distance L is hardly affected.

The above description is directed to a displacement of Δθy for the images focussed in a narrow area near the optical axes by the range finder with a narrow angle of view.

With the range finder having a broad angle of view, images are focussed by light incident at an angle a relative to the optical axes 17L and 17R. In this case, the error δ is not negligible. However, the value Δθy maintains fixed after the assembly and so the error δ is constant irrespective of the vertical or oblique pattern of the subject. Therefore, the error δ of the fixed value can be obtained by measuring the displacement angle θey in advance. At each range finding, if the phase difference is corrected by this error δ as a default value of fixed value, the error of the subject distance L can be corrected.

Next, a displacement of the rotary angle θx by Δθx about the X-axis shown in FIG. 3 will be described. One-dimensional pixel train is disposed along the X-direction on the sensors 4L and 4R of the sensor chip 4. If the error by in the Y-axis direction is 0, the distance between images on the sensors 4L and 4R does not change even if there is a displacement of the rotary angle θx. Therefore, the subject distance L is not affected by the displacement of the rotary angle θx.

In this embodiment, however, since the auxiliary sensor 4LA is used together with the sensors 4L and 4R, this auxiliary sensor 4LA is then discussed for the case where Δy is not 0. However, since the position alignment error in the Z-axis direction is small, Δθx is also small. As shown in FIG. 1, the distance Ba between the sensors 4LA and 4L in the Y-axis direction is as small as about 200 μm. Therefore, the error of the image distance can be neglected, and the displacement of the rotary angle θx scarcely affects the subject distance L also in the case of the sensor 4LA. Furthermore, if the range finding error is measured in advance, this measured phase difference is used at each range finding for correcting an error caused by a displacement of the rotary angle θx.

Figure 6:
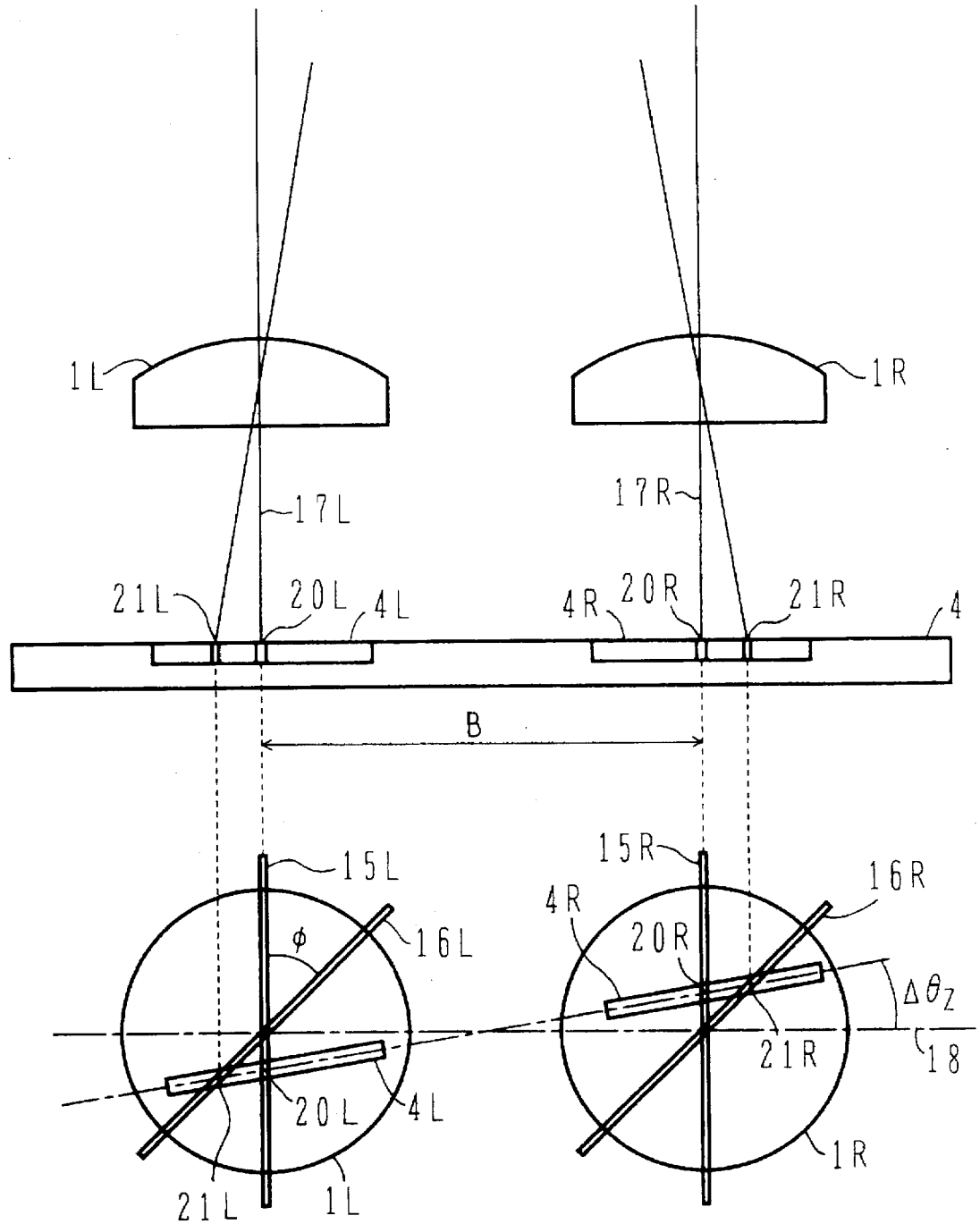
FIG. 6 is a schematic diagram illustrating a displacement of Δθz rotary angle about the Z-axis.

FIG. 6 is a schematic diagram illustrating a displacement of the rotary angle θz by Δθz about the Z-axis.

Sensors 4L and 4R have a displacement of the rotary angle θz by Δθz about the Z-axis. It is discussed in the following whether any error of the phase difference between the images focussed on the sensors 4L and 4R is generated if there is a displacement of the rotary angle θz. Similar to FIGS. 4 and 5, the sensor 4LA (FIG. 1) is not depicted in FIG. 6.

Vertical patterns 15L and 15R are subject patterns focussed on the sensors 4L and 4R, and vertical to a line 18 extending through the lens pair 1L and 1R. Oblique patterns 16L and 16R are subject patterns focussed on the sensors 4L and 4R, and oblique to the line 18 extending through the lens pair 1L and 1R.

The optical axes of the lenses 1L and 1R are indicated at 17L and 17R, respectively. The vertical patterns 15L and 15R are focussed on the sensors 4L and 4R along the optical axes 17L and 17R at positions 20L and 20R, respectively. A distance between the points 20L and 20R is B/cosΔθz, and has an error of (B−BcosΔθz) relative to the base length B. This error value is constant so that it can be easily corrected if it is measured in advance.

The oblique patterns 16L and 16R are focussed on the sensors 4L and 4R along the optical axes 17L and 17R at positions 21L and 21R, respectively. A distance between the points 21L and 21R is longer than the distance between the points 20L and 20R.

The oblique patterns 16L and 16R are patterns rotated by an angle φ from the vertical patterns 15L and 15R. As seen from FIG. 6, the larger the angle φ the longer the distance between 21L and 21R and the larger the error. The error caused by the longer distance between 21L and 21R makes the subject as if it was at a nearer position (as if the subject distance L became short).

if the oblique patterns are rotated in the reverse direction by a slant angle φ the distance between 21L and 21R becomes short and an error is generated which makes the subject distance L longer. This error is called a cross-eye error from the above-described characteristics.

The cross-eye error changes its value with the oblique pattern angle φ. The oblique pattern angle φ changes depending upon a subject to be measured, and therefore cannot be anticipated.

The error $\Delta\theta z$ is a position alignment error of the rotary angle $\theta z$. It has generally a small value of 1° or less. Therefore, FIG. 6 can be approximated to FIG. 7.

Figure 7:
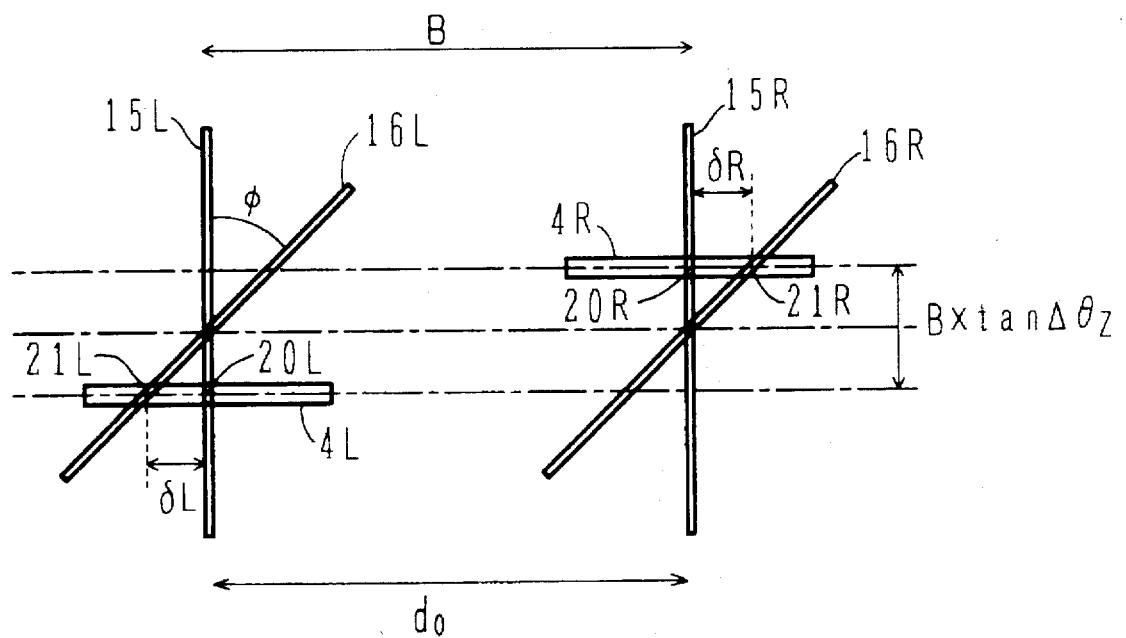
FIG. 7 is a schematic diagram showing a range finder module with a small adjustment error Δθz.

FIG. 7 is a schematic diagram showing the range finder module of FIG. 6 for a smaller adjustment error $\Delta\theta z$.

If the adjustment error $\Delta\theta z$ is small, the length tc of the sensors 4L and 4R shown in FIG. 1 has a small value (24 µm×143). Therefore, the sensors 4L and 4R can be regarded as if they were disposed in parallel.

The distance between the sensors 4L and 4R in the Y-axis direction is given by:

$$B \times \tan\Delta\theta z$$

The larger the base length B or adjustment error the broader the distance and the larger the range finding error.

The vertical pattern 15L is focussed on the sensor 4L at 20L, and the oblique pattern 16L is focussed on the sensor 4L at 21L. An error $\delta R$ on the sensor 4L is a difference between 20L and 21L.

The vertical pattern 15R is focussed on the sensor 4R at 20R, and the oblique pattern 16R is focussed on the sensor 4R at 21R. An error $\delta R$ on the sensor 4R is a difference between 20R and 21R.

Therefore, the error $\delta$ of the distance between the oblique patterns focussed on the sensors 4L and 4R is a sum of the errors $\delta L$ and $\delta R$ as given in the following equation (4).

$$\begin{aligned}\delta &= \delta L + \delta R \\ &= B \times \tan\Delta\theta z \times \tan\phi\end{aligned} \quad (4)$$

where the angle $\phi$ is a slant angle of the oblique patterns 16L and 16R.

The error $\delta$ is the cross-eye error caused by a displacement of the rotary angle $\Delta\theta z$, and changes with the angle $\phi$ of the subject pattern. If the error $\delta$ changing with the subject pattern can be detected, the subject distance L can be corrected.

Figure 8:
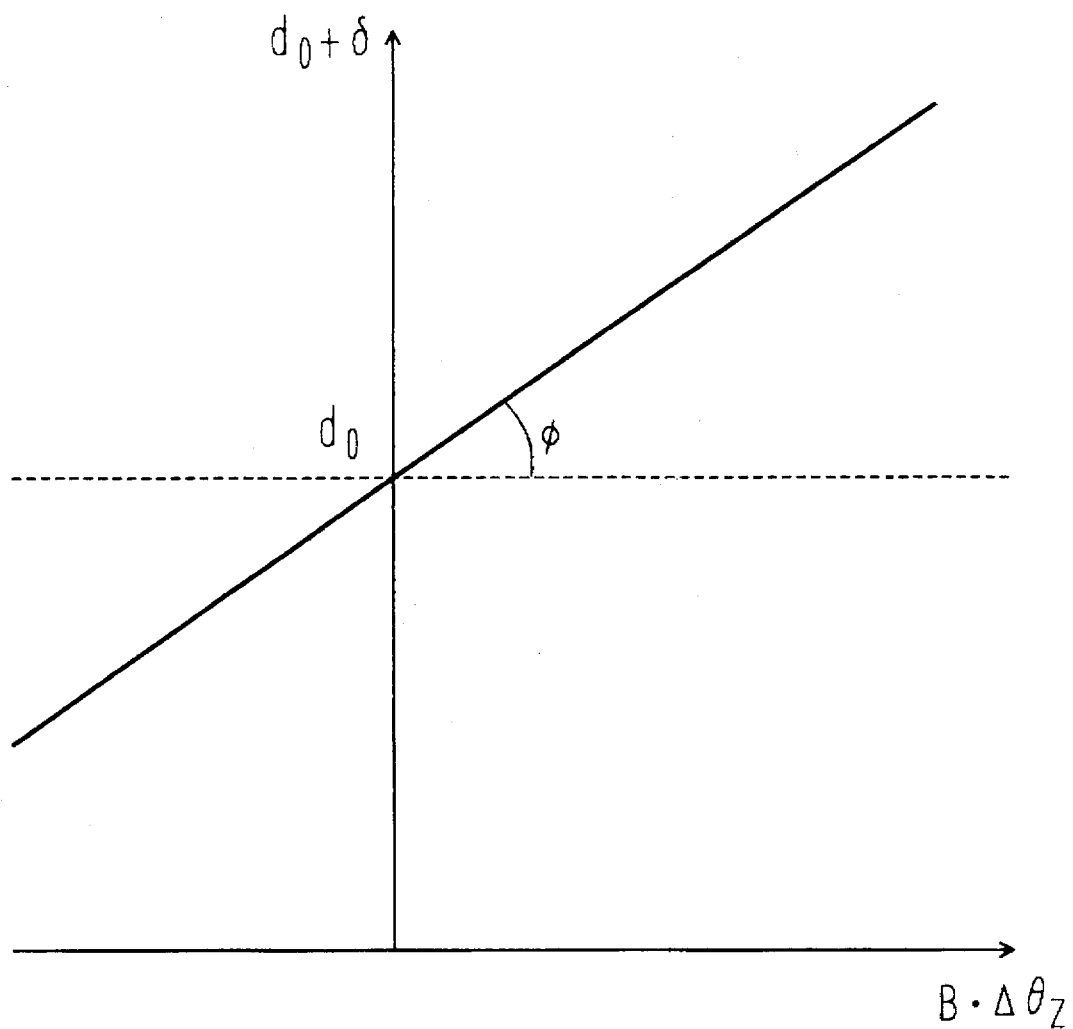
FIG. 8 is a graph showing the relationship between an adjustment error Δθz and a phase difference (image distance) error δ.

FIG. 8 is a graph showing the relationship between the adjustment error $\Delta\theta z$ and a phase difference (image distance) error $\delta$.

The adjustment error $\Delta\theta z$ corresponds to a displacement of the rotary angle $\theta z$ caused by the position alignment error, and has a small value of 1° or less. Therefore, the equation (4) can be approximated to the following equation (4').

$$\theta = B \times \Delta\theta z \times \tan\phi \quad (4')$$

The abscissa of the graph represents $B \times \Delta\theta z$, and the ordinate represents the image distance. Assuming that the image distance is d0 at the error $\delta=0$, the error $\delta$ at a certain angle $\phi$ is proportional to $B \times \Delta\theta z$.

The error $\delta$ is 0 at the angle $\phi=0°$ (vertical pattern). In this case, the image distance takes a true image distance (phase difference) of d0, and the error $\delta$ is not generated even if the adjustment error $\Delta\theta z$ changes.

However, for the oblique subject pattern, the error $\delta$ changes broadly with the slant angle $\phi$. For example, assuming that the base length B=7 mm, the adjustment angle $\Delta\theta z=0.5°$, and the slant angle $\phi=45°$, the error $\delta$ is given by the equation (4) as:

$$\begin{aligned}\delta &= 7 \text{ mm} \times \tan 0.5° \times \tan 45° \\ &\approx 60 \text{ µm}\end{aligned}$$

It is desirable to suppress the error $\delta$ to 2 to 3 µm or smaller. The error of 60 µm is too large and not allowable. In order to suppress the cross-eye error to 2 to 3 µm or smaller, it is necessary to adjust the value $\Delta\theta z$ to about 1 to 1.5 minutes.

The error $\Delta\theta z$ of the rotary angle $\theta z$ generated by the position alignment during the assembly of the range finder module has therefore an important meaning. The cross-eye error is generated by this error $\Delta\theta z$, and cannot be anticipated because it changes depending upon a subject. The range finding error to be caused by other position alignment errors can be anticipated, and can be easily corrected by using a default error value.

In this embodiment, the cross-eye error can be corrected in the following manner by using the auxiliary sensor 4LA.

Figure 9:
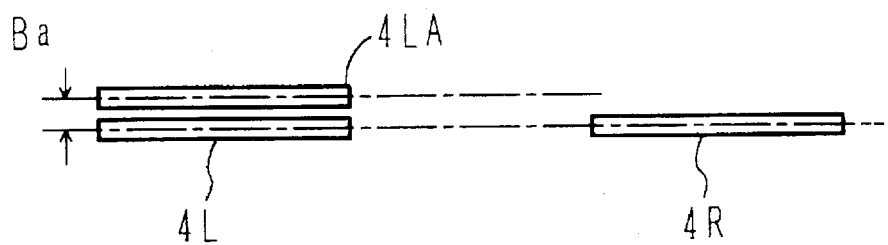
FIG. 9 is a schematic diagram showing the disposal of sensors 4R, 4L, and 4LA without an adjustment error Δθz.

FIG. 9 is a schematic diagram showing a disposal of sensors 4R, 4L, and 4LA without the adjustment error $\Delta\theta z$.

The right and left range finding sensors 4R and 4L are disposed on generally the same line. A vertical distance between the left range finding sensor 4L and the angle detection auxiliary sensor 4LA is an angle detection base length Ba. If $\Delta\theta z=0°$, a one-dot chain line extending through the lens optical axes coincides with a line extending through the sensors 4L and 4R.

The subject distance L is obtained from the phase difference (image distance) d calculated by using the right and left range finding sensors 4R and 4L.

Figure 10:
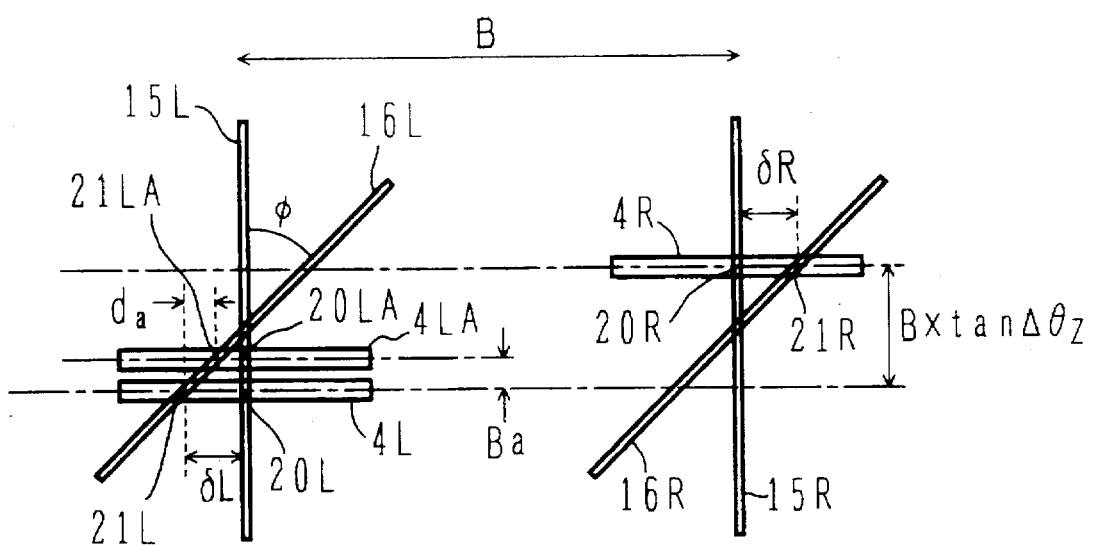
FIG. 10 is a schematic diagram showing the disposal of sensors 4R, 4L, and 4LA with an adjustment error Δθz.

FIG. 10 is a schematic diagram showing a disposal of sensors 4R, 4L, and 4LA with the adjustment error $\Delta\theta z$.

Vertical patterns 15L and 15R are subject patterns focussed on the sensors 4L and 4R, and vertical to a line extending through the lens pair 1L and 1R. Oblique patterns 16L and 16R are subject patterns focussed on the sensors 4L and 4R, and oblique to the line extending through the lens pair 1L and 1R. The oblique patterns 16L and 16R are patterns rotated by an angle $\phi$ from the vertical patterns 15L and 15R.

The vertical pattern 15L is focussed on the sensor 4L at 20L, and the oblique pattern 16L is focussed on the sensor 4L at 21L. An error $\delta L$ on the sensor 4L is a difference between 20L and 21L.

The vertical pattern 15R is focussed on the sensor 4R at 20R, and the oblique pattern 16R is focussed on the sensor 4R at 21R. An error $\delta R$ on the sensor 4R is a difference between 20R and 21R.

A distance between the sensors 4L and 4R in the Y-axis direction is given by:

$$B \times \tan\Delta\theta z$$

The oblique pattern 16L is focussed on the angle detection auxiliary sensor 4LA at 21LA. A phase difference da of the oblique pattern 16L focussed on the left range finding sensor 4L and angle detection auxiliary sensor 4LA corresponds to a difference between 21LA and 21L. This phase difference can be measured by detecting a phase difference of an image focussed on the sensors 4L and 4LA.

Next, a method of calculating the cross-eye error $\delta$ by using the measured phase difference da will be described.

The subject angle $\phi$ can be calculated by the following equation by using the phase difference da.

$$\tan\phi = da/Ba \quad (5)$$

The angle detection base length Ba is a vertical distance between the left range finding sensor 4L and angle detection auxiliary sensor 4LA.

By substituting the equation (5) into the equation (4), the cross-eye error $\delta$ is given by the following equation.

$$\delta = B \times \tan\Delta\theta z \times da/Ba \quad (6)$$

$B \times \tan\Delta\theta z$ at the right side is a fixed value which can be measured during the adjustment of the range finder module.

This measuring method will be later described. The angle detection base length Ba is a constant determined from the structure of the sensor chip. The phase difference da can be obtained during range finding by detecting a phase difference of an image focussed on the left range finding sensor 4L and angle detection auxiliary sensor 4LA. The phase difference da changes with the subject pattern angle $\phi$. If only the phase difference da can be measured during range finding, the cross-eye error $\delta$ can be calculated by the above equation (6).

The above method of calculating the cross-eye error $\delta$ is performed during actual range finding. In the following, a measuring method to be performed during the adjustment of a range finder module before it is shipped will be described. During the adjustment of a range finder module, in addition to a range finding error caused by other position alignment errors, $B \times \tan\Delta\theta z$ at the right side is measured.

$B \times \tan\Delta\theta z$ can be obtained through a phase difference detection by using the vertical and horizontal patterns during the adjustment of the range finder module.

From the equation (4), $\tan\Delta\theta z$ can be given by:

$$\tan\Delta\theta z = \delta 0/(B0 \times \tan\psi) \tag{7}$$

where B0 represents a base length measured during the adjustment, and $\psi$ represents an angle of an oblique pattern used for the adjustment. The cross-eye error $\delta 0$ is an error of the oblique pattern of the angle $\psi$ during the adjustment.

By substituting the equation (7) into the equation (6), the cross-eye error $\delta$ is given by:

$$\delta = (B/B0) \times (\delta 0/\tan\psi) \times (da/Ba) \tag{8}$$

The base length B0 is a length at the room temperature during the adjustment. The base length B is a length at the temperature during actual range finding. The base lengths B0 and B are slightly different because of different temperatures. However, since the thermal expansion coefficient of the lens pair is 6 to $7 \times 10^{-5}$, the difference between the base lengths is about 0.3% even if there is a temperature difference of 40° C. between the adjustment and range finding environments. Therefore, the equation (8) can be approximated to:

$$\begin{aligned}\delta &\approx (\delta 0/\tan\Psi) \times (da/Ba) \\ &= \gamma \times (da/Ba)\end{aligned} \tag{9}$$

The correction coefficient $\gamma$ is defined as:

$$\gamma = \delta 0/\tan\psi \tag{10}$$

The correction coefficient $\gamma$ can be expressed from the equation (7) by the following equation (11).

$$\gamma = B \times \tan\Delta\theta z \tag{11}$$

The correction coefficient $\gamma$ given by the equations (10) and (11) is measured during the adjustment of a range finder module. Even if B0=B is not assumed, the correction coefficient $\gamma[=(B/B0) \times (\delta 0/\tan\psi)]$ can be measured using B and B0.

The correction coefficient $\gamma$ is measured practically by using the equation (10). The angle $\psi$ is an angle of the subject pattern used by the adjustment, and the cross-eye error $\delta 0$ is calculated by using the phase difference measured during the adjustment. The method of measuring the error $\delta$ will be later described. These parameters are also used by other embodiments to be described later.

The correction coefficient $\gamma$ measured during the adjustment is stored in the range finder. During range finding, the stored correction coefficient $\gamma$ is read and the cross-eye error $\delta$ is calculated by the equation (9). The phase difference (image distance) is corrected by using the cross-eye error $\delta$ to obtain the correct subject distance.

In the foregoing, a single oblique pattern is projected. A pattern containing various oblique components is projected in practice. Therefore, it is not certain whether there is any error of the angle detecting phase difference da because of various angle components constituting the pattern.

Even if a pattern containing various oblique components is projected, the phase difference error $\delta$ caused by the adjustment error $\Delta\theta z$ can be compensated for. This will be discussed in the following.

The phase difference error of a pattern containing various angle components projected onto the range finding sensors 4L and 4R is represented by $\delta d$. It can be considered that this phase difference error $\delta d$ is an average value of phase difference errors $\delta d(\phi)$ at respective angle $\phi$ components. This can be expressed in the following equation (12).

$$\delta d = \frac{1}{\pi} \int_{-\frac{\pi}{2}}^{\frac{\pi}{2}} \delta d(\phi) \cdot d\phi \tag{12}$$

The equation (12) can be rewritten by using the equations (4) and (11) by:

$$\delta d = \frac{1}{\pi} \int_{-\frac{\pi}{2}}^{\frac{\pi}{2}} \gamma \cdot I(\phi) \cdot \tan\phi \cdot d\phi \tag{13}$$

where $I(\phi)$ represents an intensity (weight) of an angle $\phi$ pattern component.

The phase difference of this pattern is detected by using the angle detection sensor 4LA. The phase difference $\delta a$ to be compensated for is given from the equation (9) by the following equation (14).

$$\begin{aligned}\delta a &= \frac{1}{\pi} \int_{-\frac{\pi}{2}}^{\frac{\pi}{2}} \delta a(\phi) \cdot d\phi \\ &= \frac{1}{\pi} \int_{-\frac{\pi}{2}}^{\frac{\pi}{2}} \gamma \cdot \frac{da(\phi)}{Ba} \cdot d\phi\end{aligned} \tag{14}$$

where $da(\phi)$ represents a phase difference of an angle $\phi$ pattern component. With the intensity $I(\phi)$ of the angle $\phi$ pattern component, the following relationship can be assumed.

$$da(\phi) = I(\phi) \times Ba \times \tan\phi \tag{15}$$

By substituting the equation (14) into the above equation (15), the equation (16) can be obtained.

$$\delta a = \frac{1}{\pi} \int_{-\frac{\pi}{2}}^{\frac{\pi}{2}} \gamma \cdot I(\phi) \cdot \tan\phi \cdot d\phi \tag{16}$$

From the comparison of the equation (13) with the equation (16), $\delta d = \delta a$. Therefore, the phase difference error $\delta d$ obtained by actual range finding is equal to the compensation phase difference $\delta a$ obtained by using the angle detection sensor 4LA.

It can be said therefore that the phase difference error $\delta d$ can be compensated for even if a pattern has any type of an angle component distribution.

Figure 11:
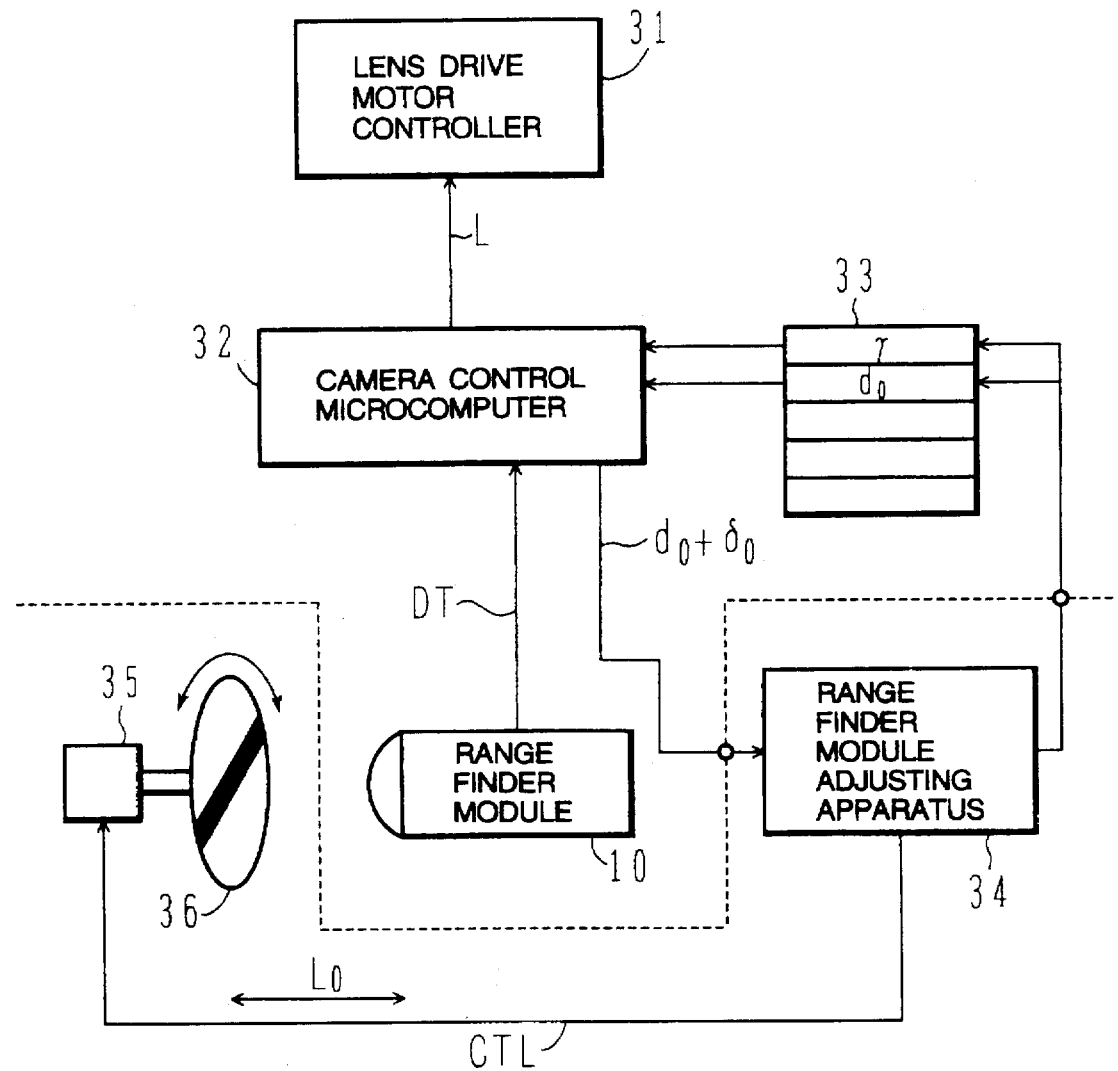
FIG. 11 is a block diagram showing a system for adjusting a range finder module.

FIG. 11 is a block diagram showing a system for adjusting a range finder module. A camera has a range finder module 10, a camera control microcomputer 32, an adjustment register 33, and a lens drive motor controller 31. The adjustment devices include a range finder module adjusting apparatus 34, a chart rotating motor 35, and a chart 36.

The range finder adjustment is performed after a range finder module is assembled and before the camera is shipped. During the range finder module adjustment, in addition to the correction coefficient γ in the equation (10), the true phase difference d0 shown in the graph of FIG. 8 is measured by using the adjustment pattern.

The range finder module 10 is similar to that shown in FIG. 2 and has the lens 1, sensor chip 4, and other components. The range finder 10 measures the chart 36 as its range finding subject. A distance between the range finder module 10 and chart 36 is fixed to L0.

For example, a straight line pattern is depicted on the chart 36. The shaft of the chart rotating motor 35 is coupled to the chart 36, and the chart 36 can be used as a vertical pattern (φ=0°) or an oblique pattern (slant angle φ). The slant angle φ can be set to an arbitrary angle.

The camera control microprocessor 32 can perform various controls. The camera control microprocessor 32 stores measured constants such as a base length B, an angle detection base length Ba, and a chart distance L0. After the adjustment, the chart distance L0 is used for calibrating the phase difference obtained during actual range finding. The details thereof will be described later.

First, the camera control microprocessor 32 supplies a motor rotation control signal CTL to the chart rotating motor 35 via the range finder module adjusting apparatus 34. Upon reception of the motor rotation control signal CTL, the chart rotating motor 35 rotates and stops at the angle φ=0° of the chart 36.

The range finder module 10 takes the image of the chart 36 at the angle φ=0°, and supplies sensor data DT of the range finding sensors 4L and 4R to the camera control microcomputer 32. The camera control microcomputer 32 performs a correlation calculation by using the sensor data DT, and supplies phase difference data d0+δ0 to the range finder module adjusting apparatus 34. In this case, the error δ0 =0 because of the chart angle φ=0°. The range finder module adjusting apparatus 34 loads the supplied phase difference data d0 in a register d0 in the adjustment register 33. Errors other than the cross-eye error can be compensated for by using the value d0.

Next, the camera control microcomputer 32 instructs the range finder module adjusting apparatus 34 and chart rotating motor 35 to set the angle φ of the chart 36, for example, to 60°. The range finder module takes the image of the chart 36 at the angle φ=60°, and supplies sensor data DT of the range finding sensors 4L and 4R to the camera control microcomputer 32. The camera control microcomputer 32 performs a correlation calculation by using the sensor data DT to calculate the phase difference data d0+δ0, and calculates the error δ0 by subtracting the true phase difference d0 stored in the adjustment register 33 from the phase difference d0+δ0.

Thereafter, the correction coefficient γ is calculated by the equation (10) by using the error δ0. The correction coefficient γ is loaded in a register γ in the adjustment register 33 via the range finder adjusting apparatus 34. The error δ0 is an error obtained at the chart angle φ=60°.

The adjustment of the range finder module is thus completed, and the correction coefficient γ and the true phase difference d0 obtained by using the adjustment chart are loaded in the adjustment register 33.

Figure 12:
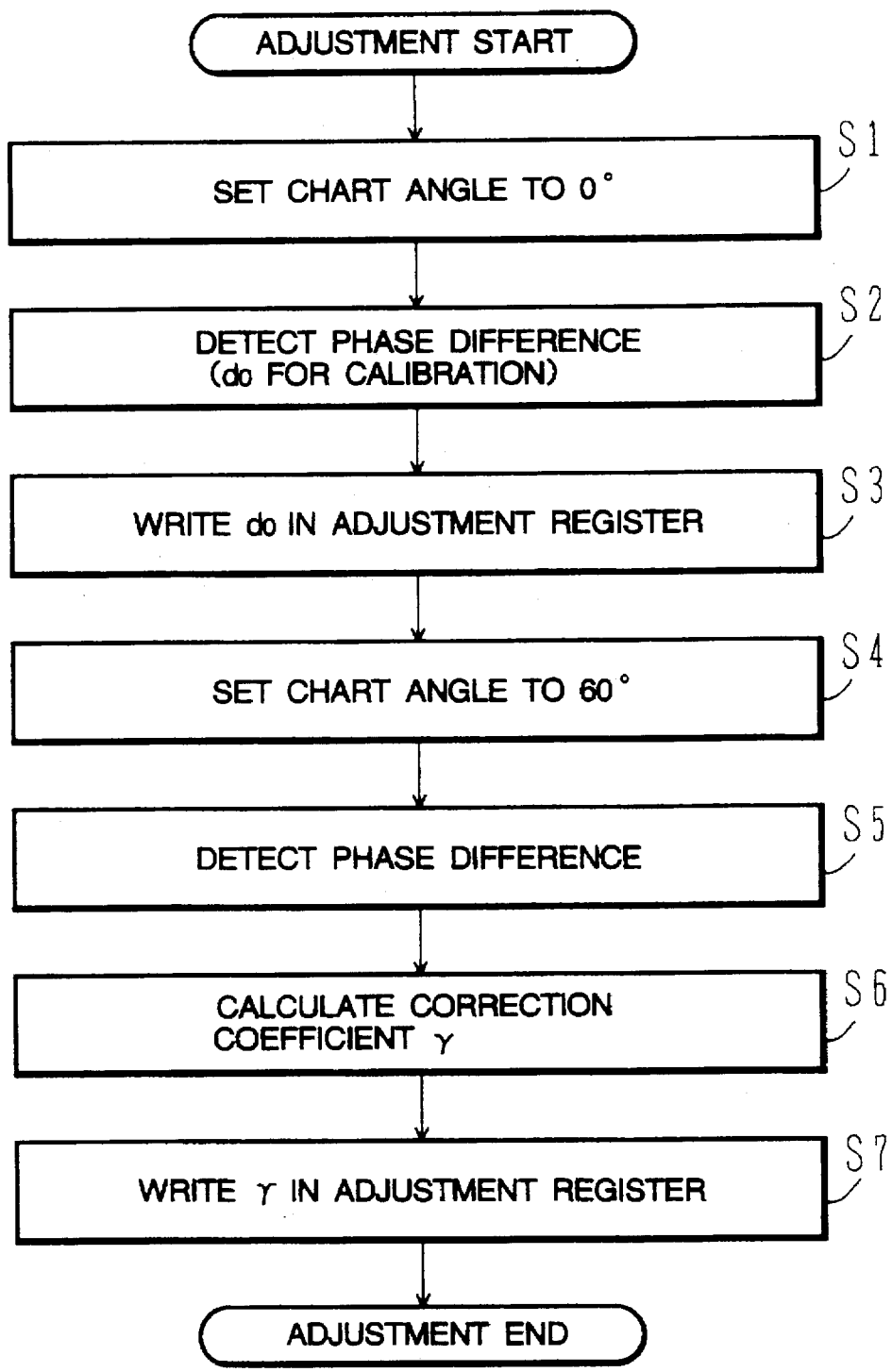
FIG. 12 is a flow chart illustrating the processes of adjusting a range finder module.

FIG. 12 is a flow chart illustrating the processes of adjusting a range finder module. The adjustment of the range finder module is performed by using the chart 36 and other devices shown in FIG. 11.

At Step S1, the angle of the chart 36 is set to 0° At this angle φ=0°, a vertical pattern can be used as the subject of range finding.

At Step S2, the phase difference d0 of the chart 36 at the angle 0° is detected. The phase difference d0 is detected as a phase difference of an image of the chart (angle φ=0°) focussed by the range finder module 10 (FIG. 11). The phase difference d0 is a phase difference at the chart angle φ=0° shown in FIG. 8 and does not include the error δ.

At Step S3, the detected phase difference d0 is written in the adjustment register 33 (FIG. 11). The phase difference d0 is used as calibration data for calibrating the phase difference detected by actual range finding after the adjustment.

At Step S4, the angle of the chart 36 is set, for example, to 60°. With the angle being set to 60°, the chart 36 can be used as an oblique pattern at the slant angle of 60°.

At Step S5, the phase angle d0+δ0 of the chart 36 at the angle 60° is detected. The phase difference d0 is a phase difference at the angle 0°, and the phase difference δ0 is an error generated at the angle 60°.

At Step S6, the correction coefficient γ is calculated. The correction coefficient γ can be calculated from the equation (10):

$$\gamma = \delta 0/\tan\Psi$$
$$= \delta 0/\tan 60°$$

where ψ is the angle (60°) of the oblique pattern of the chart 36. The error δ0 is obtained as a difference between the phase difference d0+δ0 detected at Step S5 and the phase difference d0 detected at Step S2.

At Step S7, the calculated correction coefficient γ is written in the adjustment register 33 (FIG. 11). The correction coefficient γ is used for correcting the error of the phase difference during actual range finding after the adjustment.

With the above processes, the adjustment of the range finder module is completed. With this adjustment, the phase difference d0 and correction coefficient γ are written in the adjustment register 33.

Next, the control during range finding will be described by using the camera including the range finder module 10 shown in FIG. 11. For range finding, the chart 36, chart rotating motor 35, and range finder module adjusting apparatus 34 are not needed, but only the camera with the range finder module 10 is used. The camera is directed toward a subject to measured the subject distance. The range finder module 10 focusses the image of the subject, and supplies sensor data DT of the sensors 4L and 4R to the camera control microcomputer 32. This microcomputer 32 calculates the phase difference by using the sensor data DT. The error including the cross-eye error δ of the calculated phase difference is corrected.

The cross-eye error δ is calculated by the equation (9) by using the correction coefficient γ stored in the adjustment register 33:

$$\delta = \gamma \times (da/Ba)$$

The corrected phase difference is calibrated by using the phase difference d0 stored in the adjustment register 33 during the adjustment and the chart distance L0 stored in the camera control microcomputer 32, to convert it into a subject distance L. The phase difference is calibrated so as to correct the phase difference error generated during the assembly of the range finder module excluding the rotary angle θz error.

The subject distance data L is supplied to the lens drive motor controller 31. In accordance with this subject distance data L, the controller 31 drives the motor (not shown) to adjust the focus of the camera lens. The details of range finding will be later described.

Figure 13:
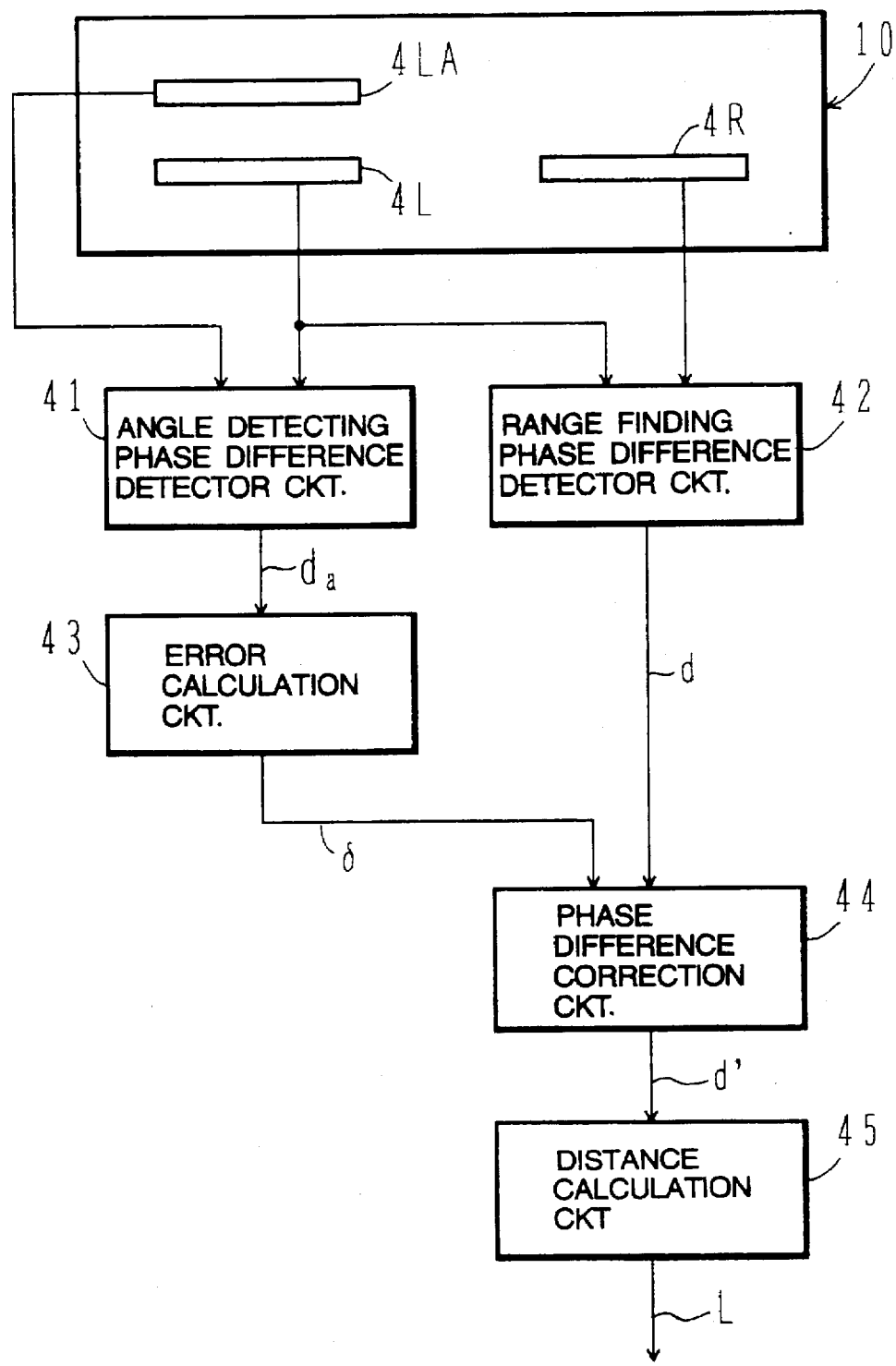
FIG. 13 is a block diagram illustrating the range finding operation by the range finder of the first embodiment.

FIG. 13 is a block diagram illustrating the processes to be performed by the camera control microcomputer 32 shown in FIG. 11.

The range finder module 10 has right and left range finding sensors 4R and 4L and an angle detection auxiliary sensor 4LA. A range finding phase difference detector circuit 42 performs a correlation calculation between images focussed on the right and left range finding sensors 4R and 4L to detect a phase difference d.

An angle detecting phase difference detector circuit 41 performs a correlation calculation between images focussed on the left range finding sensor 4L and angle detection auxiliary sensor 4LA to detect a phase difference da and supply it to the error calculation circuit 43. If the phase difference da is detected, the subject angle φ can be calculated from $\tan\phi = da/Ba$.

The error calculation circuit 43 calculates the cross-eye error δ caused by the angle φ, by using the angle detecting phase difference da. The cross-eye error δ can be calculated from $\delta = \gamma \times (da/Ba)$.

A phase difference correction circuit 44 corrects the phase difference d detected by the range finding phase difference detector circuit 42, by the correction of the error δ calculated by the error calculation circuit 43 and other necessary calibration of errors, and outputs the corrected phase difference d'.

A distance calculation circuit 45 converts the phase difference d' supplied from the phase difference correction circuit 44 into the subject distance data L, and outputs it. Thereafter, in accordance with the subject distance data, the focus of the camera lens is adjusted.

Figure 14:
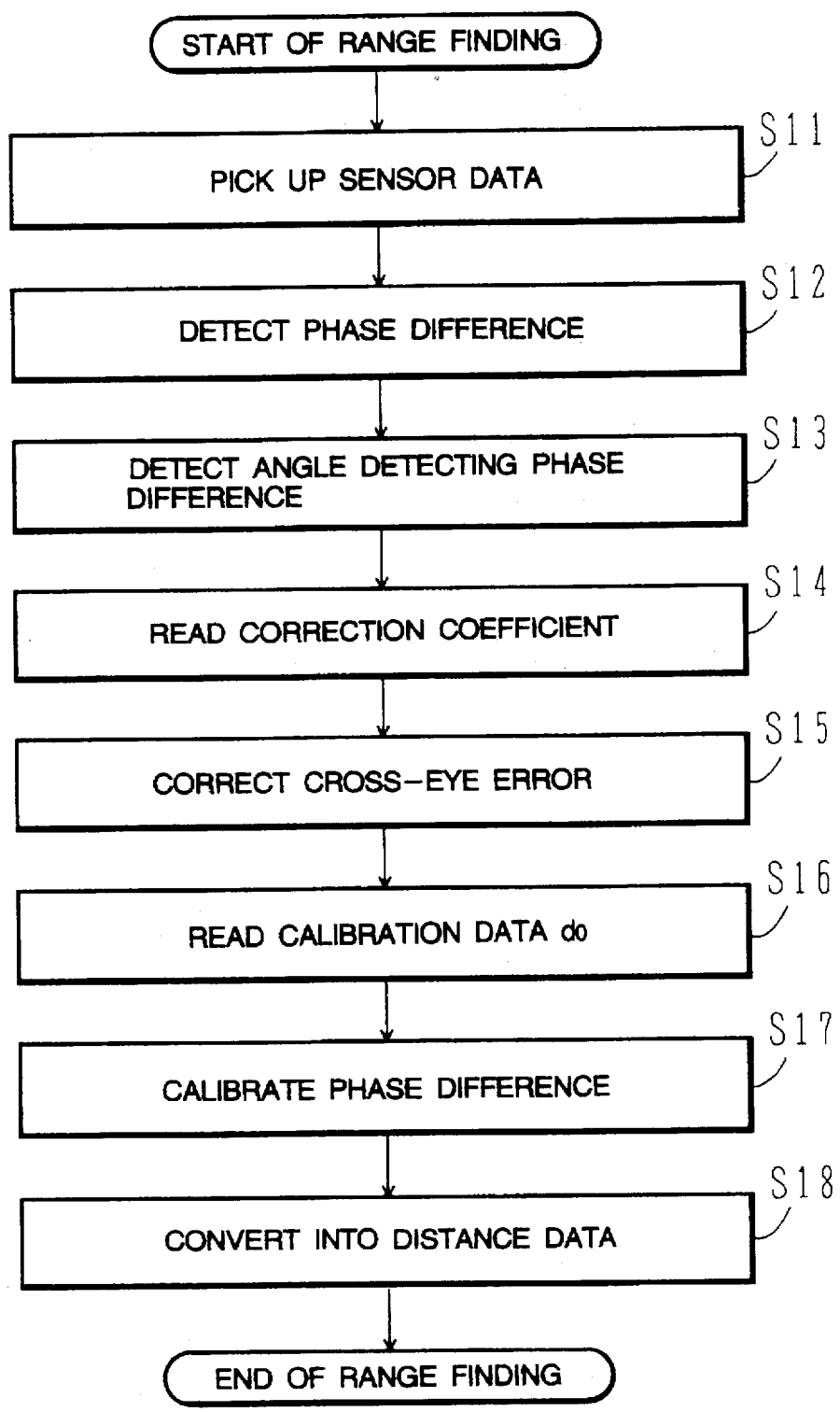
FIG. 14 is a flow chart illustrating the processes of range finding by the range finder of the first embodiment.

FIG. 14 is a flow chart illustrating the processes of range finding by the range finder.

At Step S11, sensor data is picked up from the range finding sensors 4L and 4R and angle detection auxiliary sensor 4LA to detect the images focussed on the sensors.

At Step S12, the phase difference d (=dx+δ) is detected. The phase difference d is calculated by a correlation calculation of the equation (1) between sensor data of the right and left range finding sensors 4R and 4L, and by an interpolation calculation of the equation (2) using the correlation calculation results.

The error δ is caused by the angle φ of the subject, and the phase difference dx corresponds to the subject distance.

At Step S13, the angle detecting phase difference da is detected. The phase difference da is calculated by a correlation calculation of the equation (1) between sensor data of the left range finding sensor 4L and angle detection auxiliary sensor 4LA, and by an interpolation calculation of the equation (2) using the correlation calculation results.

At Step S14, the correction coefficient γ is read from the adjustment register 33 (FIG. 11) in which it was stored during the adjustment of the range finder module.

At Step S15, the cross-eye error is corrected. The cross-eye error is the error δ caused by the subject angle φ. The cross-eye error δ can be calculated by the equation (9) as:

$$\delta = \gamma \times (da/Ba)$$

The correction coefficient γ was read at Step S14, and the angle detecting phase difference da was detected at Step S13. The angle detecting base length Ba is a vertical distance between the left range finding sensor 4L and angle detection auxiliary sensor 4LA as shown in FIG. 1, and is stored in advance in the camera control microcomputer 32 (FIG. 11).

In accordance with the cross-eye error δ calculated by the equation (9), the phase difference d (=dx+δ) is corrected to obtain the phase difference dx.

At Step S16, the calibration data d0 is read from the adjustment register 33 (FIG. 11). The calibration data d0 was written in the adjustment register 33 during the adjustment of the range finder module.

At Step S17, the phase difference dx is calibrated by using the calibration data d0 and chart distance L0. The calibration data d0 was read at Step S16, and is a base phase difference (not containing the error δ) measured during the adjustment at the chart distance L0. The chart distance L0 is stored in advance in the camera control microcomputer 32 (FIG. 11).

The calibration data d0 is a phase difference measured during the adjustment at the chart distance L0. A theoretical phase difference dt at the chart distance L0 is given by the equation (3):

$$dt = (B \times f)/L0$$

An off-set value doff of the phase difference is a difference between the theoretical phase difference dt and the measured value d0:

$$doff = dt - d0$$

The phase difference doff is mainly generated by a difference of the characteristics of each optical system of a range finder module. Therefore, the same phase difference off-set doff is always generated in each of range finder module having the same characteristics.

Calibration for the phase difference dx is performed by adding the off-set value doff:

$$d' = dx + doff$$

At Step S18, a subject distance L is calculated by using the calibrated phase distance d'.

A necessity of calibrating the phase difference dx will be explained. In detecting the phase difference, it is necessary to detect the distance (phase difference) between the images projected on the right and left sensors, at a μm-order precision. Therefore, the same or higher precision is required also for a lens distance (base length B) between a pair of right and left lenses. However, the lens pair is formed usually by molding. Depending upon the molding conditions, the lens distance (base length B) has a variation of several tens μm. In order to absorb this variation of the base length, it is necessary to adjust the base length of each range finder module. In order to adjust the base length, the phase difference dx is calibrated as stated above.

The value of (B×f) has also a variation between range finder modules. However, this variation is about 1% at the most and no practical problem occurs.

The conversion of the calibrated phase difference d' into the subject distance data L at Step S18 is performed by using the equation (3):

$$L = (B \times f)/d'$$

The base length B and lens/sensor distance f are stored in advance in the camera control microcomputer 32 (FIG. 11).

With the above processes, the distance data L is obtained and the range finding operation is terminated.

In this embodiment, two types of phase difference detections are performed. One is a phase difference detection between the right and left range finding sensors 4R and 4L, and the other is a phase difference detection between the left range finding sensor 4L and angle detection auxiliary sensor 4LA. If it is found during the adjustment that Δθx is 0, then the angle detecting phase difference may be omitted. The phase difference is detected in the above embodiment by the correlation calculation. Other methods may be used for detecting a phase difference.

Figure 15:
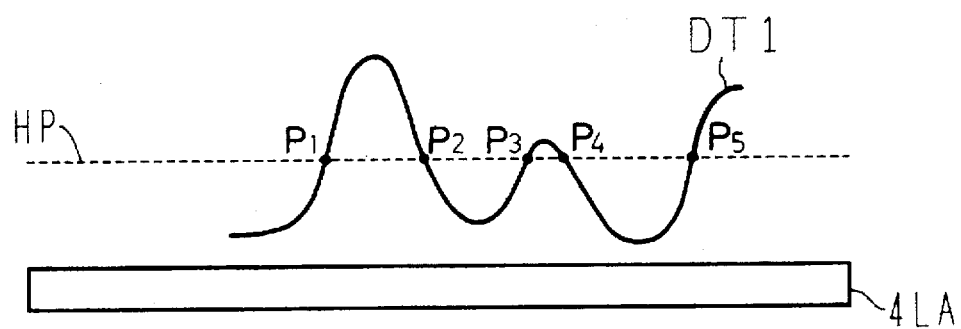
FIG. 15 is a schematic diagram illustrating the operation of phase difference detecting means not using correlation calculation.

FIG. 15 is a schematic diagram illustrating the operation of phase difference detecting means not using correlation calculation. For example, detecting a phase difference between the left range finding sensor 4L and angle detection auxiliary sensor 4LA will be described.

It is assumed that the angle detection auxiliary sensor 4LA detects sensor data indicated by a curve DT1. The sensor data DT1 is the data of an image focussed on the sensor 4LA.

A level HP is a slice level having a half of a peak output value of the sensor 4LA. P1, P2 . . . Pn are cross points between the curve DT1 and the slice level HP.

Similarly, it is assumed that the left range finding sensor 4L detects sensor data indicated by a curve DT2. A level HQ is, for example in the above case, a slice level having a half of a peak output value of the sensor 4L. Q1, Q2, . . . , Qn are cross points between the curve DT2 and the slice level HQ.

An average value of cross points P1, P2, . . . , Pn is P, and an average value of cross points Q1, Q2, . . . , Qn is Q. The phase difference is a difference between the average values P and Q.

Figure 16:
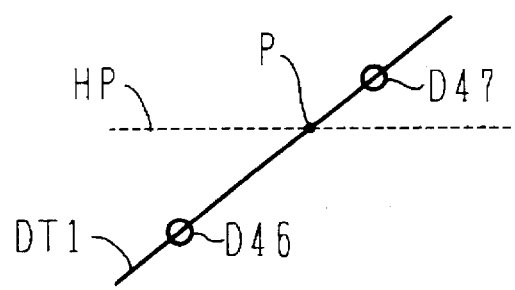
FIG. 16 is a schematic diagram illustrating how cross points P1, P2, . . . , Pn are detected.

FIG. 16 is a schematic diagram illustrating how cross points P1, P2, . . . , Pn are detected. For example, a method of detecting a cross point P between the curve DT1 and slice level HP will be explained.

It is assumed that pixel levels on both sides of the level HP on the curve DT1 are level D46 and level D47. The levels D46 and D47 are, for example, linearly interpolated to obtain the cross point P at the level HP.

In the above manner, phase differences between the sensors 4R, 4L, and 4LA can be detected by the phase difference detecting means not using correlation calculation.

In the first embodiment, in obtaining the subject distance L, the phase difference d between the range finding sensors 4L and 4R is detected. The error δ caused by the subject angle φ is detected by detecting the phase difference between the range finding sensor 4L and angle detection auxiliary sensor 4LA. Thereafter, the error δ of the phase difference d is corrected to obtain a correct subject distance L.

With the range finder of this embodiment, the subject distance L can be measured at a high precision even if there is a displacement of the rotary angle Δθz without a high precision assembly position alignment of the range finder module. Since the assembly position alignment is not always necessary to be performed at a high precision, the assembly cost can be reduced.

At Step 17 shown in FIG. 14, the phase difference detected during range finding is calibrated by using the base phase difference d0 at the adjustment chart distance L0. The base phase difference d0 may be a phase difference at an arbitrary chart distance.

A small error caused by a displacement of the rotary angle Δθy and a small error of a vertical pattern caused by a displacement of the rotary angle Δθz, may be corrected through calibration if necessary at Step S17 shown in FIG. 14, or may not be corrected by regarding them negligible.

In this embodiment, errors other than the cross-eye error are also corrected through calibration of the phase difference. These errors are often as small as negligible so that only the correction of the cross-eye error (Step S15 in FIG. 14) may be performed without the calibration of other phase difference errors (Step S17 in FIG. 14).

According to the first embodiment, in addition to the first and second photosensor arrays, an auxiliary photosensor array is used. Therefore, the subject distance can be measured at a high precision even if the relative positions of the lens and sensors are displaced.

Next, a range finder according to the second embodiment of this invention will be described. The structure of the range finder is almost the same as that of the first embodiment (FIG. 2), excepting the structure of a sensor chip. Although three sensors are used in the first embodiment, four sensors are used in the second embodiment.

Figure 17:
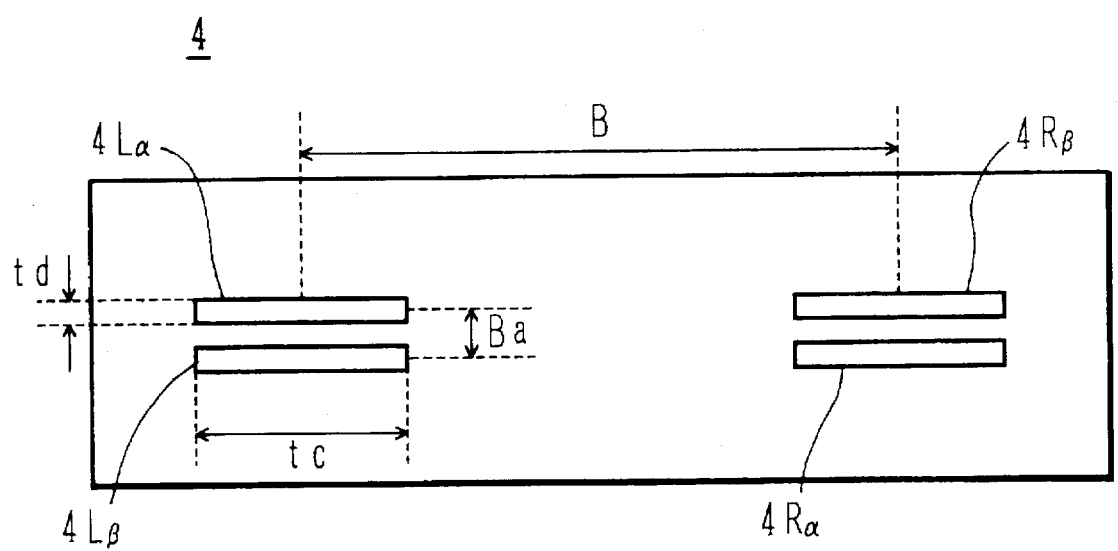
FIG. 17 is a schematic diagram showing the structure of a sensor chip according to a second embodiment of the invention.

FIG. 17 shows another structure of the sensor chip 4 shown in FIG. 2. The sensor chip 4 has four line photosensors 4Lα, 4Lβ, 4Rα, and 4Rβ.

Each line sensor 4Lα, 4Lβ, 4Rα, and 4Rβ has, for example, 144 pixels at a pitch of 24 μm. The width td of each pixel is about 100 μm. Therefore, the length tc of each sensor 4Lα, 4Lβ, 4Rα, and 4Rβ is 24 μm×143.

The left sensors 4Lα and 4Lβ are positioned where light from the subject is applied via the left lens 1L shown in FIG. 2. The right sensors 4Rα and 4Rβ are positioned where light from the subject is applied via the right lens 1R shown in FIG. 2. A line extending through the sensors 4Lα and 4Rβ, a line extending through the sensors 4Lβ and 4Rα, and a line extending through the lenses 1R and 1L are coarsely adjusted to be generally parallel.

The base length B is a distance between the two lenses 1R and 1L. If the lens 1 and sensor chip 4 are disposed at the relative positions shown in FIG. 2, the distances between the left sensors 4Lα and 4Lβ and between the right sensors 4Rα and 4Rβ are also B. The base length B is, for example, 7 mm.

The sensors 4Lα and 4Lβ are generally parallel and spaced apart by a distance Ba. The sensors 4Rα and 4Rβ are also generally parallel and spaced apart by the distance Ba. The distance Ba is, for example, 200 μm.

The subject distance L can be calculated from the above equation (3). The base length B and lens/sensor distance f are determined from the structure of the range finder module shown in FIG. 2. The phase difference d is an average value of two phase differences calculated from output data of the sensors 4Lα, 4Lβ, 4Rα, and 4Rβ disposed in a crossed relation. Namely, the phase difference d is an average value of a phase difference between images focussed on the sensors 4Lα and 4Rβ and a phase difference between images focussed on the sensors 4Lβ and 4Rβ.

One phase difference is obtained by detecting output data of the sensors 4Lα and 4Rα and performing a correlation calculation, and the other phase difference is obtained by detecting output data of the sensors 4Lβ and 4Rβ and performing a correlation calculation.

After the two phase differences are calculated, the subject distance L is calculated by using the average value. This subject distance L has no error if the lenses 1R and 1L and the sensors 4Lα, 4Lβ, 4Rα, and 4Rβ have the ideal relative positions stated above. However, if there is any displacement therebetween, the subject distance L has an error.

The two phase differences have the same value if there is no displacement of the relative positions of the lens and sensor. However, if there is a displacement, the two phase differences have different values and the obtained subject distance has an error. In this case, the subject distance is corrected by a difference between the two phase differences. The details will be given later.

Similar to the first embodiment using three sensors, the error $\Delta\theta z$ of the rotary angle $\theta z$ generated by the position alignment during the assembly of the range finder module has an important meaning. The cross-eye error is generated by this error $\Delta\theta z$, and cannot be anticipated if a pair of sensors only is used because it changes depending upon a subject. The range finding error to be caused by other position alignment errors, i.e., errors in the X-, Y- and Z-axes directions and errors of the rotary angles $\theta x$ and $\theta y$, can be anticipated or do not affect the subject distance, and can be easily corrected by using a default error value.

Figure 18:
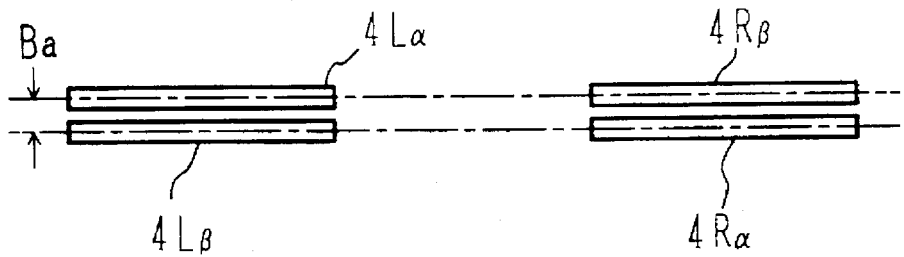
FIG. 18 is a schematic diagram showing the disposal of sensors 4Lα, 4Lβ, 4Rα, and 4Rβ without an adjustment error Δθz.

In the second embodiment, the cross-eye error can be corrected in the following manner by using the four sensors $4L\alpha$, $4L\beta$, $4R\alpha$, and $4R\beta$ FIG. 18 is a schematic diagram showing a disposal of sensors $4L\alpha$, $4L\beta$, $4R\alpha$, and $4R\beta$ without the adjustment error $\Delta\theta z$.

The right and left sensors $4R\beta$ and $4L\alpha$ are disposed on generally the same line, and the right and left sensors $4R\alpha$ and $4L\beta$ are disposed on generally the same line. A vertical distance between the left sensors $4L\alpha$ and $4L\beta$ and a vertical distance between the right sensors $4R\alpha$ and $4R\beta$ are both an angle detecting base length Ba. If $\Delta\theta z=0°$, a one-dot chain line extending through the lens optical axes coincides with a line extending through the sensors 4L and 4R.

Sensor data of each image focussed on the sensors $4L\alpha$, $4L\beta$, $4R\alpha$, and $4R\beta$ is detected. By using the detected sensor data, the phase difference of images focussed on the sensors $4L\alpha$ and $4R\alpha$ and the phase difference of images focussed on the sensors $4L\beta$ and $4R\beta$ are calculated. The calculated two phase differences are averaged to obtain a phase difference average value d and thereafter the subject distance L is calculated.

If there is no adjustment error $\Delta\theta z$, the phase difference between images focussed on the sensors $4L\alpha$ and $4R\beta$ is the same as the phase difference of images focussed on the sensors $4L\beta$ and $4R\beta$. The two phase differences are averaged to obtain a phase difference having a high precision.

Figure 19:
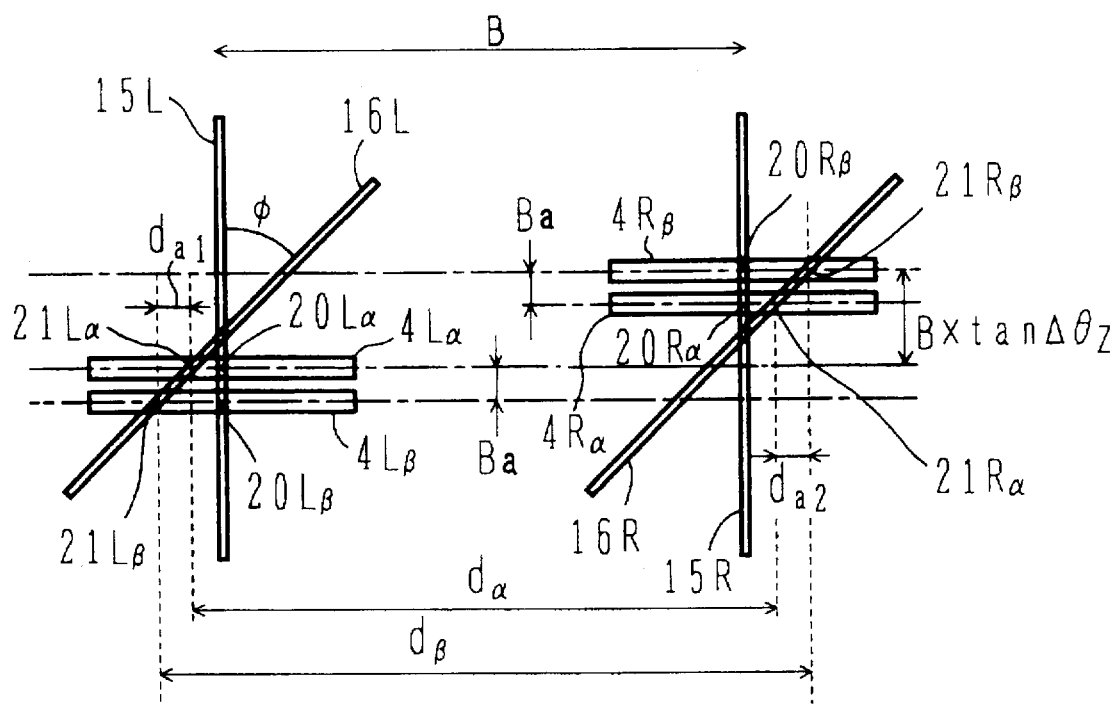
FIG. 19 is a schematic diagram showing the disposal of sensors 4Lα, 4Lβ, 4Rα, and 4Rβ with an adjustment error Δθz.

FIG. 19 is a schematic diagram showing a disposal of sensors $4L\alpha$, $4L\beta$, $4R\alpha$, and $4R\beta$ with the adjustment error $\Delta\theta z$.

Vertical patterns 15L and 15R are subject patterns focussed on the sensors 4L and 4R, and vertical to a line extending through the lens pair 1L and 1R. Oblique patterns 16L and 16R are subject patterns focussed on the sensors 4L and 4R, and oblique to the line extending through the lens pair 1L and 1R. The oblique patterns 16L and 16R are patterns rotated by an angle $\phi$ from the vertical patterns 15L and 15R.

The vertical pattern 15L is focussed on the left sensor $4L\alpha$ at $20L\alpha$, and the oblique pattern 16L is focussed on the left sensor $4L\alpha$ at $21L\alpha$. The vertical pattern 15L is focussed on the left sensor $4L\beta$ at $20L\beta$, and the oblique pattern 16L is focussed on the left sensor $4L\beta$ at $21L\beta$.

The vertical pattern 15R is focussed on the right sensor $4R\alpha$ at $20R\alpha$, and the oblique pattern 16R is focussed on the right sensor $4R\alpha$ at $21R\alpha$. The vertical pattern 15R is focussed on the right sensor $4R\beta$ at $20R\beta$, and the oblique pattern 16R is focussed on the left sensor $4R\beta$ at $21R\beta$.

A distance between the sensors $4L\alpha$ and $4R\beta$ in the Y-axis direction is given by:

$$B \times \tan\Delta\theta z$$

A distance between the sensors $4L\beta$ and $4R\alpha$ is also given by given by $B \times \tan\Delta\theta z$.

A phase difference $d\alpha$ is a phase difference between images focussed on the left sensor $4L\alpha$ and right sensor $4R\alpha$, and a phase difference $d\beta$ is a phase difference between images focussed on the left sensor $4L\beta$ and right sensor $4R\beta$.

A difference between the phase differences $d\alpha$ and $d\beta$ is given by:

$$d\beta - d\alpha = da1 + da2$$

where the phase difference da1 is a difference between the image position $21L\alpha$ on the left sensor $4L\alpha$ and the image position $21L\beta$ on the left sensor $4L\beta$, and the phase difference da2 is a difference between the image position $21R\alpha$ on the right sensor $4R\alpha$ and the image position $21R\beta$ on the right sensor $4R\beta$.

An average da of the left sensor phase difference da1 and the right sensor phase difference da2 is given by:

$$da = (da1 + da2)/2$$

Since $da1 + da2 = d\beta - d\alpha$ as described above, the phase difference can be calculated by the following equation (17) by using the phase difference $d\alpha$ between the sensors $4L\alpha$ and $4R\alpha$ and the phase difference $d\beta$ between the sensors $4L\beta$ and $4R\beta$.

$$da = (d\beta - d\alpha)/2 \tag{17}$$

Next, a method of calculating the cross-eye error $\delta$ by using the phase difference da will be described. The subject angle $\phi$ can be calculated by the following equation by using the phase difference da.

$$\tan\phi = da/Ba$$

The angle detecting base length Ba is a vertical distance between the left sensors $4L\alpha$ and $4L\beta$ (equal to the vertical distance between the right sensors $4R\alpha$ and $4R\beta$).

By substituting the above equation into the equation (4), the cross-eye error $\delta$ is given by the following equation same as the equation (6).

$$d = B \times \tan\Delta\theta z \times da/Ba$$

$B \times \tan\Delta\theta z$ at the right side is a fixed value which can be measured during the adjustment of the range finder module. This measuring method has been described with reference to FIGS. 11 and 12.

The phase difference da indicates a change in the phase of the detected oblique pattern relative to the angle detecting base length Ba. The phase difference da is a difference (a half of $(d\beta - da) = (d\beta - da/2)$ between the phase difference $d\beta$ between an image ($21L\beta$) focussed on the sensor $4L\beta$ and an image ($21R\beta$) focussed on the sensor $4R\beta$ and the phase difference da between an image ($21L\alpha$) focussed on the sensor $4L\alpha$ and an image ($21R\alpha$) focussed on the sensor $4R\alpha$. The phase difference da changes with the subject pattern angle $\phi$. If only the phase difference da can be measured during range finding, the cross-eye error $\delta$ can be calculated by the above equation (6).

In the foregoing, a single oblique pattern is projected. A pattern containing various oblique components can also be used in this embodiment using four sensors.

Next, a method of adjusting the range finder module of the second embodiment will be described with reference to FIG. 11. The correction coefficient $\gamma$ is the same as defined in the first embodiment by the equation (10).

First, the camera control microprocessor 32 supplies the motor rotation control signal CTL to the chart rotating motor 35 via the range finder module adjusting apparatus 34. Upon reception of the motor rotation control signal CTL, the chart rotating motor 35 rotates and stops at the angle $\phi=0°$ of the chart 36.

The range finder module 10 takes the image of the chart 36 at the angle $\phi=0°$, and supplies sensor data DT of the range finding sensors 4L$\alpha$ and 4R$\alpha$ to the camera control microcomputer 32. The camera control microcomputer 32 performs a correlation calculation by using the sensor data DT, and supplies phase difference data d0+δ0 to the range finder module adjusting apparatus 34. In this case, the error δ0=0 because of the chart angle $\phi=0°$. The range finder module adjusting apparatus 34 loads the supplied phase difference data d0 in the register d0 in the adjustment register 33. Errors other than the cross-eye error can be compensated for by using the value d0.

Next, the camera control microcomputer 32 instructs the range finder module adjusting apparatus 34 and chart rotating motor 35 to set the angle $\phi$ of the chart 36, for example, to 60°. The range finder module takes the image of the chart 36 at the angle $\phi=60°$, and supplies sensor data DT of the range finding sensors 4L$\alpha$ and 4R$\alpha$ to the camera control microcomputer 32. The camera control microcomputer 32 performs a correlation calculation by using the sensor data DT to calculate the phase difference data d0+δ0, and calculates the error δ0 by subtracting the true phase difference d0 stored in the adjustment register 33 from the phase difference d0+δ0.

Thereafter, the correction coefficient $\gamma$ is calculated by the equation (10) by using the error δ0. The correction coefficient $\gamma$ is loaded in the register $\gamma$ in the adjustment register 33 via the range finder adjusting apparatus 34. The error δ0 is an error obtained at the chart angle $\phi=60°$.

The adjustment of the range finder module is thus completed, and the correction coefficient $\gamma$ and the true phase difference d0 obtained by using the adjustment chart are loaded in the adjustment register 33.

Next, the control during range finding will be described. For range finding, the chart 36, chart rotating motor 35, and range finder module adjusting apparatus 34 are not needed, but only the camera with the range finder module 10 is used. The camera is directed toward a subject to measured the subject distance. The range finder module 10 focusses the image of the subject, and supplies sensor data DT of the sensors 4L$\alpha$, 4L$\beta$, 4R$\alpha$, and 4R$\beta$ to the camera control microcomputer 32. This microcomputer 32 calculates the phase difference by using the sensor data DT. The error including the cross-eye error δ of the calculated phase difference is corrected.

The cross-eye error δ is calculated by the equation (9) by using the correction coefficient $\gamma$ stored in the adjustment register 33:

$$\delta=\gamma \times (da/Ba)$$

The corrected phase difference is calibrated by using the base phase difference d0 stored in the adjustment register 33 during the adjustment and the chart distance L0 stored in the camera control microcomputer 32, to convert it into a subject distance L. The phase difference is calibrated so as to correct the phase difference errors generated during the assembly of the range finder module excluding a displacement of the rotary angle θz.

The subject distance data L is supplied to the lens drive motor controller 31. In accordance with this subject distance data L, the controller 31 drives the motor (not shown) to adjust the focus of the camera lens. The details of range finding will be described.

Figure 20:
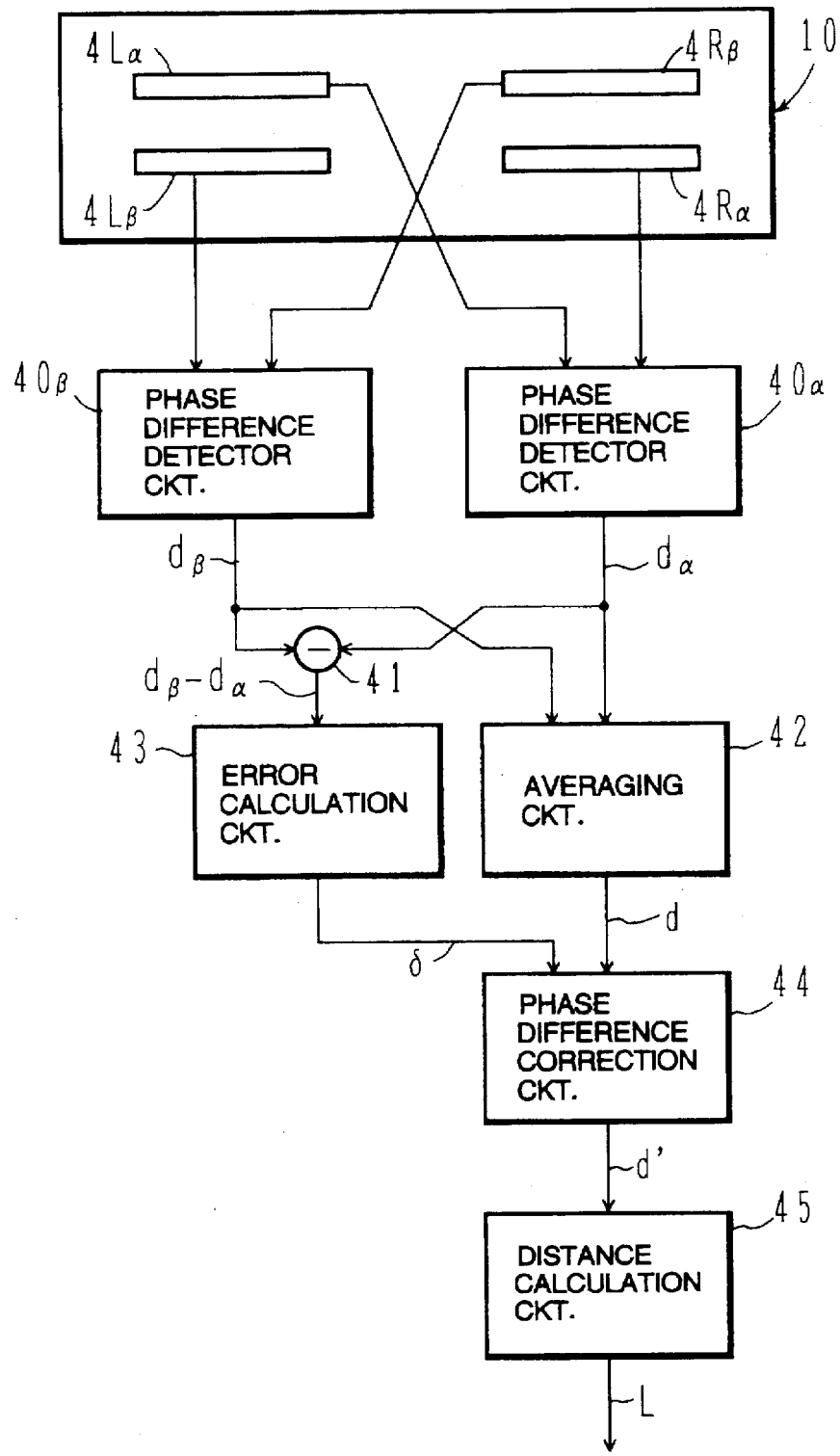
FIG. 20 is a block diagram illustrating the processes of range finding by the range finder of the second embodiment.

FIG. 20 is a block diagram illustrating the processes to be performed by the camera control microcomputer 32 shown in FIG. 11.

The range finder module 10 has two pairs of sensors 4L$\alpha$ and 4R$\alpha$, and 4L$\beta$ and 4R$\beta$. A phase difference detector circuit 40$\alpha$ performs a correlation calculation between images focussed on the left sensor 4L$\alpha$ and the right sensor 4R$\alpha$ to detect a phase difference d$\alpha$. A phase difference detector circuit 40$\beta$ performs a correlation calculation between images focussed on the left sensor 4L$\beta$ and the right sensor 4R$\beta$ to detect a phase difference d$\beta$.

An averaging circuit 42 averages the detected phase differences d$\alpha$ and d$\beta$ and outputs a phase difference average value. A subtractor 41 subtracts the phase difference d$\alpha$ from the phase difference d$\beta$ and outputs a difference between the two phase differences. An error calculation circuit 43 calculates the angle detecting phase difference da (=(d$\beta$-d$\alpha$)/2) by using the difference (d$\beta$-d$\alpha$), and calculates the error δ (=$\gamma \times$(da/Ba)) by using the angle detecting phase difference da.

A phase difference correction circuit 44 corrects the phase difference d outputted by the averaging circuit 42, by the correction of the error δ calculated by the error calculation circuit 43 and the calibration of other errors, and outputs the corrected phase difference d'.

A distance calculation circuit 45 converts the phase difference d' supplied from the phase difference correction circuit 44 into the subject distance data L, and outputs it. Thereafter, in accordance with the subject distance data, the focus of the camera lens is adjusted.

Figure 21:
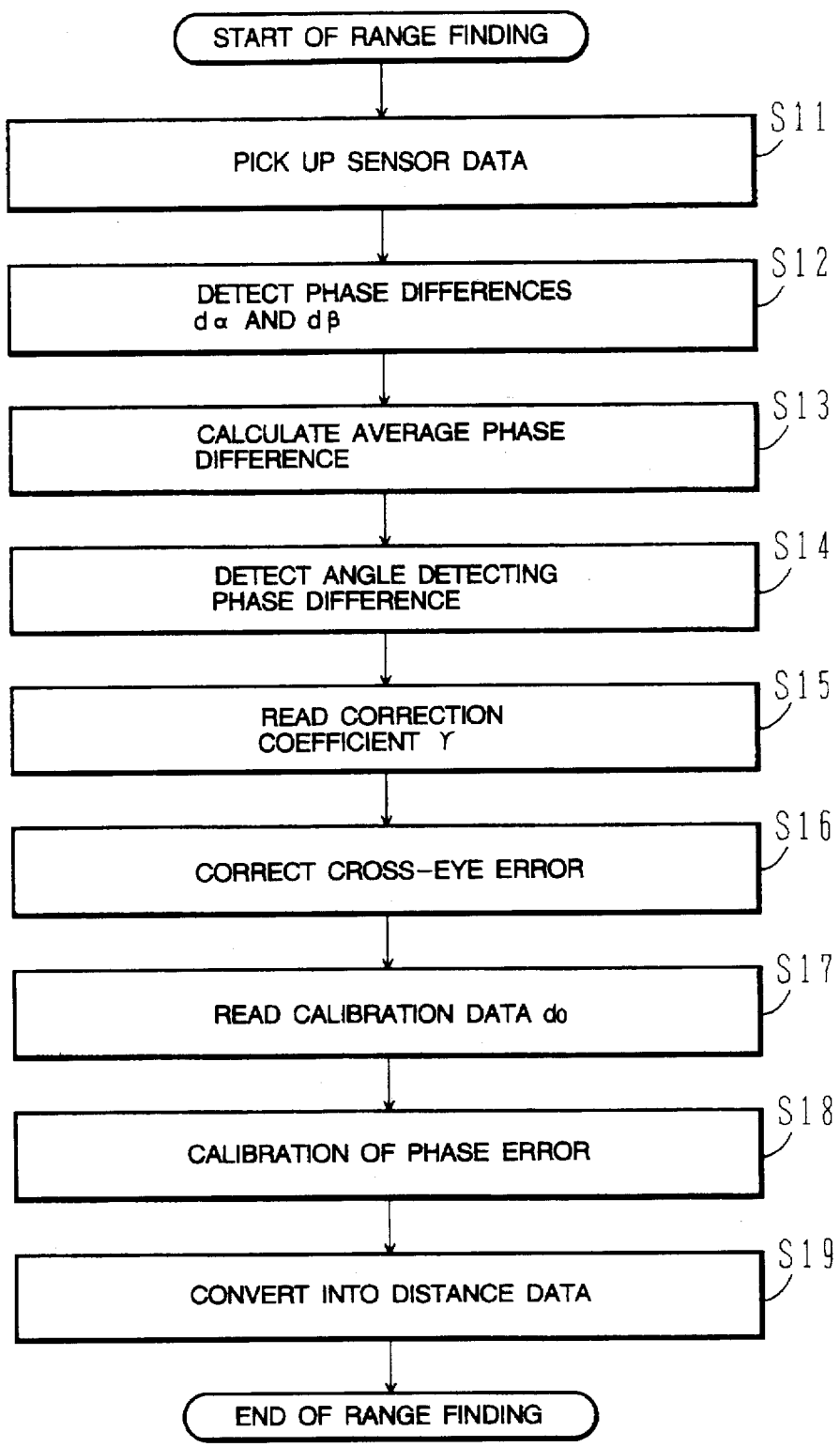
FIG. 21 is a flow chart illustrating the processes of range finding by the range finder of the second embodiment.

FIG. 21 is a flow chart illustrating the processes of range finding by the range finder.

At Step S11, sensor data is picked up from the four sensors 4L$\alpha$, 4R$\alpha$, 4L$\beta$, and 4R$\beta$ to detect images focussed on the sensors.

At Step S12, the phase difference d$\alpha$ and d$\beta$ are detected. The phase difference d$\alpha$ is calculated by a correlation calculation of the equation (1) between sensor data of the $\alpha$-pair sensors 4L$\alpha$ and 4R$\alpha$ and between sensor data of the $\beta$-pair sensors 4L$\beta$ and 4R$\beta$, and by an interpolation calculation of the equation (2) using the correlation calculation results.

At Step S13, an average value d (=dx+δ) is calculated by using the phase differences d$\alpha$ and d$\beta$ detected at Step S12. The error δ is generated by the subject angle $\phi$, and the phase difference dx is a phase difference corresponding to the subject distance.

At Step S14, the angle detecting phase difference d$\beta$-d$\alpha$) is detected. The angle detecting phase difference (d$\beta$-d$\alpha$) is a difference between the phase difference d$\alpha$ and d$\beta$.

At Step S15, the correction coefficient $\gamma$ is read. Since the correction coefficient $\gamma$ is stored in the adjustment register 33 (FIG. 11) during the adjustment of the range finder module, it is read therefrom.

At Step S16, the cross-eye error is corrected. The cross-eye error is the error δ caused by the subject angle $\phi$. The cross-eye error δ can be calculated by the equation (9):

$$\delta=\gamma \times (da/Ba)$$

The correction coefficient $\gamma$ was read at Step S15. The angle detecting base length Ba is a vertical distance between the sensors 4L$\alpha$ and 4L$\beta$ as shown in FIG. 17, and is stored in advance in the camera control microcomputer 32 (FIG. 11). The phase difference da is a half of the angle detecting phase difference detected at Step S14 by the equation (17):

$$da=(d\beta-d\alpha)/2$$

After the cross-eye error is calculated, the phase difference average value d (=dx+δ) detected at Step S13 is corrected by using the cross-eye error δ to obtain the phase difference dx.

At Step S17, the calibration data d0 is read from the adjustment register 33 (FIG. 11). The calibration data d0 was written in the adjustment register 33 during the adjustment of the range finder module.

At Step S18, the phase difference dx is calibrated by using the calibration data d0 and chart distance L0. The calibration data d0 was read at Step S17, and is a base phase difference (not containing the error δ) measured during the adjustment at the chart distance L0. The chart distance L0 is stored in advance in the camera control microcomputer 32 (FIG. 11).

The calibration data d0 is a phase difference measured during the adjustment at the chart distance L0. A theoretical phase difference dt at the chart distance L0 is given by the equation (3):

$$dt=(B\times f)/L0$$

An off-set value doff of the phase difference is a difference between the theoretical phase difference dt and the measured value d0:

$$doff=dt-d0$$

The phase difference doff is mainly generated by a difference of the characteristics of each optical system of a range finder module. Therefore, the same phase difference off-set doff is always generated in each of range finder module having the same characteristics.

Calibration for the phase difference dx is performed by adding the off-set value doff:

$$d'=dx+doff$$

At Step S19, a subject distance L is calculated by using the calibrated phase difference d'.

The conversion of the calibrated phase difference d' into the subject distance data L at Step S19 is performed by using the equation (3):

$$L=(B\times f)/d'$$

The base length B and lens/sensor distance f are stored in advance in the camera control microcomputer 32 (FIG. 11).

With the above processes, the distance data L is obtained and the range finding operation is terminated.

In the second embodiment, two types of phase difference detections are performed. One is a phase difference detection between the sensors 4Lα and 4Rα, and the other is a phase difference detection between the sensors 4Lβ and 4Rβ. The phase difference is detected in the above embodiment by the correlation calculation. Other methods such as described with FIG. 15 may be used for detecting a phase difference.

In the second embodiment, in obtaining the subject distance L, the four sensors 4Lα, 4Rα, 4Lβ, and 4Rβ are used. The phase differences (dα) between the sensors 4Lα and 4Rα and the phase differences (dβ) between the sensors 4Lβ and 4Rβ are detected, and the error δ generated by the subject angle φ is detected. Thereafter, the error δ of the phase differences (dα and dβ) is corrected to obtain a correct subject distance L.

The two phase differences are detected from the four sensors disposed in a crossed relation so that the subject distance can be measured at a high precision.

With the range finder of the second embodiment, the subject distance L can be measured at a high precision even if there is a displacement of the rotary angle Δθz, without the assembly position alignment of the range finder module at a high precision. Since the assembly position alignment is not always necessary to be performed at a high precision, the assembly cost can be reduced.

At Step 18 shown in FIG. 21, the phase difference detected during actual range finding is calibrated by using the base phase difference d0 at the adjustment chart distance L0. The base phase difference d0 may be a phase difference at an arbitrary chart distance.

A small error caused by a displacement of the rotary angle Δθy and a small error of a vertical pattern caused by a displacement of the rotary angle Δθz, may be corrected through calibration if necessary at Step S18 shown in FIG. 21, or may not be corrected by regarding them negligible.

In this embodiment, errors other than the cross-eye error are also corrected through calibration of the phase difference. These errors are often as small as negligible so that only the correction of the cross-eye error (Step S16 in FIG. 21) may be performed without the calibration of other phase difference errors (Step S18 in FIG. 21).

In the second embodiment, the four sensors 4Lα, 4Rα 4Lβ, and 4Rβ are used. This embodiment is applicable to three sensors.

Figure 22A:
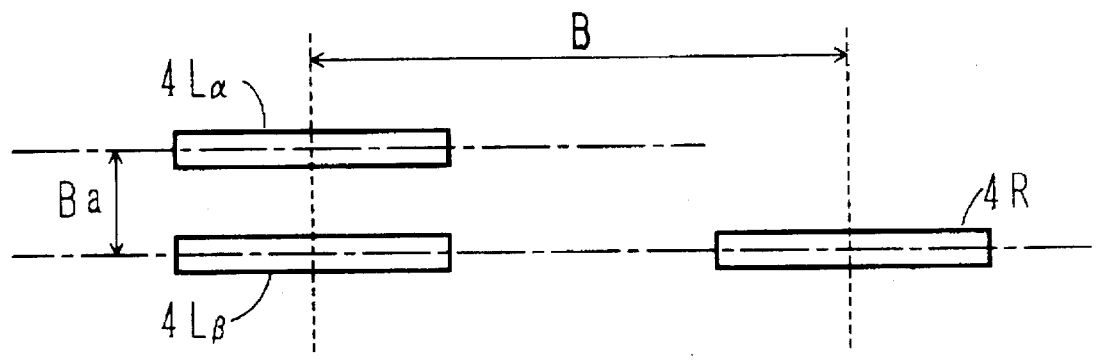
FIGS. 22A and 22B are schematic diagrams showing the structure of a sensor chip using three sensors.
Figure 22B:
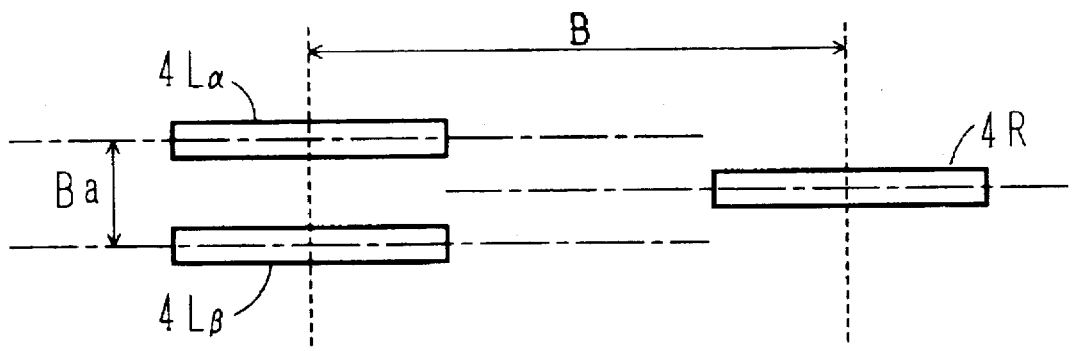

FIGS. 22A and 22B are schematic diagrams showing the structure of sensor chips using three sensors 4Lα, 4Lβ, and 4R. Two types of the sensor chip structures are shown in FIGS. 22A and 22B.

The sensor chip shown in FIG. 22A has two left sensors 4Lα and 4Lβ and one right sensor 4R. The two left sensors 4Lα and 4Lβ same as the above embodiment are used for focussing an image via the left lens, and one right sensor 4R is used for focussing an image via the right lens. The right sensor 4R provides the function of the two right sensors 4Rα and 4Rβ of the above embodiment. Instead of the single right sensor 4R, a single left sensor may be used for providing the function of the two left sensors of the above embodiment. A distance between the left sensors 4Lα and 4Lβ and the right sensor 4R is equal to the base length B. The right line sensor 4R and left line sensor 4Lβ are disposed on the same line. A vertical distance between the sensors 4Lα and 4Lβ is Ba.

Similar to the sensor chip shown in FIG. 22A, the sensor chip shown in FIG. 22B has two left sensors 4Lα and 4Lβ and one right sensor 4R. The position of the right sensor 4R is, however, different from the sensor chip shown in FIG. 22A.

A distance between the left sensors 4Lα and 4Lβ and the right sensor 4R is equal to the base length B. The right sensor 4R is disposed on a straight line in parallel to and between the left line sensors 4Lα and 4Lβ. A vertical distance between the sensors 4Lα and 4Lβ is Ba.

A method of range finding by using the three sensors of FIGS. 22A and 22B will be described. With the four sensors, the phase difference da is calculated at Step S16 shown in FIG. 21 by:

$$da=(d\beta-d\alpha)/2$$

With the three sensors, instead of this equation, the phase difference da is calculated by the following equation because (dβ−dα) itself corresponds to the phase difference da.

$$da=d\beta-d\alpha.$$

As compared to the four sensors, only the method of calculating the phase difference da is different in the case of the three sensors. The other methods of adjusting a range finding module and performing range finding are the same.

Next, a range finder according to the third embodiment of this invention will be described. The structure of the range finder module is the same as that of the second embodiment (FIG. 2, FIG. 17). The sensor chip has four sensors 4Lα, 4Lβ, 4Rα, and 4Rβ.

The subject distance L can be calculated from the above equation (3). The base length B and lens/sensor distance f are determined from the structure of the range finder module shown in FIG. 2. The phase difference d is a difference between two phase differences calculated from output data of the sensors 4L$\alpha$, 4L$\beta$, 4R$\alpha$, and 4R$\beta$ disposed in a crossed relation.

In calculating the two phase differences, one phase difference is detected between the sensors 4L$\alpha$ and 4R$\alpha$ through a correlation calculation, and the other phase difference is detected between the sensors 4L$\beta$ and 4R$\beta$ through a correlation calculation. After the two phase differences are calculated, the subject distance L is calculated by using a difference between the two phase differences. The details will be described later.

Similar to the first and second embodiments, the error $\Delta\theta z$ of the rotary angle $\theta z$ generated by the position alignment during the assembly of the range finder module has an important meaning. The cross-eye error is generated by this error $\Delta\theta z$, and cannot be anticipated if a pair of sensors only is used because it changes depending upon a subject. The range finding error to be caused by other position alignment errors, i.e., errors in the X-, Y- and Z-axes directions and errors of the rotary angles $\theta x$ and $\theta y$, can be anticipated or do not affect the subject distance, and can be easily corrected by using a default error.

In the third embodiment, the cross-eye error can be corrected in the following manner by using the four sensors 4L$\alpha$, 4L$\beta$, 4R$\alpha$, and 4R$\beta$.

Figure 23:
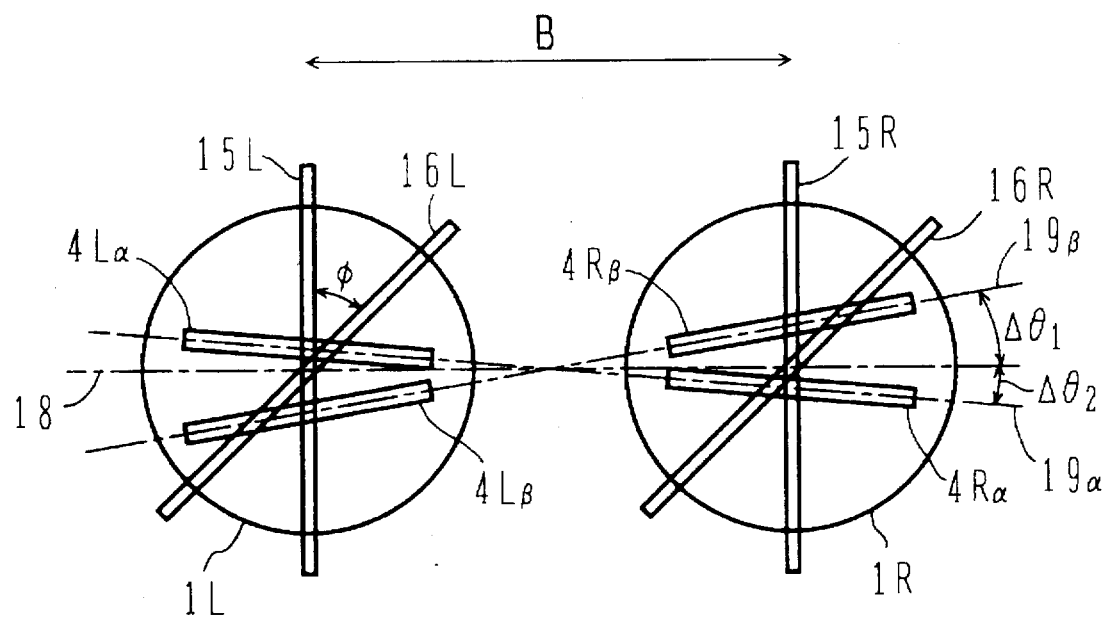
FIG. 23 is a schematic diagram showing an example of a sensor chip with four (two-pair) sensors 4Lα, 4Lβ, 4Rα, and 4Rβ according to a third embodiment.

FIG. 23 is a schematic diagram showing a disposal of four (two pairs) sensors 4L$\alpha$, 4L$\beta$, 4R$\alpha$, and 4R$\beta$.

The left sensors 4L$\alpha$ and 4L$\beta$ are positioned where an image of a subject is projected via the left lens 1L, whereas the right sensors 4R$\alpha$ and 4R$\beta$ are positioned where an image of a subject is projected via the right lens 1R.

A line 19$\alpha$ extends through the $\alpha$-pair sensors 4L$\alpha$ and 4R$\alpha$, and a line 19$\beta$ extends through the $\beta$-pair sensors 4L$\beta$ and 4R$\beta$. A line 18 extends through the optical axes of the lens 1L and 1R. An angle between the lines 19$\alpha$ and 18 is $\Delta\theta 2$ and has a negative value assuming that the counterclockwise direction is positive. An angle between the lines 19$\beta$ and 18 is $\Delta\theta 1$ and has a positive value.

Vertical patterns 15L and 15R are subject patterns focussed on the sensors 4L$\alpha$, 4L$\beta$, 4R$\alpha$, and 4R$\beta$, and vertical to the line 18 extending through the lens pair 1L and 1R. Oblique patterns 16L and 16R are subject patterns focussed on the sensors 4L$\alpha$, 4L$\beta$, 4R$\alpha$, and 4R$\beta$, and oblique at a slant angle $\phi$ relative to the direction normal or vertical to the line 18 extending through the lens pair 1L and 1R.

Figure 24:
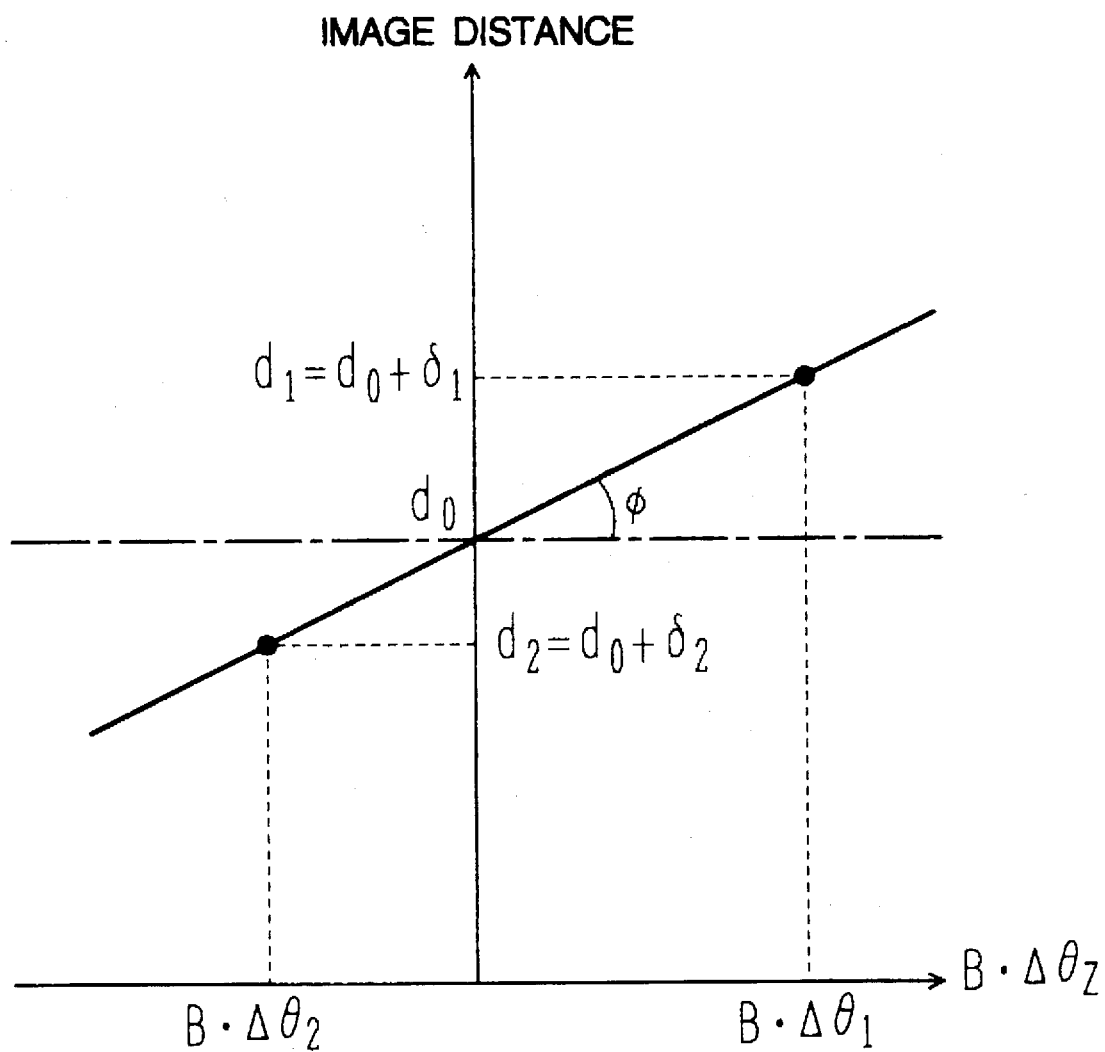
FIG. 24 is a graph showing the relationship between an adjustment error Δθz and a phase difference (image distance) error δ, using the two-pair sensors shown in FIG. 23.

FIG. 24 is a graph showing the relationship between the adjustment error $\Delta\theta z$ and the phase difference (image distance) error $\delta$ when two pairs of sensors shown in FIG. 23 are used.

The abscissa represents B$\times\Delta\theta z$, the value $\Delta\theta z$ takes a positive value assuming that the counter-clockwise direction in FIG. 23 is a positive value. The ordinate represents an image distance. From the equation (4'), the error $\delta$ is proportional to B$\times\Delta\theta z$ at a certain angle $\phi$. The image distance is d0 at the error $\delta$=0.

The angle $\Delta\theta 1$ is an angle shift of the line extending through the $\beta$-pair sensors 4L$\beta$ and 4R$\beta$ relative to the line 18. The image distance between the sensors 4L$\beta$ and 4R$\beta$ is d1=d0+$\delta$1. The value $\delta$1 is the image distance error.

The angle $\Delta\theta 2$ is an angle shift of the line extending through the $\alpha$-pair sensors 4L$\alpha$ and 4R$\alpha$ relative to the line 18. The image distance between the sensors 4L$\alpha$ and 4R$\alpha$ is d2=d0+$\delta$2. The value $\delta$2 is the image distance error.

The image distance d1 (=d0+$\delta$1) corresponds to a phase difference between images on the sensors 4L$\beta$ and 4R$\beta$, and the image distance d2 (=d0+$\delta$2) corresponds to a phase difference between images on the sensors 4L$\alpha$ and 4R$\alpha$. The true image distance d0 can be obtained by the following interior division point equation (18). Namely, an interior division point (0, d0) is obtained between two points ($\Delta\theta 1$, d1) and ($\Delta\theta 2$, d2), where $\Delta\theta 1$ takes a positive value and $\Delta\theta 2$ takes a negative value.

$$d0=(\Delta\theta 1\times d2-\Delta\theta 2\times d1)/(\Delta\theta 1-\Delta\theta 2) \quad (18)$$

Since the angle $\theta 0$ between the two sensor pairs shown in FIG. 23 is given by $\Delta\theta 1-\Delta\theta 2$, the equation (18) can be rewritten into the following equation (19).

$$d0=\{\Delta\theta 1\times d2-(\Delta\theta 1-\Delta\theta 2)\times d1\}/\theta 0 \quad (19)$$

The angle $\Delta\theta 1$ is a value measured during the adjustment of the range finder module. A method of measuring this angle will be later described. The angle $\theta 0$, which will be later described with reference to FIG. 25, has a value determined by the design of the range finder module. Therefore, it is easier to calculate $\Delta\theta 1$ and $\theta 0$ by the equation (19) than to calculate two values $\Delta\theta 1$ and $\Delta\theta 2$ by the equation (18).

In the above description, the true image distance d0 is obtained by interior interpolation. This interior interpolation is performed when the true image distance d0 is between the two image values d1 (=d0+$\delta$1) and d2 (=d0+$\delta$2), i.e., $|\Delta\theta 1|\leq\theta 0$.

The true image distance d0 can be obtained also by the exterior interpolation instead of the interior interpolation. This exterior interpolation is performed when the true image distance d0 is not between the two image values d1 (=d0+$\delta$1) and d2 (=d0+$\delta$2), i.e., $|\Delta\theta 1|>\theta 0$. Therefore, the straight line 18 shown in FIG. 23 is not necessarily between the lines 19$\alpha$ and 19$\beta$.

The true image distance d0 obtained by the interior interpolation has a smaller error than by the exterior interpolation. Although the subject angle $\phi$ changes with each subject, the smaller the angle $\phi$, and the more precisely the image distance d0 can be obtained.

Figure 25:
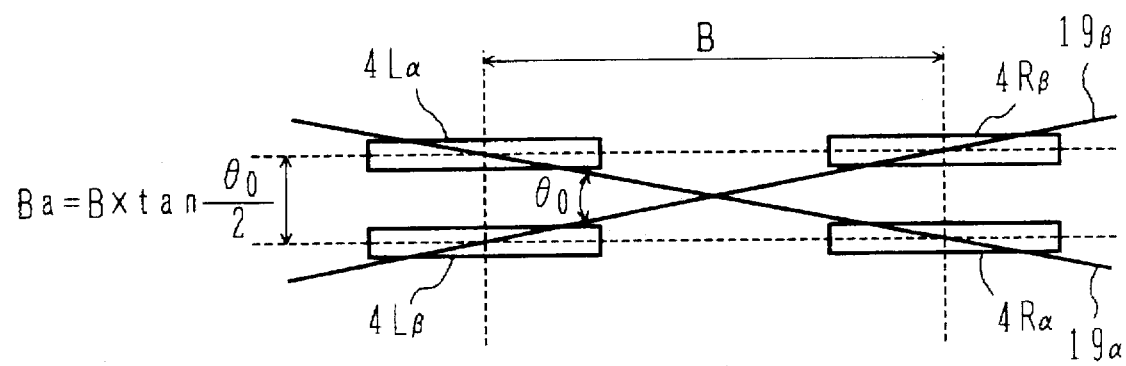
FIG. 25 is a schematic diagram illustrating how an angle θ0 is calculated.

FIG. 25 is a schematic diagram illustrating the method of calculating the angle $\theta 0$. The angle $\theta 0$ is determined from the design of the range finder module.

The sensors 4L$\alpha$ and 4R$\beta$ are disposed on generally the same straight line, and the sensors 4L$\beta$ and 4R$\alpha$ are disposed on generally the same straight line. The angle $\theta 0$ does not change between the disposal of the sensors as shown in FIG. 25 and the disposal of the sensors as shown in FIG. 23 wherein the $\alpha$-pair sensors 4L$\alpha$ and 4R$\alpha$ are disposed generally on the same straight line and the $\beta$-pair sensors 4L$\beta$ and 4R$\beta$ are disposed generally on the same straight line. This reason will be later described with reference to FIG. 26. A method of calculating the angle $\theta 0$ will be described in the following.

A distance between optical axes of the lenses corresponding to the left sensors 4L$\alpha$ and 4L$\beta$ and the right sensors 4R$\alpha$ and 4R$\beta$ is B. The straight line 19$\alpha$ extends through the sensors 4L$\alpha$ and 4R$\alpha$, and the straight line 19$\beta$ extends through the sensors 4L$\beta$ and 4R$\beta$.

The angle $\theta 0$ is an angle between the lines 19$\alpha$ and 19$\beta$. A distance Ba between the left sensors 4L$\alpha$ and 4L$\beta$ in the Y-axis direction is approximated to:

$$Ba=B\times\tan[\theta 0/2] \quad (20)$$

The distance between the right sensors 4R$\alpha$ and 4R$\beta$ is also the same.

Therefore, if the design values of the base length B and sensor distance Ba are known, the angle θ0 can be calculated from the following equation (21).

$$\theta 0 = 2 \times \tan^{-1}[Ba/B] \quad (21)$$

Since the angle θ0 can be calculated in the above manner at the time of design, the image distance (phase difference) d0 without any error can be calculated by the equation (19) after the rotary angle Δθ1 is measured, and the correct subject distance L can be obtained. A method of measuring the angle Δθ1 in the equation (19) will be later described.

Figure 26:
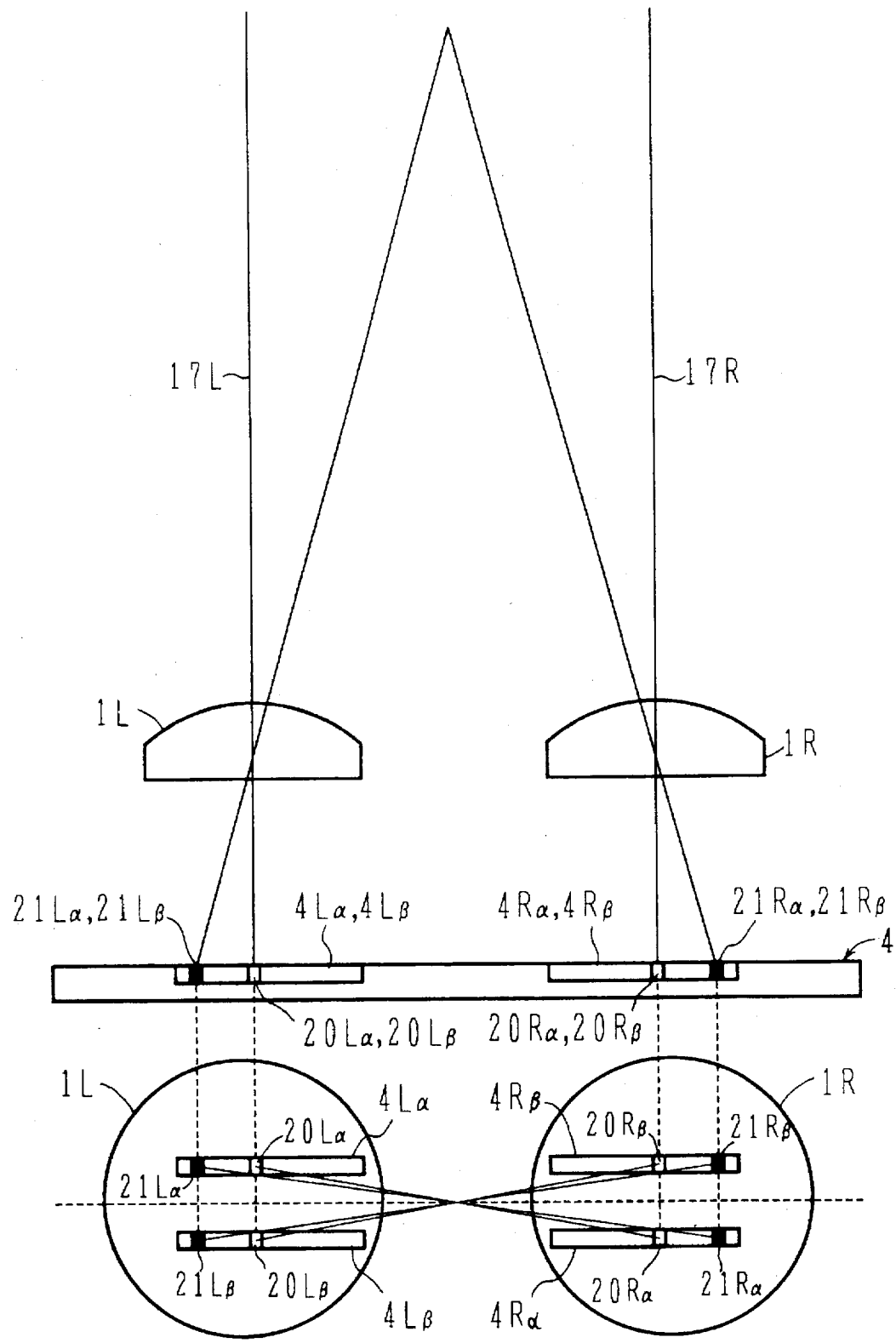
FIG. 26 is a schematic diagram illustrating the reason why two-pair sensors can be disposed in parallel.

FIG. 26 is a schematic diagram used for explaining the reason why the two sensor pairs can be disposed in parallel.

The true image distance d0 is obtained by the equation (19) if the two sensor pairs are radially disposed as shown in FIG. 23. In the following, the description is directed to the fact that the true image distance d0 can also be obtained by the equation (19) even if the two sensor pairs are disposed in parallel.

Two examples of a subject at an infinite position and a subject at a near position will be described. If the subject is at the infinite position, light is incident along the optical axes of the lenses 1L and 1R upon the 20Lα and 20Lβ positions on the left sensors 4Lα and 4Lβ and upon the 20Rα and 20Rβ positions on the right sensors 4Rα and 4Rβ.

If the subject is at the near position, light is incident along the optical axes of the lenses 1L and 1R upon the 21Lα and 21Lβ positions on the left sensors 4Lα and 4Lβ and upon the 21Rα and 21Rβ positions on the right sensors 4Rα and 4Rβ.

The angle θ0 between the sensor pairs will be discussed for the above two cases. If the subject is at the infinite position, the angle θ0 is an angle between the straight line extending through 20Lα and 20Rα and the straight line extending through 20Lβ and 20Rβ. If the subject is at the near position, the angle θ0 is an angle between the straight line extending through 21Lα and 21Rα and the straight line extending through 21Lβ and 21Rβ.

It can be understood that the angle θ0 for the subject at the infinite position is larger than at the near position. The angle θ0 changes slightly depending upon the subject distance.

However, the ratio of θ0 to Δθ1 does not change. Therefore, as appreciated from the equation (19), the true image distance (phase difference) d0 is not affected. Even if the sensor pairs are disposed in parallel as shown in FIG. 25 without disposing them radially, the true image distance (phase difference) d0 can therefore be calculated by the equation (19).

Figure 27:
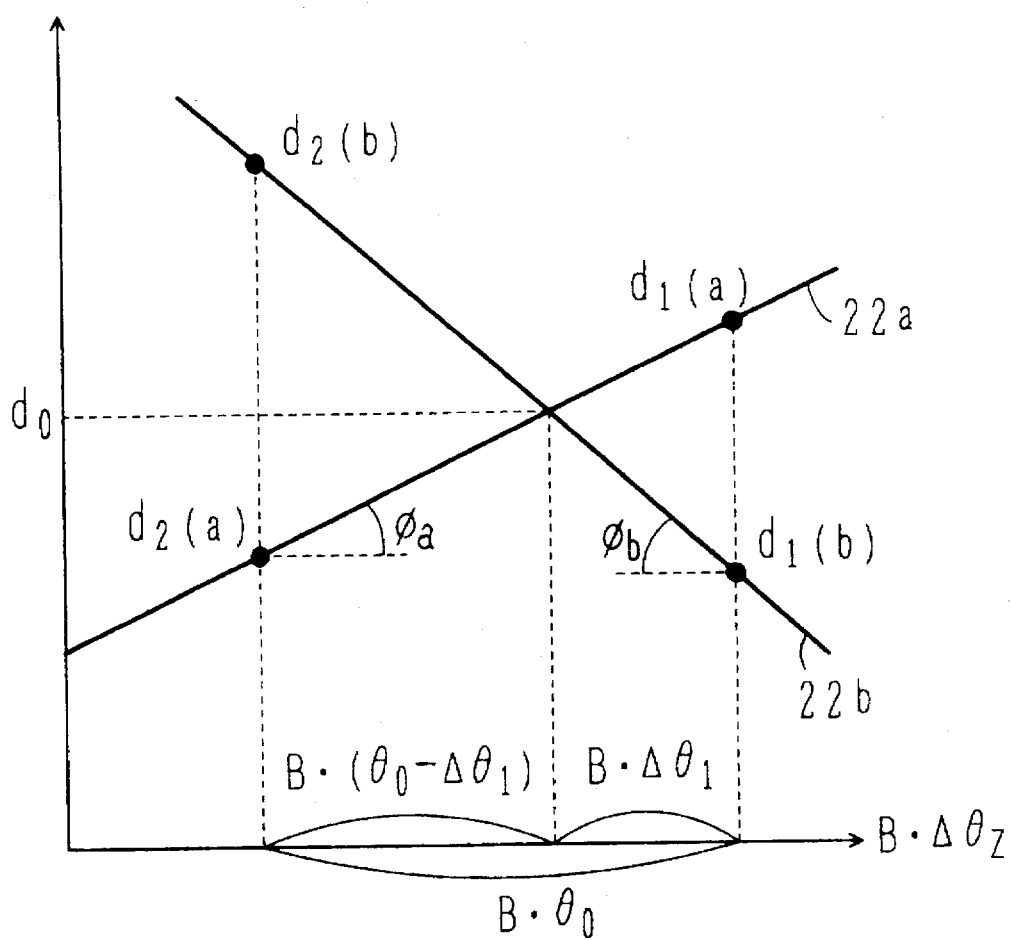
FIG. 27 is a graph showing an image distance for angles Φa and Φb.

FIG. 27 is a graph showing the image distances for the chart at the angle φa and the chart at the angle φ. The abscissa represents B×Δθz, and the ordinate represents the image distance. The angle φa takes the positive value, and the angle φb takes the negative value.

The angle Δθ1 is an angle between the straight line 19β extending through the β-pair sensors 4Lβ and 4Rβ and the straight line 18 extending through the lens pair, as shown in FIG. 23. The angle θ0−Δθ1 (=−Δθ2) is an angle between the straight line 19α extending through the α-pair sensors 4Lα and 4Rα and the straight line 18 extending through the lens pair.

A method of calculating the angle Δθ1 will be described. In order to calculate the angle Δθ1, it is necessary for measuring the image distances for the two charts at the angle φa and at the angle φb.

By using the adjustment charts at the angle φa and at the angle φb, the image distance on the α-pair sensors 4Lα and 4Rα and the image distance on the β-pair sensors 4Lβ and 4Rβ are measured.

The image distance on the β-pair sensors 4Lβ and 4Rβ measured by using the chart at the angle φa is d1(a), and that on the α-pair sensors 4Lα and 4Rα is d2(a). A straight line 22a interconnects the two image distance points d1(a) and d2(a).

The image distance on the sensors 4Lβ and 4Rβ measured by using the chart at the angle φb is d1(b), and that on the sensors 4Lα and 4Rα is d2(b). A straight line 22b interconnects the two image distance points d1(b) and d2(b).

As appreciated from the equation (4'), the straight line 22a has a positive slant relative to B×Δθz because the chart angle φ2 has a positive value (a slant angle in the counter-clockwise direction in FIG. 23). The straight line 22b has a negative slant relative to B×Δθz because the chart angle φb has a negative value (a slant angle in the clockwise direction in FIG. 23).

If the rotary angle displacement Δθz is 0, there is no error of the image distance and the lines 22a and 22b intersect each other. The image distance at Δθz=0 is d0. The angle Δθ1 can be defined by the following equation (22) by using the formulae of the two lines 22a and 22b.

$$\Delta\theta 1 = [\theta 0 \times \{d1(a) - d1(b)\}] / [\{d1(a) - d2(a)\} - \{d1(b) - d2(b)\}] \quad (22)$$

By using this equation after the four image distances are measured, the angle Δθ1 can be calculated.

The angle Δθ1 is measured during the adjustment of the range finder module before the actual range finding is performed. During the adjustment of the range finder module, the four image distances d1(a), d2(a), d1(b), and d2(b) are measured and the angle Δθ1 is calculated by the equation (22).

During the actual range finding, an image distance without the cross-eye error can be calculated by the equation (19) by using the previously calculated angle Δθ1. The subject distance L is calculated in accordance with the obtained image distance.

During the adjustment of the range finder module prior to the actual range finding, in addition to the measurement of the angle Δθ1, the image distance d0 at the base chart distance is obtained. The base image distance d0 becomes necessary when errors other than the cross-eye error are calibrated during the actual range finding.

The image distance d0 can be calculated by the equation (19) or calculated by using the four image distances. As shown in the graph of FIG. 27, the image distance d0 without the cross-eye error is at the cross point between the lines 22a and 22b. The image distance d0 can be given by the following equation (23) by using the two formulae of the lines 22a and 22b.

$$d0 = \{d1(a) \times d2(b) - d1(b) \times d2(a)\} / [\{d1(a) - d2(a)\} - \{d1(b) - d2(b)\}] \quad (23)$$

The base image distance d0 is calculated by this equation during the adjustment of the range finder module, and is used for calibrating the phase difference during the actual range finding.

Next, a method of adjusting the range finder module of the third embodiment will be described with reference to FIG. 11. The adjustment of the range finder module is performed after the module is assembled and before it is shipped.

During the adjustment of the range finder module, the angle Δθ1 in the equation (22) and the base image distance d0 in the equation (23) are measured. Different from the first and second embodiments, the correction coefficient γ is not required to be measured.

The camera control microcomputer 32 can perform various control operations, and stores constants measured beforehand such as a base length B and an adjustment chart distance L0.

First, the camera control microprocessor 32 supplies the motor rotation control signal CTL to the chart rotating motor 35 via the range finder module adjusting apparatus 34. Upon reception of the motor rotation control signal CTL, the chart rotating motor 35 rotates and stops at the angle φb of the chart 36, for example, at the angle of −60°.

The range finder module 10 takes the image of the chart 36 at the angle φb=−60°, and supplies sensor data DT of the range finding sensors 4Lα, 4Rα, 4Lβ, and 4Rβ to the camera control microcomputer 32. The camera control microcomputer 32 performs a correlation calculation by using the sensor data DT, and supplies the phase difference data d1(b) between the β-pair of sensors 4Lβ and 4Rβ and the phase difference data d2(b) between the α-pair sensors 4Lα and 4Rα to the range finder module adjusting apparatus 34. The range finder module adjusting apparatus 34 loads the supplied phase difference data d1(b) and d2(b) for the preparation of a later calculation of the angle Δθ1 and image distance d0.

Next, the camera control microcomputer 32 instructs the range finder module adjusting apparatus 34 and chart rotating motor 35 to set the angle φa of the chart 36, for example, to 60°. The range finder module takes the image of the chart 36 at the angle φa=60°, and supplies sensor data DT of the range finding sensors 4Lα, 4Rα, 4Lβ, and 4Rβ to the camera control microcomputer 32. The camera control microcomputer 32 performs a correlation calculation by using the sensor data DT to calculate the phase difference data d1(a) between the β-pair sensors 4Lβ and 4Rβ and the phase difference data d2(a) between the α-pair sensors 4Lα and 4Rα, and supplies them to the range finder module adjusting apparatus 34. The range finder module adjusting apparatus 34 loads the supplied phase difference data d1(a) and d2(a).

Thereafter, the range finder module adjusting apparatus 34 calculates the angle Δθ1 by using the four phase difference data d1(a), d2(a), d1(b), and d1(b) by the equation (22), and calculates the image distance d0 by the equation (23). The calculated angle Δθ1 and image distance d0 are loaded in the adjustment register 33. The correction coefficient γ is not necessary to be loaded.

In the above manner, by calculating the four phase differences, the angle Δθ1 and image distance d0 can be loaded in the adjustment register 33. After the adjustment of the range finder module, the angle Δθ1 and image distance d0 are used for actual range finding.

Figure 28:
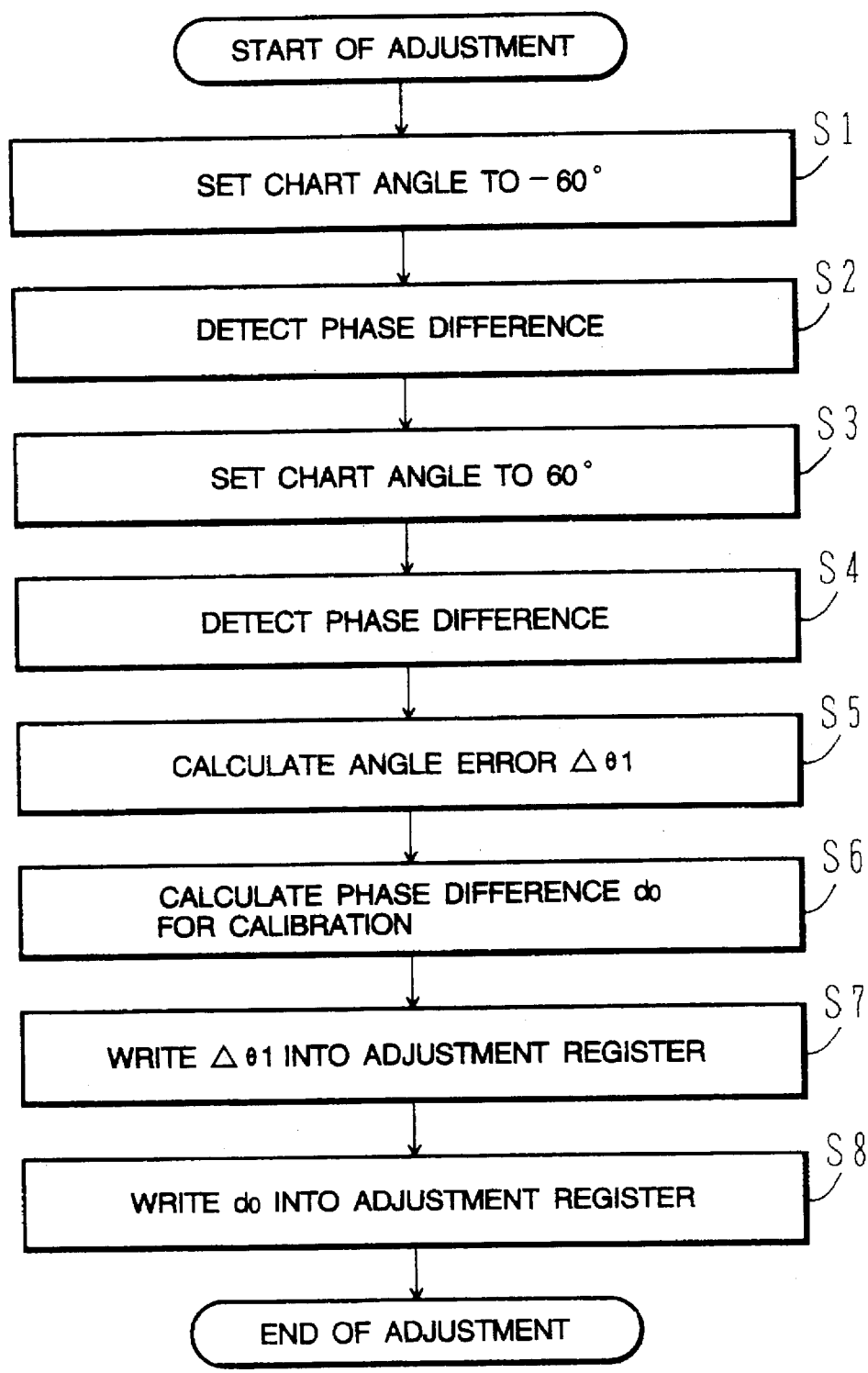
FIG. 28 is a flow chart illustrating the processes of adjusting a range finder module.

FIG. 28 is a flow chart illustrating the processes of adjusting the range finder module. The chart 36 and other devices shown in FIG. 11 are used for the adjustment of the range finder module.

At Step S1, the angle of the chart 36 is set to −60°. With this setting, the chart 36 can be used as a subject pattern having a negative slant φb.

At Step S2, the phase differences d1(b) and d2(b) are detected by using the chart 36 at the angle of −60°. The phase difference d1(b) is detected from images of the chart 36 (angle φb=−60°) focussed on the β-pair sensors 4Lβ and 4Rβ of the range finder module 10 (FIG. 11). The phase difference d2(b) is detected from images of the chart 36 (angle φb=−60°) focussed on the α-pair sensors 4Lα and 4Rα.

At Step S3, the angle of the chart 36 is set to 60°. With this setting, the chart 36 can be used as a subject pattern having a positive slant φa.

At Step S4, the phase differences d1(a) and d2(a) are detected by using the chart 36 at the angle of 60°.The phase difference d1(a) is detected from images of the chart 36 (angle φa=60°) focussed on the β-pair sensors 4Lβ and 4Rβ.

The phase difference d2(a) is detected from images of the chart 36 (angle φa=60°) focussed on the a-pair sensors 4Lα and 4Rα.

At Step S5, the angle error Δθ1 is calculated by the equation (22) by using the four phase differences d1(b), d2(b), d1(a), and d2(a) detected at Steps 2 and 4.

At Step S6, the phase difference data d0 for calibration is calculated by the equation (23) by using the four phase differences d1(b), d2(b), d1(a), and d2(a).

At Step S7, the angle error Δθ1 calculated at Step S5 is loaded in the adjustment register 33 (FIG. 11). The angle error Δθ1 is used for calculating a phase difference during actual range finding after the adjustment.

At Step S8, the phase difference data d0 for calibration calculated at Step S6 is loaded in the adjustment register 33 (FIG. 11). The phase difference data d0 is used for calibrating a phase difference during actual range finding after the adjustment.

With the above processes, the adjustment of the range finder module is completed. With this adjustment, the angle error Δθ1 and phase difference data d0 for calibration are written in the adjustment register 33.

In the above, positive (60°) and negative (−60°) two chart angles are used. The angles are not limited only to two positive and negative angles, but other pairs of two different angles may also be used. The angle difference is preferably large so as to obtain a high precision.

Next, the control during range finding will be described with reference to FIG. 11. For range finding, the chart 36, chart rotating motor 35, and range finder module adjusting apparatus 34 are not needed, but only the camera with the range finder module 10 is used. The camera is directed toward a subject to measured the subject distance. The range finder module 10 focusses the image of the subject, and supplies sensor data DT of the four sensors 4Lα, 4Lβ, 4Rα, and 4Rβ to the camera control microcomputer 32. This microcomputer 32 calculates the phase differences d1 and d2 by using the sensor data DT. The phase difference d1 is detected from the β-pair sensors 4Lβ and 4Rβ, and the phase difference d2 is detected from the α-pair sensors 4Lα and 4Rα. The error including the cross-eye error δ of the calculated phase difference is corrected.

The corrected phase difference d is calculated by using the calculated phase differences d1 and d2 from the equation (19):

$$d=\{\Delta\theta1 \times d2 - (\theta0 - \Delta\theta1) \times d1\}/\theta0$$

The corrected phase difference d is calibrated by using the base phase difference stored in the adjustment register 33 and the chart distance L0 stored in the camera control microcomputer 32, and converted into a subject distance L. The phase difference is calibrated so as to correct the phase difference errors generated during the assembly of the range finder module excluding the rotary angle θz.

The subject distance data L is supplied to the lens drive motor controller 31. In accordance with this subject distance data L, the controller 31 drives the motor (not shown) to adjust the focus of the camera lens. The details of range finding will be described.

Figure 29:
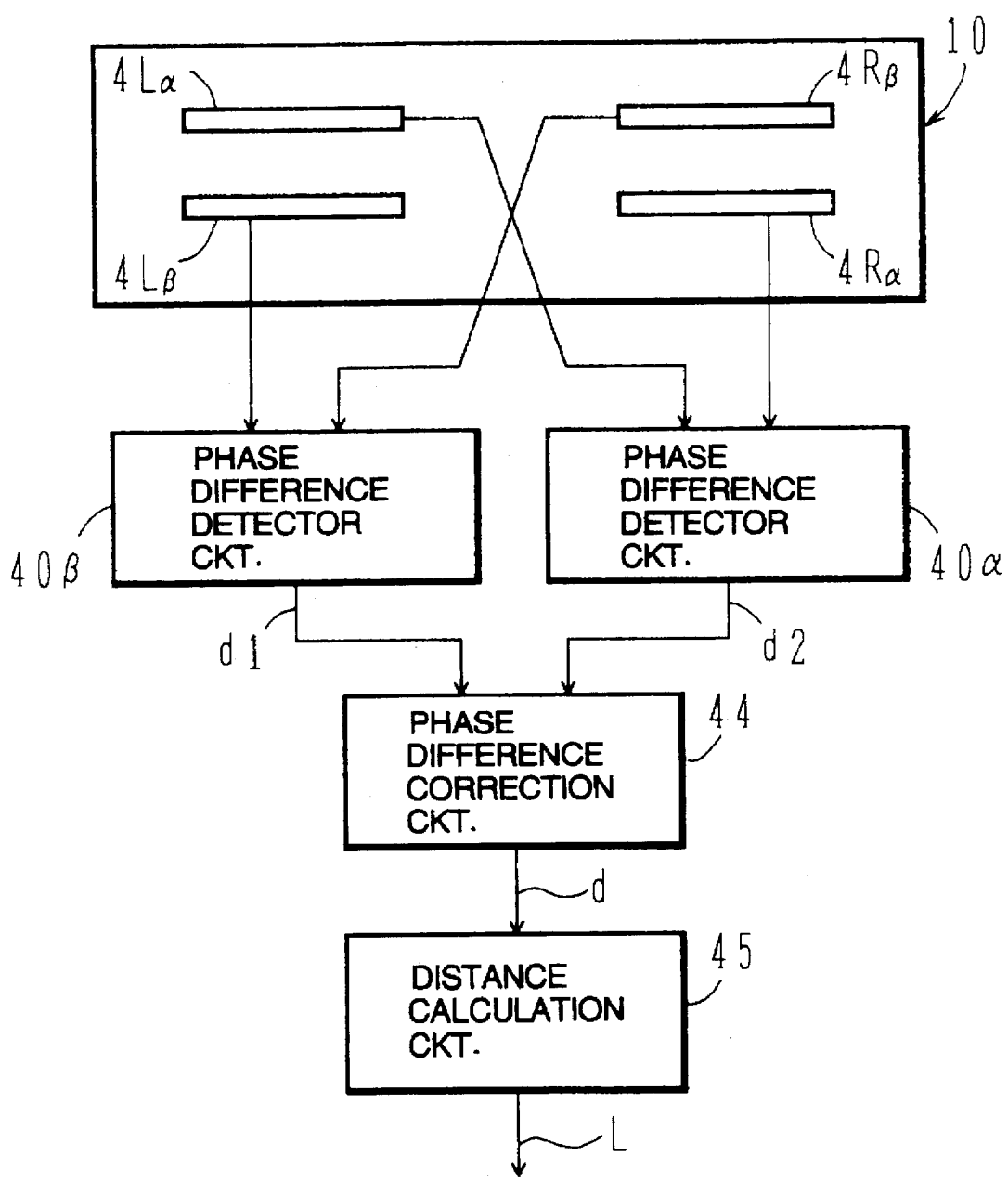
FIG. 29 is a block diagram illustrating the range finding operation by the range finder of the third embodiment.

FIG. 29 is a block diagram illustrating the processes to be performed by the camera control microcomputer 32 shown in FIG. 11.

The range finder module 10 has two pairs of sensors 4Lα and 4Rα and 4Lβ and 4Rβ. A phase difference detector circuit 40α performs a correlation calculation between images focussed on the left sensor 4Lα and the right sensor 4Rα to detect a phase difference d2. A phase difference detector circuit 40β performs a correlation calculation between images focussed on the left sensor 4Lβ and the right sensor 4Rβ to detect a phase difference d1. The phase differences d1 and d2 are supplied to a phase difference correction circuit 44.

The phase difference correction circuit 44 calculates the phase difference d without the cross-eye error by using the phase differences d1 and d2. The calculated phase difference d is supplied to a distance calculation circuit 45.

The distance calculation circuit 45 calibrates the errors other than the cross-eye error and outputs the resultant phase difference d, and converts the calibrated phase difference into the subject distance data, and outputs it. Thereafter, in accordance with the subject distance data, the focus of the camera lens is adjusted.

Figure 30:
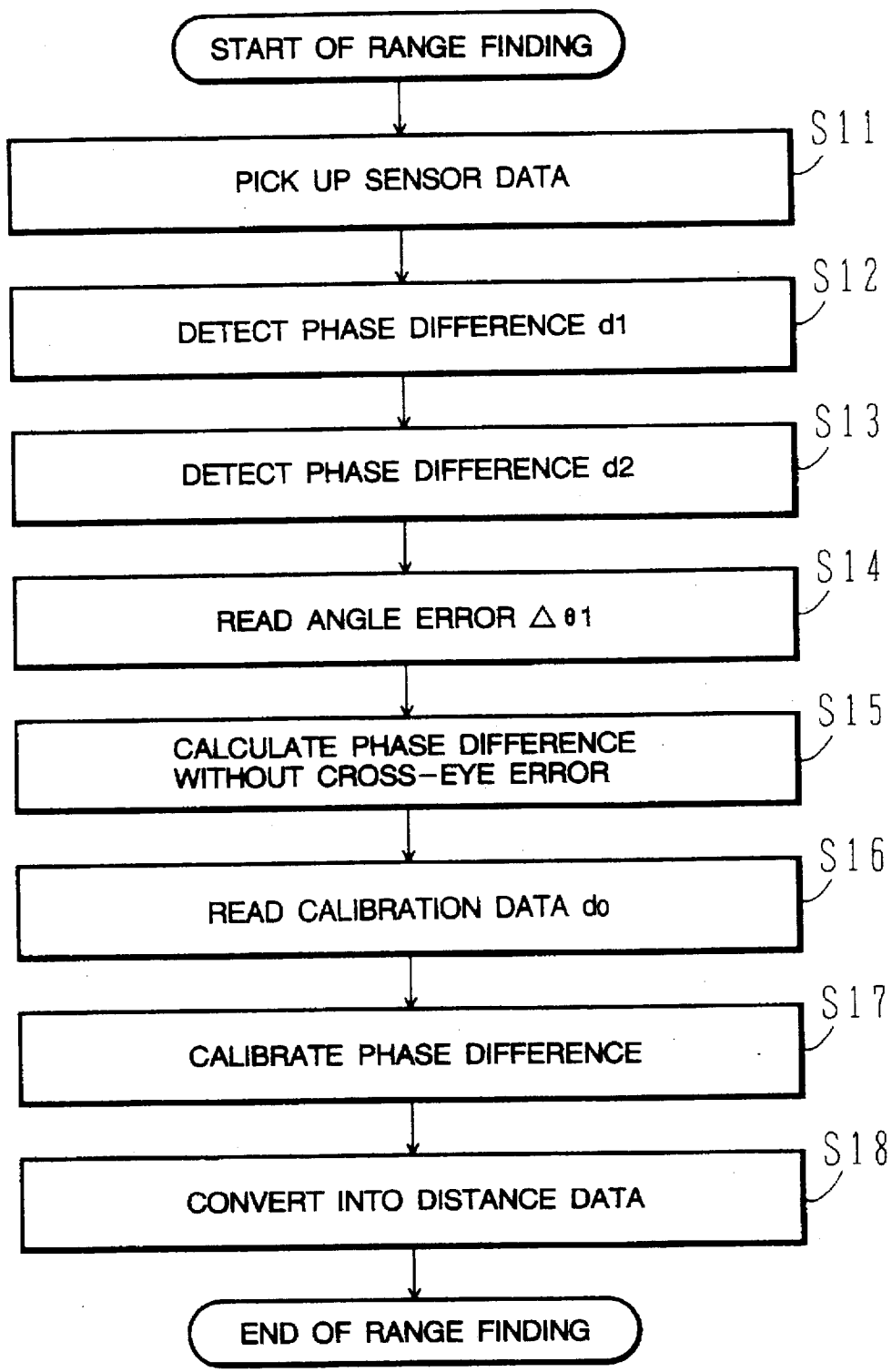
FIG. 30 is a flow chart illustrating the processes of range finding by the range finder of the third embodiment.

FIG. 30 is a flow chart illustrating the processes of range finding by the range finder.

At Step S11, sensor data is picked up from the four sensors 4Lα, 4Rα, 4Lβ, and 4Rβ to detect images focussed on the sensors.

At Step S12, the phase difference d1 is detected. The phase difference d1 is calculated by a correlation calculation of the equation (1) between sensor data of the β-pair sensors 4Lβ and 4Rβ and by an interpolation calculation of the equation (2) using the correlation calculation results.

At Step S13, the phase difference d2 is detected. The phase difference d2 is calculated by a correlation calculation of the equation (1) between sensor data of the α-pair sensors 4Lα and 4Rα and by an interpolation calculation of the equation (2) using the correlation calculation results.

At Step S14, the angle error $\Delta\theta 1$ is read from the adjustment register 33 (FIG. 11). Since the angle error $\Delta\theta 1$ correction coefficient γ is stored in the adjustment register 33 (FIG. 11) during the adjustment of the range finder module, it is read therefrom.

At Step S15, the phase difference d without the cross-eye error is calculated. The cross-eye error is the error δ caused by the subject angle φ. The phase difference d without the cross-eye error is calculated by the equation (19):

$$d = \{\Delta\theta 1 \times d2 - (\theta 0 - \Delta\theta 1) \times d1\}/\theta 0$$

where the angle θ0 is an angle between the line extending through the α-pair sensors 4Lα and 4Rα and the line extending through the β-pair sensors 4Lβ and 4Rβ in FIG. 25, is determined at the time of designing the range finder module, and stored in the camera control microcomputer 32 (FIG. 11). The angle θ0 is calculated by using the lengthes B and Ba from the equation (21):

$$\theta 0 = 2 \times \tan^{-1}[Ba/B]$$

At Step S16, the calibration data d0 is read from the adjustment register 33 (FIG. 11). The calibration data d0 was written in the adjustment register 33 during the adjustment of the range finder module.

At Step S17, the phase difference d is calibrated by using the calibration data d0 and chart distance L0. The calibration data d0 was read at Step S16, and is a base phase difference (not containing the error δ) measured during the adjustment at the chart distance L0. The chart distance L0 is stored in advance in the camera control microcomputer 32 (FIG. 11).

The calibration data d0 is a phase difference measured during the adjustment at the chart distance L0. A theoretical phase difference dt at the chart distance L0 is given by the equation (3):

$$dt = (B \times f)/L0$$

An off-set value doff of the phase difference is a difference between the theoretical phase difference dt and the measured value d0:

$$doff = dt - d0$$

The phase difference doff is mainly generated by a difference of the characteristics of each optical system of a range finder module. Therefore, the same phase difference off-set doff is always generated in each of range finder module having the same characteristics.

Calibration for the phase difference dx is performed by adding the off-set value doff:

$$d' = dx + doff$$

At Step S18, a subject distance L is calculated by using the calibrated phase difference d'. The conversion of the calibrated phase difference d' into the subject distance data L at Step S18 is performed by using the equation (3):

$$L = (B \times f)/d'$$

The base length B and lens/sensor distance f are stored in advance in the camera control microcomputer 32 (FIG. 11).

With the above processes, the distance data L is obtained and the range finding operation is terminated.

In the third embodiment, two types of phase difference detections are performed. One is a phase difference detection between the sensors 4Lα and 4Rα and the other is a phase difference detection between the sensors 4Lβ and 4Rβ. The phase difference is detected in the above embodiment by the correlation calculation. Other methods such as described with FIG. 15 may be used for detecting a phase difference.

In the third embodiment, in obtaining the subject distance L, the four sensors 4Lα, 4Rα, 4Lβ, and 4Rβ are used. The phase differences d1 and d2 between the sensors 4Lβ and 4Rβ and between the sensors 4Lα and 4Rα are calculated, and the cross-eye error generated by the subject angle φ is corrected to obtain a correct subject distance L.

With the range finder of the third embodiment, the subject distance L can be measured at a high precision even if there is a displacement of the rotary angle Δθz, without the assembly position alignment of the range finder module at a high precision. Since the assembly position alignment is not always necessary to be performed at a high precision, the assembly cost can be reduced.

In the second embodiment, the four sensors 4Lα, 4Rα, 4Lβ, and 4Rβ are used. This embodiment is applicable to three sensors.

Figure 31A:
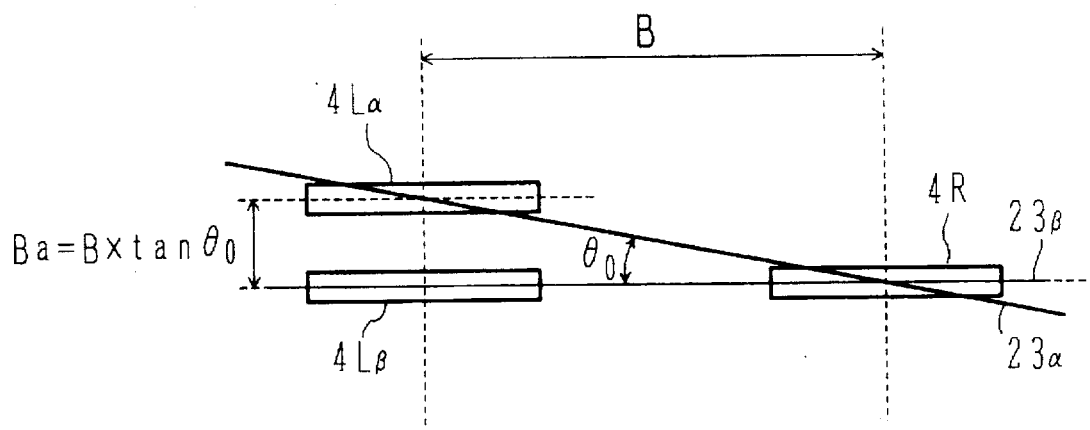
FIGS. 31A and 31B are schematic diagram showing the structure of a sensor chip using three sensors 4Lα, 4Lβ, and 4R. 4Rα, and 4Rβ according to the third embodiment.
Figure 31B:
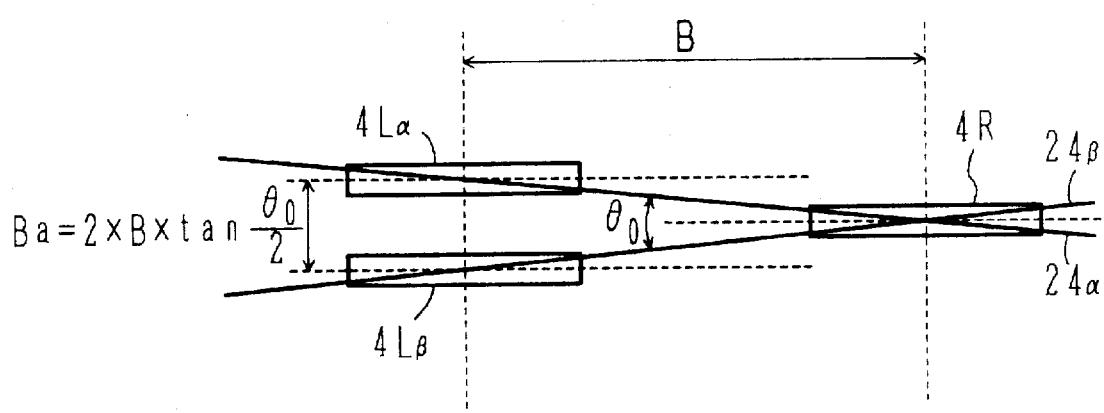

FIGS. 31A and 31B are schematic diagrams showing the structure of sensor chips using three sensors 4Lα, 4Lβ and 4R. With the three sensors, a method of calculating the rotary angle θ0 different from the previous method (refer to FIG. 25) is used. In the following, the rotary angle calculation method will be described.

The sensor chip shown in FIG. 31A has two left sensors 4Lα and 4Lβ and one right sensor 4R. The two left sensors 4Lα and 4Lβ same as the above embodiment are used for focussing an image via the left lens, and one right sensor 4R is used for focussing an image via the right lens. The right sensor 4R provides the function of the two right sensors 4Rα and 4Rβ of the above embodiment. Instead of the single right sensor 4R, a single left sensor may be used for providing the function of the two left sensors of the above embodiment. A distance between the left sensors 4Lα and 4Lβ and the right sensor 4R is equal to the base length B. The right line sensor 4R and left line sensor 4Lβ are disposed on the same line 23β. The straight line 23β extends through the right line sensor 4R and left line sensor 4Lβ. A straight line 23α extends through the left sensor 4Lα and right sensor 4R at their center points.

The angle θ0 is an angle between the lines 23α and 23β. A vertical distance Ba between the sensors 4Lα and 4Lβ is given by:

$$Ba = B \times \tan\theta 0$$

Therefore, the angle $\theta 0$ is given by:

$$\theta 0 = \tan^{-1}[Ba/B]$$

In calculating the angle $\theta 0$, the above equation is used instead of the equation (21).

Similar to the sensor chip shown in FIG. 31A, the sensor chip shown in FIG. 31B has two left sensors $4L\alpha$ and $4L\beta$ and one right sensor 4R. The position of the right sensor 4R is, however, different from the sensor chip shown in FIG. 31A.

A distance between the left sensors $4L\alpha$ and $4L\beta$ and the right sensor 4R is equal to the base length B. The right sensor 4R is disposed on a straight line in parallel to and between the left line sensors $4L\alpha$ and $4L\beta$. A straight line $24\alpha$ extends through the left sensor $4L\alpha$ and right sensor 4R at their center points. A straight line $24\beta$ extends through the left sensor $4L\beta$ and right sensor 4R at their center points.

The angle $\theta 0$ is an angle between the lines $24\alpha$ and $24\beta$. A vertical distance Ba between the sensors $4L\alpha$ and $4L\beta$ is given by:

$$Ba = 2 \times B \times \tan[\theta 0/2]$$

Therefore, the angle $\theta 0$ is given by:

$$\theta 0 = 2 \times \tan^{-1}[Ba/(2 \times B)]$$

In calculating the angle $\theta 0$, the above equation is used instead of the equation (21).

As compared to the four sensors, only the method of calculating the angle $\theta 0$ is different in the case of the three sensors. The other methods of adjusting a range finding module and performing range finding are the same.

At Step S17 shown in FIG. 30, the phase difference detected during range finding is calibrated by using the base phase difference d0 at the adjustment chart distance L0. The base phase difference d0 may be a phase difference at an arbitrary chart distance.

A small error caused by a displacement of the rotary angle $\Delta\theta y$ and a small error of a vertical pattern caused by a displacement of the rotary angle $\Delta\theta z$, may be corrected through calibration if necessary at Step S17 shown in FIG. 30, or may not be corrected by regarding them negligible.

In this embodiment, errors other than the cross-eye error are also corrected through calibration of the phase difference. These errors are often as small as negligible so that only the correction of the cross-eye error (Step S15 in FIG. 30) may be performed without the calibration of other phase difference errors (Step S17 in FIG. 30).

Next, the range finder according to the fourth embodiment of the invention will be described. The structure of the range finder module is the same as that of the second and third embodiments (FIGS. 2, 17). The sensor chip have four sensors $4L\alpha$, $4L\beta$, $4R\alpha$, and $4R\beta$.

In the fourth embodiment, the cross-eye error can be corrected in the following manner by using the four sensors $4L\alpha$, $4L\beta$, $4R\alpha$, and $4R\beta$.

Figure 32:
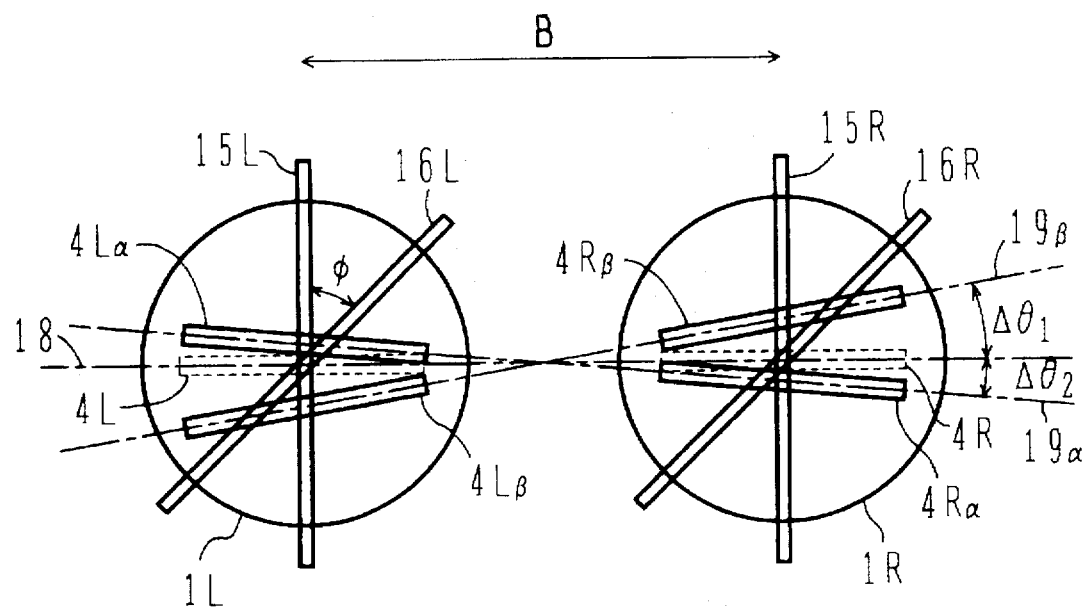
FIG. 32 is a schematic diagram showing an example of a sensor chip using four (two-pair) sensors 4Lα, 4Lβ, 4Rα, and 4Rβ according to a fourth embodiment.

FIG. 32 is a schematic diagram showing a disposal of four (two pairs) sensors $4L\alpha$, $4L\beta$, $4R\alpha$, and $4R\beta$.

The left sensors $4L\alpha$ and $4L\beta$ are positioned where an image of a subject is projected via the left lens 1L, whereas the right sensors $4R\alpha$ and $4R\beta$ are positioned where an image of a subject is projected via the right lens A line $19\alpha$ extends through the $\alpha$-pair sensors $4L\alpha$ and $4R\alpha$, and a line $19\beta$ extends through the $\beta$-pair sensors $4L\beta$ and $4R\beta$. A line 18 extends through the optical axes of the lens 1L and 1R. An angle between the lines $19\alpha$ and 18 is $\Delta\theta 2$ and has a negative value assuming that the counterclockwise direction is positive. An angle between the lines $19\beta$ and 18 is $\Delta\theta 1$ and has a positive value.

Vertical patterns 15L and 15R are subject patterns focussed on the sensors $4L\alpha$, $4L\beta$, $4R\alpha$, and $4R\beta$, and vertical to the line 18 extending through the lens pair 1L and 1R. Oblique patterns 16L and 16R are subject patterns focussed on the sensors $4L\alpha$, $4L\beta$, $4R\alpha$, and $4R\beta$, and oblique at a slant angle $\phi$ relative to the direction normal or vertical to the line 18 extending through the lens pair 1L and 1R.

In the third embodiment, the image distance d0 without the cross-eye error is calculated by the equation (19) by using the image distances (phase differences) d1 and d2. In this fourth embodiment, without correcting the image distances d1 and d2, the sensor data of the sensors $4L\alpha$, $4L\beta$, $4R\alpha$, and $4R\beta$ is directly corrected.

Referring to FIG. 32, a sensor 4L is a virtual sensor disposed along a straight line 18 extending through the lens pair on the left lens side. A sensor 4R is a virtual sensor disposed along the straight line 18 extending through the lens pair on the right lens side.

The straight line 18 extending through the right and left virtual sensors 4R and 4L has a displacement angle $\Delta\theta z$ of 0. It can be considered therefore that the two virtual sensors 4L and 4R are at ideal positions without any position alignment error. The distance between images focussed on the two virtual sensors 4L and 4R has no cross-eye error.

The following description is directed to a method of calculating sensor data of the two virtual sensors 4L and 4R, by using the real four sensors $4L\alpha$, $4R\alpha$, $4L\beta$, and $4R\beta$.

Figure 33:
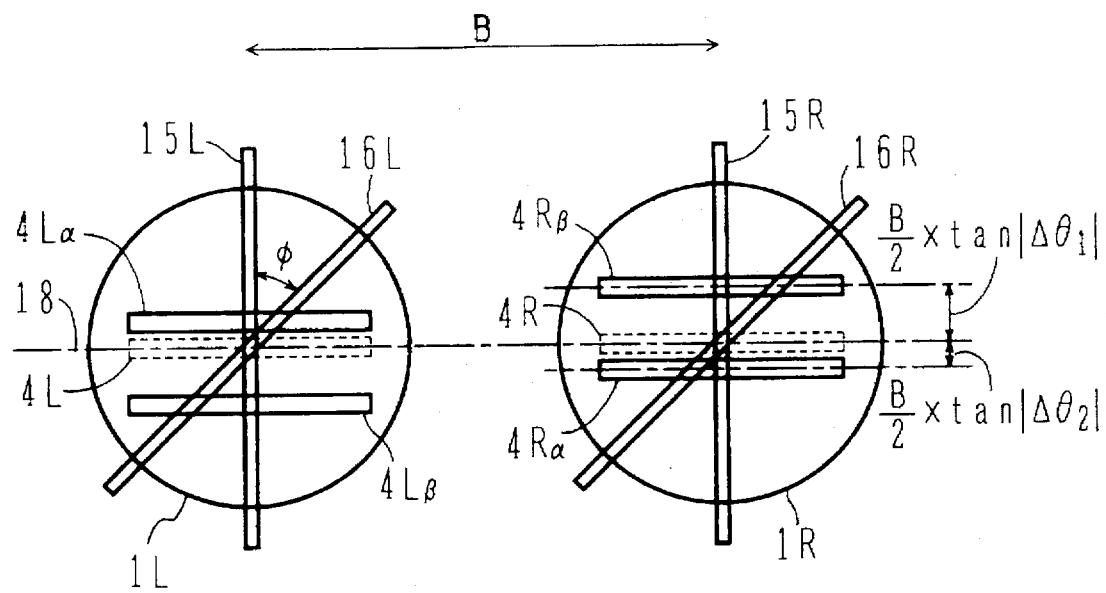
FIG. 33 is a schematic diagram showing an example of the structure of a sensor chip with four (two-pair) sensors disposed at a small angle θ0 like FIG. 32.

In FIG. 32, the sensors are disposed radially. If the angle $\theta 0$ is small, the sensors may be considered that they are disposed in parallel as shown in FIG. 33.

The virtual sensor 4L is positioned between the two real sensors $4L\alpha$ and $4L\beta$. A distance between the sensors $4L\beta$ and 4L is $(B/2) \times \tan|\Delta\theta 1|$ as illustrated in FIG. 33, and if $\Delta\theta 1$ is sufficiently small, the distance is $(B/2) \times |\Delta\theta 1|$. Similarly, a distance between the sensors $4L\alpha$ and 4L is $(B/2) \times |\Delta\theta 2|$. Therefore, each pixel data of the virtual sensor 4L can be obtained through interior division of respective pixel data of the real sensors $4L\alpha$ and $4L\beta$ by a ratio of $(B/2) \times |\Delta\theta 1|$: $(B/2) \times |\Delta\theta 2|$ or $|\Delta\theta 1|$: $|\Delta\theta 2|$.

The image data Si(L) of the virtual sensor 4L is therefore given by:

$$Si(L) = \{|\Delta\theta 1| \times Si(L\alpha) + |\Delta\theta 2| \times Si(L\beta)\} / \{|\Delta\theta 1| + |\Delta\theta 2|\}$$

By substituting $|\Delta\theta 1| = \Delta\theta 1$, $|\Delta\theta 2| = -\Delta\theta 2$, and $|\Delta\theta 1| + |\Delta\theta 2| = \Delta\theta 1 - \Delta\theta 2 = \theta 0$ into the above equation, the following equation Is obtained.

$$Si(L) = \{\Delta\theta 1 \times Si(L\alpha) - \Delta\theta 2 \times Si(L\beta)\} / \theta 0$$

Substitution of $\Delta\theta 2 = \Delta\theta 1 - \theta 0$ into the above equation yields:

$$Si(L) = \{\Delta\theta 1 \times Si(L\alpha) - (\Delta\theta 1 - \theta 0) \times Si(L\beta)\} / \theta 0 \quad (24L)$$

Similarly, the image data Si(R) of the virtual sensor 4R is given by:

$$Si(R) = \{\Delta\theta 1 \times Si(R\alpha) - (\Delta\theta 1 - \theta 0) \times Si(R\beta)\} / \theta 0 \quad (24R)$$

The sensor data Si(L) and Si(R) are calculated for each pixel. Each pixel data Si(L) is calculated from two corresponding pixel data Si(L$\alpha$) and Si(L$\beta$). Similarly, each pixel data Si(R) is calculated from two corresponding pixel data Si(R$\alpha$) and Si(R$\beta$).

After the pixel data Si(L) and Si(R) of the virtual sensors are calculated by the equations (24L) and (24R), the phase difference is calculated by using the pixel data Si(L) and Si(R) to obtain a true phase difference (image distance) d0 without the cross-eye error. The subject distance L is calculated by using the corrected phase difference d0.

The linear interpolation (weighted average) of the sensor data may be performed by either interior or exterior interpolation. The interior interpolation has a smaller error than the exterior interpolation. The subject angle $\phi$ changes with each subject, and the smaller the angle $\phi$, the more precisely the image distance d0 can be obtained.

The angles $\theta 0$ and $\Delta\theta 1$ in the equations (24L) and (24R) are known values as described already. The angle $\theta 0$ can be calculated by the equation (21) at the time of designing a range finder module, if the sensor disposal shown in FIG. 25 is used. The angle $\Delta\theta 1$ can be calculated after the measurement basing upon the principle illustrated in the graph shown in FIG. 27.

The angle $\Delta\theta 1$ can be obtained in advance during the adjustment of the range finder module prior to actual range finding. Namely, during the adjustment of the range finder module, the four image distances d1(a), d2(a), d1(b), and d2(b) are measured, and by using these distances the angle $\Delta\theta 1$ is calculated by the equation (22).

During actual range finding, the virtual sensor data Si(L) and Si(R) are calculated by the equations (24L) and (24R) by using the previously calculated angle $\Delta\theta 1$. Thereafter, the image distance d0 between the sensor data Si(L) and Si(R) is detected to obtain the image distance without the cross-eye error. The subject distance L is calculated from the obtained image distance.

During the adjustment of the range finder module prior to the actual range finding, in addition to the measurement of the angle $\Delta\theta 1$, the image distance d0 at the base chart distance is obtained. The base image distance d0 becomes necessary when errors other than the cross-eye error are calibrated during the actual range finding.

The image distance d0 can be calculated by the equations (24L) and (24R) or calculated by using the equation (23). As shown in the graph of FIG. 27, the image distance d0 without the cross-eye error is at the cross point between the lines 22a and 22b. The image distance d0 can be given by using the two formulae of the lines 22a and 22b by the following equation.

$$d0=\{d1(a)\times d2(b)-d1(b)\times d2(a)\}/[\{d1(a)-d2(a)\}-\{d1(b)-d2(b)\}]$$

The base image distance d0 is calculated by this equation during the adjustment of the range finder module, and is used for calibrating the phase difference during the actual range finding.

Next, a method of adjusting the range finder module of the fourth embodiment will be described with reference to FIG. 11. The adjustment of the range finder module is performed after the module is assembled and before it is shipped.

During the adjustment of the range finder module, the angle $\Delta\theta 1$ in the equation (22) and the base image distance d0 in the equation (23) are measured. The correction coefficient $\gamma$ is not required to be measured.

The camera control microcomputer 32 can perform various control operations, and stores constants measured beforehand such as a base length B and an adjustment chart distance L0.

First, the camera control microprocessor 32 supplies the motor rotation control signal CTL to the chart rotating motor 35 via the range finder module adjusting apparatus Upon reception of the motor rotation control signal CTL, the chart rotating motor 35 rotates and stops at the angle $\phi b$ of the chart 36, for example, at the angle of $-60°$.

The range finder module 10 takes the image of the chart 36 at the angle $\phi b=-60°$, and supplies sensor data Si of the range finding sensors 4L$\alpha$, 4R$\alpha$, 4L$\beta$, and 4R$\beta$ to the camera control microcomputer 32. The camera control microcomputer 32 performs a correlation calculation by using the sensor data Si, and supplies the phase difference data d1(b) between the $\beta$ pair of sensors 4L$\beta$ and 4R$\beta$ and the phase difference data d2(b) between the $\alpha$-pair sensors 4L$\alpha$ and 4R$\alpha$ to the range finder module adjusting apparatus 34. The range finder module adjusting apparatus 34 loads the supplied phase difference data d1(b) and d2(b) for the preparation of a later calculation of the angle $\Delta\theta 1$ and image distance d0.

Next, the camera control microcomputer 32 instructs the range finder module adjusting apparatus 34 and chart rotating motor 35 to set the angle $\phi a$ of the chart 36, for example, to 60°. The range finder module 10 takes the image of the chart 36 at the angle $\phi a=60°$, and supplies sensor data Si of the range finding sensors 4L$\alpha$, 4R$\alpha$, 4L$\beta$, and 4R$\beta$ to the camera control microcomputer 32. The camera control microcomputer 32 performs a correlation calculation by using the sensor data Si to calculate the phase difference data d1(a) between the $\beta$-pair sensors 4L$\beta$ and 4R$\beta$ and the phase difference data d2(a) between the $\alpha$-pair sensors 4L$\alpha$ and 4R$\alpha$, and supplies them to the range finder module adjusting apparatus 34.

Thereafter, the range finder module adjusting apparatus 34 calculates the angle $\Delta\theta 1$ by the equation (22) by using the four phase difference data d1(a), d2(a), d1(b), and d1(b), and calculates the image distance d0 by the equation (23). The calculated angle $\Delta\theta 1$ and image distance d0 are loaded in the adjustment register 33. The correction coefficient $\gamma$ is not necessary to be loaded.

In the above manner, by calculating the four phase differences, the angle $\Delta\theta 1$ and image distance d0 can be loaded in the adjustment register 33. After the adjustment of the range finder module, the angle $\Delta\theta 1$ and image distance d0 are used for actual range finding.

Next, the control during range finding will be described. For range finding, the chart 36, chart rotating motor 35, and range finder module adjusting apparatus 34 are not needed, but only the camera with the range finder module 10 is used. The camera is directed toward a subject to measured the subject distance. The range finder module 10 focusses the image of the subject, and supplies sensor data Si(L$\alpha$), Si(L$\beta$), Si(R$\alpha$), and Si(R$\beta$) of the four sensors 4L$\alpha$, 4L$\beta$, 4R$\alpha$ and 4R$\beta$ to the camera control microcomputer 32.

The camera control microcomputer 32 calculates the sensor data Si(L) and Si(R) by the equations (24L) and (24R) by using the sensor data Si(L$\alpha$), Si(L$\beta$), Si(R$\alpha$), and Si(R$\beta$). The phase difference without the cross-eye error is detected as a phase difference between the sensor data Si(L) and Si(R).

The detected phase difference is calibrated by using the base phase difference d0 stored in the adjustment register 33 and the chart distance L0 stored in the camera control microcomputer 32, and converted into a subject distance L. The phase difference is calibrated so as to correct the phase difference errors generated during the assembly of the range finder module excluding the rotary angle $\theta z$ error.

The subject distance data L is supplied to the lens drive motor controller 31. In accordance with this subject distance data L, the controller 31 drives the motor (not shown) to adjust the focus of the camera lens.

Figure 34:
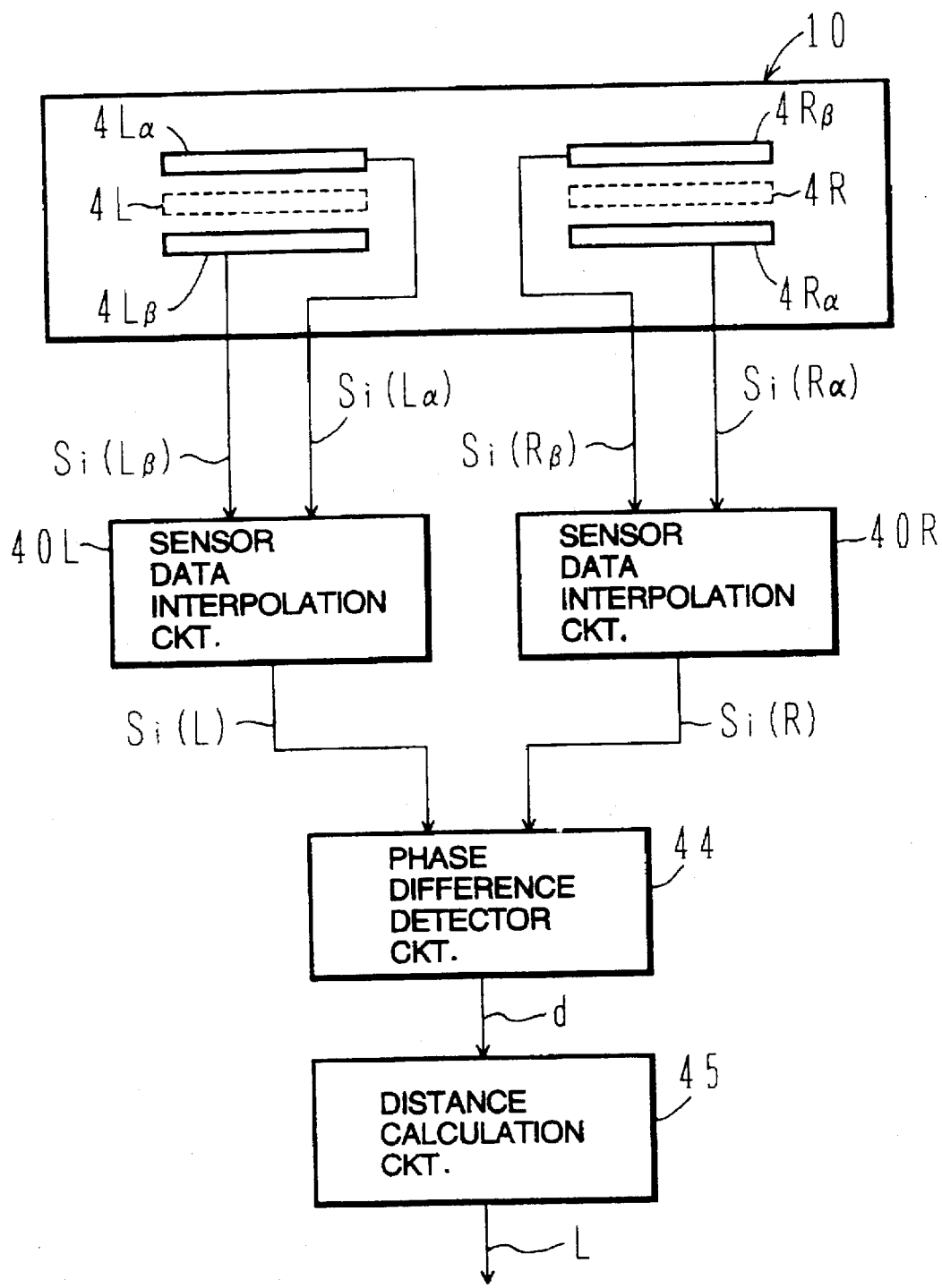
FIG. 34 is a block diagram illustrating the range finding operation by the range finder of the fourth embodiment.

The details of range finding will be described. FIG. 34 is a block diagram illustrating the processes to be performed by the camera control microcomputer 32 shown in FIG. 11.

The range finder module 10 has two pairs of sensors 4Lα and 4Rα, and 4Lβ and 4Rβ. A sensor data interpolation circuit 40L calculates the sensor data SI(L) of an image focussed on the virtual sensor 4L by the equation (24L) by using the sensor data Si(Lα) and Si(Lβ) of images focussed on the left sensors 4Lα and 4Lβ.

A sensor data interpolation circuit 40R calculates the sensor data Si(R) of an image focussed on the virtual sensor 4R by the equation (24R) by using the sensor data Si(Rα) and Si(Rβ) of images focussed on the right sensors 4Rα and 4Rβ.

A phase difference correction circuit 44 calculates the phase difference d through a correlation calculation between the sensor data Si(L) and SI(R) of images focussed on the left and right virtual sensors 4L and 4R. This phase difference d has no cross-eye error. The phase difference d is supplied to a distance calculation circuit 45.

The distance calculation circuit 45 calibrates the phase difference d relative to the errors other than the cross-eye error, and converts the calibrated phase difference into the subject distance data L, and outputs it. Thereafter, in accordance with the subject distance data L, the focus of the camera lens is adjusted.

Figure 35:
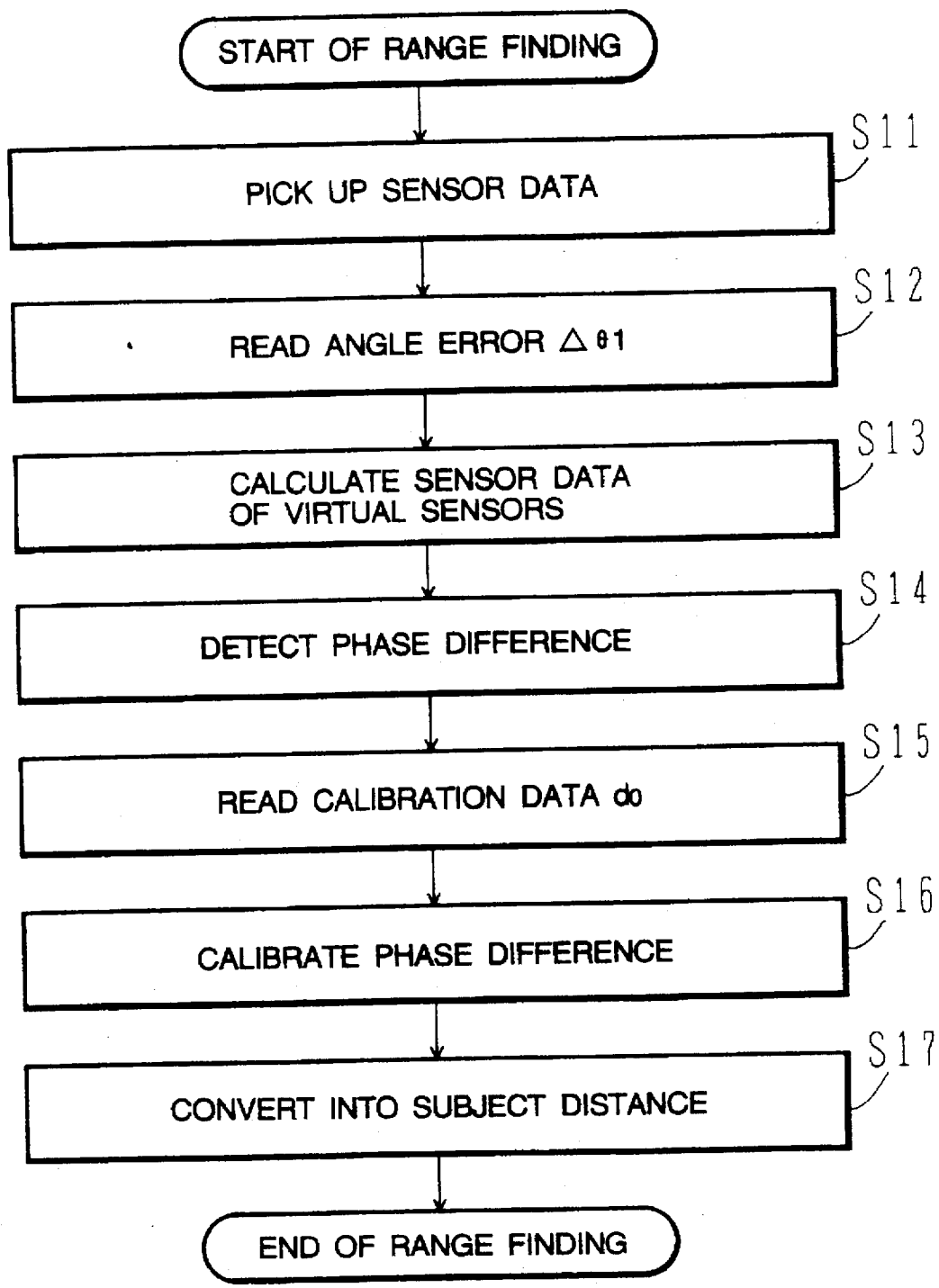
FIG. 35 is a flow chart illustrating the processes of range finding by the range finder of the fourth embodiment.
Figure 36A:
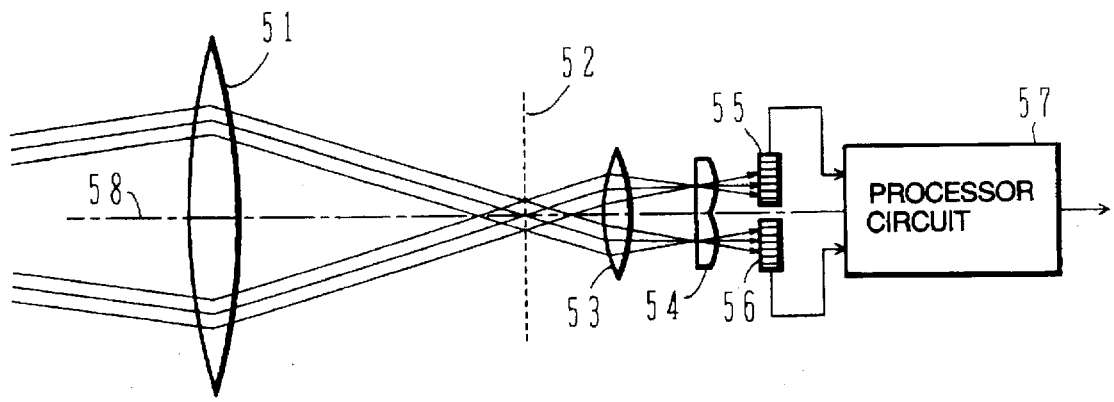
FIG. 36A is a schematic diagram showing an example of the structure of a conventional range finder.
Figure 36B:
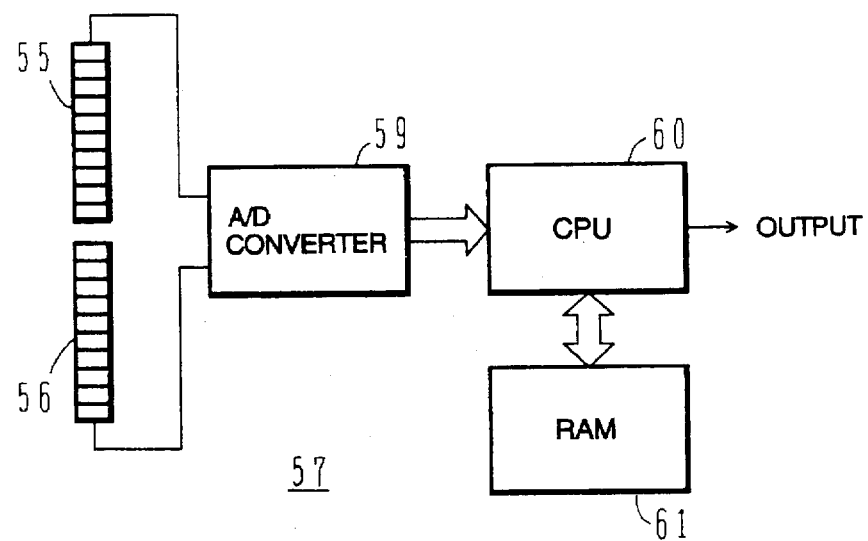
FIG. 36B is a circuit diagram of a processor circuit.
Figure 37A:
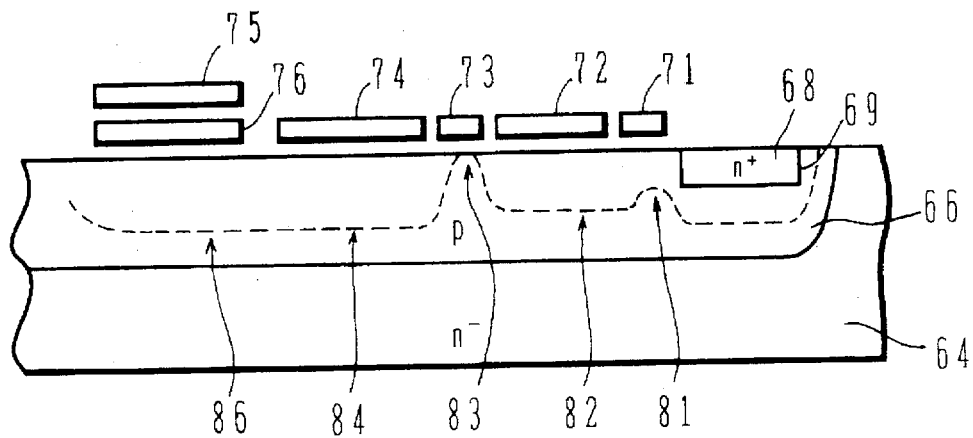
FIG. 37A is a schematic cross sectional view of a photosensor.
Figure 37B:
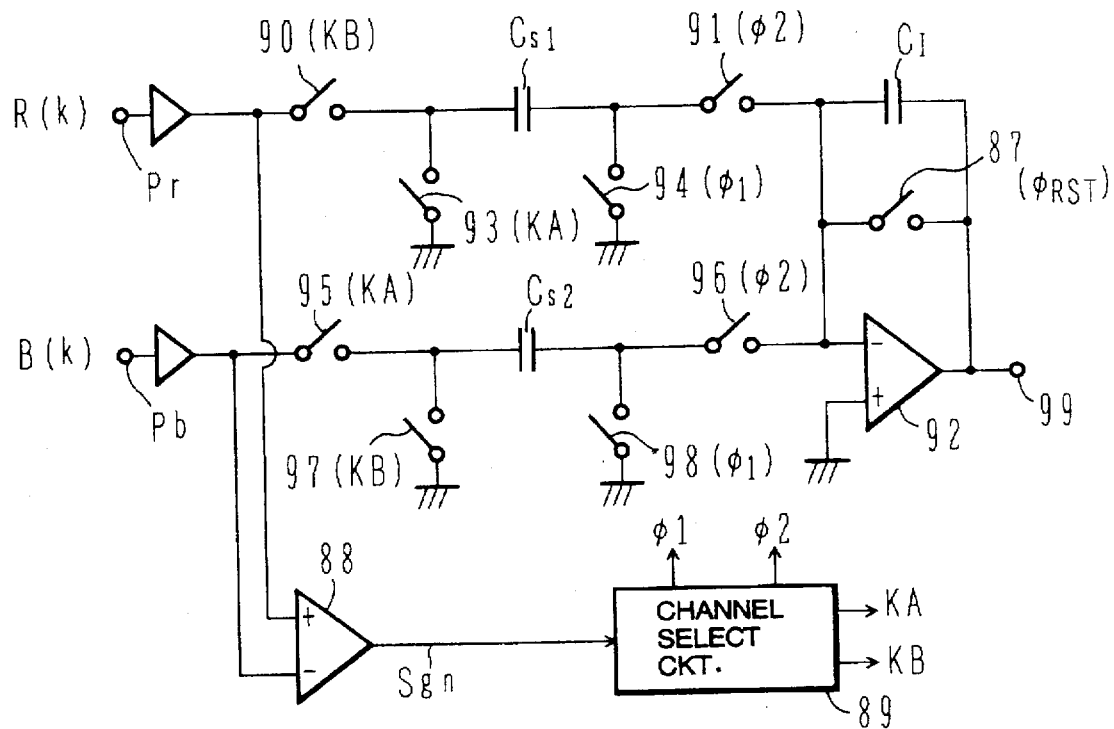
FIG. 37B is a circuit diagram of a switched capacitor integrator circuit.
Figure 38A:
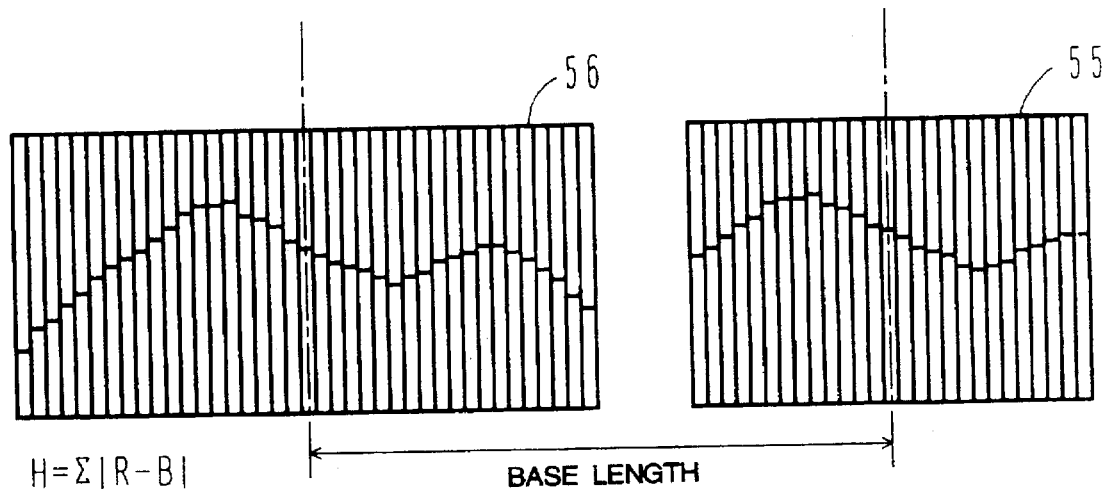
FIG. 38A is a graph showing image signals obtained from base and reference line sensors for phase difference detection by correlation calculation.
Figure 38B:
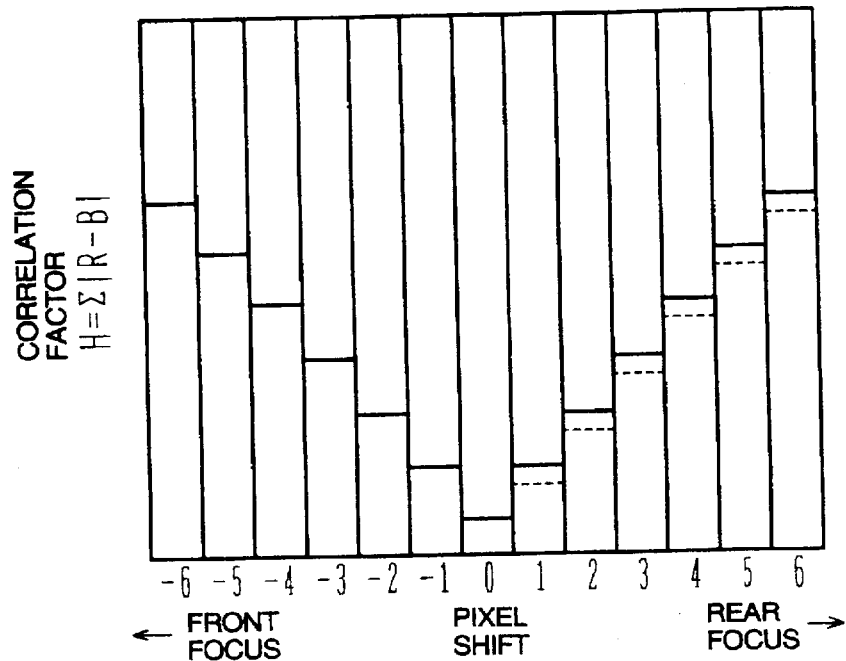
FIG. 38B is a graph showing a correlation curve.
Figure 38C:
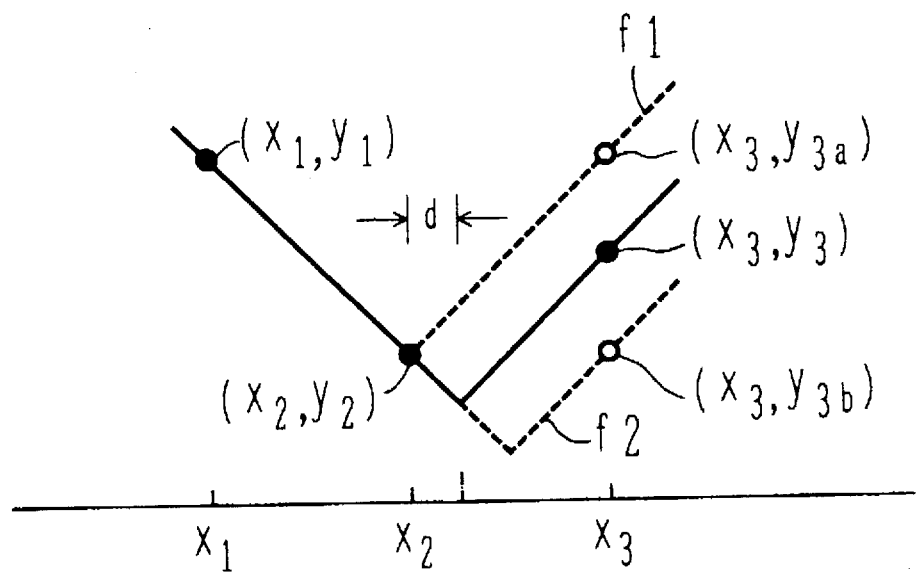
FIG. 38C is a schematic diagram illustrating three-point interpolation.

FIG. 35 is a flow chart illustrating the processes of range finding by the range finder.

At Step S11, sensor data Si(Lα), Si(Lβ), Si(Rα), and Si(Rβ) are picked up from the four sensors 4Lα, 4Rα, 4Lβ, and 4Rβ to detect images focussed on the sensors.

At Step S12, the angle error $\Delta\theta1$ is read from the adjustment register 33 (FIG. 11). The angle error $\Delta\theta1$ was written in the adjustment register 33 during the adjustment of the range finder module.

At Step S13, the sensor data Si(R) and Si(L) of the right and left virtual sensors are calculated. The left sensor data Si(L) is calculated by the equation (24L) as:

$$Si(L) = \{\Delta\theta1 \times Si(L\alpha) - (\Delta\theta1 - \theta0) \times Si(L\beta)\}/\theta0$$

The right sensor data Si(R) is calculated by the equation (24R) as:

$$Si(R) = \{\Delta\theta1 \times Si(R\alpha) - (\Delta\theta1 - \theta0) \times Si(R\beta)\}/\theta0$$

The angle $\theta0$ is an angle between the line extending through the α-pair sensors 4Lα and 4Rα and the line extending through the β-pair sensors 4Lβ and 4Rβ in FIG. 25, is determined at the time of designing the range finder module, and stored in the camera control microcomputer 32 (FIG. 11). The angle $\theta0$ is calculated by the equation (21) by using the base lengths B and Ba.

$$\theta0 = 2 \times \tan^{-1}[Ba/B]$$

At Step S14, the phase difference d is detected. The phase difference d is calculated by a correlation calculation of the equation (1) between sensor data Si(L) and Si(R) calculated at Step S14 and by an interpolation calculation of the equation (2) using the correlation calculation results.

At Step S15, the calibration data d0 is read from the adjustment register 33 (FIG. 11). The correlation data d0 was written in the adjustment register 33 during the adjustment of the range finder module.

At Step S16, the phase difference d is calibrated in accordance with the calibration data d0 and chart distance L0. The calibration data d0 was read at Step S15, and is a base phase difference (not containing the error δ) measured during the adjustment at the chart distance L0. The chart distance L0 is stored in advance in the camera control microcomputer 32 (FIG. 11).

The calibration data d0 is a phase difference measured during the adjustment at the chart distance L0. A theoretical phase difference dt at the chart distance L0 is given by the equation (3):

$$dt = (B \times f)/L0$$

An off-set value doff of the phase difference is a difference between the theoretical phase difference dt and the measured value d0:

$$doff = dt - d0$$

The phase difference doff is mainly generated by a difference of the characteristics of each optical system of a range finder module. Therefore, the same phase difference offset doff is always generated in each of range finder module having the same characteristics.

Calibration for the phase difference dx is performed by adding the off-set value doff:

$$d' = dx + doff$$

At Step S17, a subject distance L is calculated by using the calibrated phase distance d'. The conversion of the calibrated phase difference d' into the subject distance data L at Step S17 is performed by using the equation (3):

$$L = (B \times f)/d'$$

The base length B and lens/sensor distance f are stored in advance in the camera control microcomputer 32 (FIG. 11).

With the above processes, the distance data L is obtained and the range finding operation is terminated.

In the fourth embodiment, the phase difference is detected both at the time of adjusting the range finder module and at the time of actual range finding. The phase difference is detected in the above embodiment by the correlation calculation. Other methods such as described with FIG. 15 may be used for detecting a phase difference.

In the fourth embodiment, in obtaining the subject distance L, the four sensors 4Lα, 4Rα, 4Lβ, and 4Rβ are used. Sensor data of the four sensors is read and sensor data of the virtual sensors 4L and 4R is calculated to thereafter detect the phase difference between the virtual sensor data 4L and 4R. Accordingly, the phase difference without the cross-eye error generated by the subject angle φ is obtained so that a correct subject distance L can be measured.

With the range finder of the fourth embodiment, the subject distance L can be measured at a high precision even if there is a displacement of the rotary angle $\Delta\theta z$, without the assembly position alignment of the range finder module at a high precision. Since the assembly position alignment is not always necessary to be performed at a high precision, the assembly cost can be reduced.

In the fourth embodiment, the four sensors 4Lα, 4Rα, 4Lβ, and 4Rβ are used. This embodiment is applicable to three sensors as shown in FIG. 31.

With the three sensors, a method of calculating the rotary angle $\theta0$ different from the previous method (refer to FIG. 25) is used. In the following, the rotary angle calculation method will be described.

In FIG. 31A, the angle $\theta0$ is an angle between the lines 23α and 23β. A vertical distance Ba between the sensors 4Lα and 4Lβ is given by:

$$Ba = B \times \tan\theta0$$

Therefore, the angle $\theta0$ is given by:

$$\theta 0 = \tan^{-1}[Ba/B]$$

In calculating the angle θ0, the above equation is used instead of the equation (21).

In FIG. 31B, the angle θ0 is an angle between the lines 24α and 24β. A vertical distance Ba between the sensors 4Lα and 4Lβ is given by:

$$Ba = 2 \times B \times \tan[\theta 0/2]$$

Therefore, the angle θ0 is given by:

$$\theta 0 = 2 \times \tan^{-1}[Ba/(2 \times B)]$$

In calculating the angle θ0, the above equation is used instead of the equation (21).

In calculating the sensor data of the virtual sensors 4L and 4R, the left sensor data Si(L) is calculated by the equation (24L) by using the sensor data of the sensors 4Lα and 4Lβ. The right sensor data Si(R) is the sensor data itself of the sensor 4R.

After the virtual sensor data Si(L) and Si(R) are obtained, the phase difference is detected to measure the subject distance L in the manner described already.

At Step S16 shown in FIG. 35, the phase difference detected during range finding is calibrated by using the base phase difference d0 at the adjustment chart distance L0. The base phase difference d0 may be a phase difference at an arbitrary chart distance.

A small error caused by a displacement of the rotary angle Δθy and a small error of a vertical pattern caused by a displacement of the rotary angle Δθz, may be corrected through calibration if necessary at Step S16 shown in FIG. 35, or may not be corrected by regarding them negligible.

In this embodiment, errors other than the cross-eye error are also corrected through calibration of the phase difference. These errors are often as small as negligible so that only the correction of the cross-eye error may be performed without the calibration of other phase difference error (Step S16 in FIG. 35).

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A range finder comprising:

first and second lenses for focussing an image of a subject via spatially different optical paths;

first and second photosensor arrays disposed generally parallel and each having a plurality of pixels, an image being focussed on said first and second photosensor arrays by said first lens;

a third photosensor array having a plurality of pixels, an image being focussed on said third photosensor array by said second lens, and a line extending through pixels of said first photosensor array and pixels of said third photosensor array having a slant from a line extending through the optical axes of said first and second lenses;

phase difference detecting means for detecting a phase difference between images focussed by said first and second lenses and correcting an error to be caused by said slant in accordance with images focussed on said first to third photosensor arrays; and distance calculating means for calculating distance data to the subject in accordance with the phase difference detected by said phase difference detecting means.

2. A range finder according to claim 1, further comprising a fourth photosensor array disposed generally parallel to said third photosensor array and having a plurality of pixels, an image being focussed on said fourth photosensor array by said second lens, wherein said phase difference detecting means detects the phase difference in accordance with images focussed on said first to fourth photosensor arrays.

3. A range finder according to claim 1, wherein said phase difference detecting means comprises:

means for detecting a first phase difference between images focussed on said first and third photosensor arrays and a second phase difference between images focussed on said first and second photosensor arrays; and means for detecting a phase difference between images focussed by said first and second lenses and correcting an error to be caused by said slant in accordance with said first and second phase differences.

4. A range finder according to claim 1, wherein said phase difference detecting means comprises:

means for detecting a first phase difference between images focussed on said first and third photosensor arrays and a second phase difference between images focussed on said second and third photosensor arrays; and means for detecting a phase difference between images focussed by said first and second lenses and correcting an error to be caused by said slant in accordance with said first and second phase differences.

5. A range finder according to claim 1, wherein said phase difference detecting means comprises:

means for calculating an image to be focussed on a virtual photosensor array in accordance with images focussed on said first and second photosensor arrays, said virtual photosensor array being disposed along a line extending through the optical axes of said first and second lenses on the side of said first lens; and means for detecting a phase difference between images focussed on said virtual photosensor array and said third photosensor array.

6. A range finder according to claim 2, wherein said phase difference detecting means comprises:

means for detecting a first phase difference between images focussed on said first and fourth photosensor arrays and a second phase difference between images focussed on said second and third photosensor arrays; and means for detecting a phase difference between images focussed by said first and second lenses and correcting an error to be caused by said slant in accordance with said first and second phase differences.

7. A range finder according to claim 2, wherein said phase difference detecting means comprises:

means for calculating an image to be focussed on a first virtual photosensor array in accordance with images focussed on said first and second photosensor arrays, said first virtual photosensor array being disposed along a line extending through the optical axes of said first and second lenses on the side of said first lens, and for calculating an image to be focussed on a second virtual photosensor array in accordance with images focussed on said third and fourth photosensor arrays, said second virtual photosensor array being disposed along a line extending through the optical axes of said first and second lenses on the side of said second lens; and means for detecting a phase difference between images focussed on said first and second virtual photosensor arrays.

8. A range finding method for a range finder having: first and second lenses for focussing an image of a subject via spatially different optical paths; first and second photosensor arrays disposed generally parallel and each having a plurality of pixels, an image being focussed on said first and second photosensor arrays by said first lens; and a third photosensor array having a plurality of pixels, an image being focussed on said third photosensor array by said second lens, and a line extending through pixels of said first photosensor array and pixels of said third photosensor array having a slant from a line extending through the optical axes of said first and second lenses, the range finding method comprising the steps of:

detecting a phase difference between images focussed by said first and second lenses and correcting an error to be caused by said slant in accordance with images focussed on said first to third photosensor arrays; and calculating distance data to the subject in accordance with the phase difference detected by said phase difference detecting means.

9. A range finder comprising:

first and second lenses for focussing an image of a subject via spatially different optical paths;

first and second photosensor arrays each having a plurality of pixels, an image being focussed on said first and second photosensor arrays by said first and second lenses;

an auxiliary photosensor array having a plurality of pixels, an image being focussed on said auxiliary photosensor array by said first lens, and said auxiliary photosensor array being disposed generally parallel to, and vertically spaced from, said first photosensor array;

phase difference detecting means for detecting a first phase difference between images focussed on said first and second photosensor arrays and a second phase difference between images focussed on said first and auxiliary photosensor arrays; and distance calculating means for calculating distance data to the subject in accordance with the first and second phase differences detected by said phase difference detecting means.

10. A range finder according to claim 9, wherein said phase difference detecting means detects the first and second phase differences through correlation calculation.

11. A range finder according to claim 9, wherein said distance calculating means calculates the distance data by obtaining a phase difference error changing with the subject in accordance with the second phase difference and by correcting the first phase difference in accordance with the phase difference error.

12. A range finding method for a range finder having: first and second lenses for focussing an image of a subject via spatially different optical paths; first and second photosensor arrays each having a plurality of pixels, an image being focussed on said first and second photosensor arrays by said first and second lenses; an auxiliary photosensor array having a plurality of pixels, an image being focussed on said auxiliary photosensor array by said first lens, and said auxiliary photosensor array being disposed generally parallel to, and vertically spaced from, said first photosensor array, the range finding method comprising the steps of:

detecting a first phase difference between images focussed on said first and second photosensor arrays and a second phase difference between images focussed on said first and auxiliary photosensor arrays;

detecting a pattern angle of the subject in accordance with the second phase difference; and calculating distance data to the subject in accordance with the first phase difference and the pattern angle of the subject.

13. A range finding method according to claim 12, wherein said distance data calculating step calculates the distance data in accordance with an angle between a line extending through the first and second lenses and a line extending through the first and second photosensor arrays, the first phase difference, and the pattern angle of the subject.

14. An angle detecting method for a range finder having: first and second lenses for focussing an image of a subject via spatially different optical paths; and first and second photosensor arrays each having a plurality of pixels, an image being focussed on said first and second photosensor arrays by said first and second lenses, the angle detecting method comprising the steps of:

disposing a first subject pattern having a first pattern angle at the position spaced apart from the first and second lenses and detecting a first phase difference between images focussed by the first and second photosensor arrays;

disposing a second subject pattern having a second pattern angle different from the first pattern angle at the same position as the first subject pattern and detecting a second phase difference between images focussed by the first and second photosensor arrays; and detecting an angle between a line extending through the first and second lenses and a line extending through the first and second photosensor arrays.

15. An angle detecting apparatus for a range finder having: first and second lenses for focussing an image of a subject via spatially different optical paths; first and second photosensor arrays each having a plurality of pixels, an image being focussed on said first and second photosensor arrays by said first and second lenses; an auxiliary photosensor array having a plurality of pixels, and phase difference detecting means for detecting a phase difference between images focussed on the first and second photosensor arrays, the range finding apparatus comprising:

a subject pattern representative of a first subject pattern having a first pattern angle and disposed at the position spaced apart from the first and second lenses or a second subject pattern having a second pattern angle different from the first pattern angle and disposed at the same position as the first subject pattern; and means for detecting an angle between a line extending through the first and second lenses and a line extending through the first and second photosensor arrays, in accordance with phase differences regarding said first and second subject patterns detected by said phase difference detecting means.

16. A range finder comprising:

first and second lenses for focussing an image of a subject via spatially different optical paths;

first and second photosensor arrays each having a plurality of pixels for photoelectric conversion, an image being focussed by said first lens;

third and fourth photosensor arrays each having a plurality of pixels for photoelectric conversion, an image being focussed by said second lens;

phase difference detecting means for detecting a first phase difference between images focussed on said first and fourth photosensor arrays and a second phase difference between images focussed on said second and third photosensor arrays; and distance calculating means for calculating distance data to the subject in accordance with the first and second phase differences detected by said phase difference detecting means, wherein a line extending through said first and fourth photosensor arrays intersects with a line extending through said second and third photosensor arrays.

17. A range finder according to claim 16, wherein said third and fourth photosensor arrays share the same photosensor array.

18. A range finder according to claim 16, wherein said phase difference detecting means detects the first and second phase difference through correlation calculation.

19. A range finder according to claim 16, wherein said distance calculating means calculates the distance data by obtaining a phase difference error changing with the subject in accordance with the first and second phase differences and by correcting at least one of the first and second phase differences in accordance with the phase difference error.

20. A range finding method for a range finder having: first and second lenses for focussing an image of a subject via spatially different optical paths; first and second photosensor arrays each having a plurality of pixels for photoelectric conversion, an image being focussed by said first lens; and third and fourth photosensor arrays each having a plurality of pixels for photoelectric conversion, an image being focussed by said second lens, wherein a line extending through said first and fourth photosensor arrays intersects with a line extending through said second and third photosensor arrays, the range finding method comprising the steps of:

detecting a first phase difference between a first detection signal outputted from said first photosensor array and a fourth detection signal outputted from said fourth photosensor array and a second phase difference between a second detection signal outputted from said second photosensor array and a third detection signal outputted from said third photosensor array;

detecting a pattern angle of the subject in accordance with the first and second phase differences; and calculating distance data to the subject in accordance with the pattern angle of the subject.

21. A range finding method according to claim 20, wherein said third and fourth photosensor arrays share the same photosensor array, and said third and fourth detection signals share the same detection signal.

22. A range finding method according to claim 20, wherein said distance calculating step calculates the distance data in accordance with an angle between a line extending through the first and second lenses and a line extending through the first and third photosensor arrays, and the pattern angle of the subject.

23. A range finder comprising:

first and second lenses for focussing an image of a subject via spatially different optical paths;

first and second photosensor arrays each having a plurality of pixels for photoelectric conversion, an image being focussed by said first lens;

third and fourth photosensor arrays each having a plurality of pixels for photoelectric conversion, an image being focussed by said second lens;

phase difference detecting means for detecting a first phase difference between images focussed on said second and third photosensor arrays and a second phase difference between images focussed on said first and fourth photosensor arrays;

phase difference correcting means for calculating a phase difference with an error corrected, by interpolating said first and second phase differences detected by said phase difference detecting means; and distance calculating means for calculating distance data to the subject in accordance with the phase difference calculated by said phase difference correcting means, wherein a line extending through said first and fourth photosensor arrays intersects with a line extending through said second and third photosensor arrays.

24. A range finder according to claim 23, wherein said third and fourth photosensor arrays share the same photosensor array.

25. A range finder according to claim 23, wherein said phase difference correcting means interpolates in accordance with an angle between a line extending through said first and second lenses and a line extending through said second and third photosensor arrays and an angle between the line extending through said first and second lenses and a line extending through said first and fourth photosensor arrays.

26. A range finder according to claim 23, wherein said phase difference detecting means detects the first and second phase differences through correlation calculation.

27. A range finding method for a range finder having: first and second lenses for focussing an image of a subject via spatially different optical paths; first and second photosensor arrays each having a plurality of pixels for photoelectric conversion, an image being focussed by said first lens; and third and fourth photosensor arrays each having a plurality of pixels for photoelectric conversion, an image being focussed by said second lens, wherein a line extending through said first and fourth photosensor arrays intersects with a line extending through said second and third photosensor arrays, the range finding method comprising the steps of:

detecting a first phase difference between a second detection signal outputted from said second photosensor array and a third detection signal outputted from said third photosensor array and a second phase difference between a first detection signal outputted from said first photosensor array and a fourth detection signal outputted from said fourth photosensor array;

calculating a phase difference with an error corrected by interpolating the first and second phase differences; and calculating distance data to the subject in accordance with the corrected phase difference.

28. A range finding method according to claim 27, wherein said third and fourth photosensor arrays share the same photosensor array, and said third and fourth detection signals share the same detection signal.

29. A range finding method according to claim 27, wherein said step of correcting the phase difference interpolates in accordance with an angle between a line extending through said first and second lenses and a line extending through said second and third photosensor arrays and an angle between the line extending through said first and second lenses and a line extending through said first and fourth photosensor arrays.

30. A range finding method according to claim 27, wherein said step of detecting the phase difference detects the first and second phase differences through correlation calculation.

31. An angle detecting method for a range finder having: first and second lenses for focussing an image of a subject via spatially different optical paths; first and second photosensor arrays each having a plurality of pixels for photoelectric conversion, an image being focussed by said first lens; and third and fourth photosensor arrays each having a plurality of pixels for photoelectric conversion, an image being focussed by focussed said second lens, wherein a line extending through said first and fourth photosensor arrays intersects with a line extending through said second and third photosensor arrays, the angle detecting method comprising the steps of:

disposing a first subject pattern having a first pattern angle at the position spaced apart from the first and second lenses, and detecting a first phase difference between detection signals outputted from said second and third photosensor arrays and a second phase difference between detection signals outputted from said first and fourth photosensor arrays;

disposing a second subject pattern having a second pattern angle different from the first pattern angle at the same position as the first subject pattern, and detecting a third phase difference between detection signals outputted from said second and third photosensor arrays and a fourth phase difference between detection signals outputted from said first and fourth photosensor arrays; and detecting an angle between a line extending through said first and second lenses and a line extending through said second and third photosensor arrays, in accordance with said first to fourth phase differences.

32. An angle detecting method for a range finder according to claim 31, wherein said third and fourth photosensor arrays share the same photosensor array.

33. An angle detecting apparatus for a range finder having: first and second lenses for focussing an image of a subject via spatially different optical paths; first and second photosensor arrays each having a plurality of pixels for photoelectric conversion, an image being focussed by said first lens; third and fourth photosensor arrays each having a plurality of pixels for photoelectric conversion, an image being focussed by said second lens, a line extending through said first and fourth photosensor arrays intersecting with a line extending through said second and third photosensor arrays, and phase difference detecting means for detecting a first phase difference between images focussed on said second and third photosensor arrays and a second phase difference between imaged focussed on said first and fourth photosensor arrays, the angle detecting apparatus comprising:

a subject pattern representative of a first subject pattern having a first pattern angle disposed at the position spaced apart from the first and second lenses or a second subject pattern having a second pattern angle different from the first pattern angle disposed at the same position as the first subject pattern; and means for detecting an angle between a line extending through said first and second lenses and a line extending through said second and third photosensor arrays, in accordance with the first and second phase differences regarding said first and second subject patterns detected by said phase difference detecting means.

34. An angle detecting apparatus for a range finder according to claim 33, wherein said third and fourth photosensor arrays share the same photosensor array.

35. A range finder comprising:

first and second lenses for focussing an image of a subject via spatially different optical paths;

first and second photosensor arrays each having a plurality of pixels for photoelectric conversion, an image being focussed by said first lens;

third and fourth photosensor arrays each having a plurality of pixels for photoelectric conversion, an image being focussed by said second lens;

virtual photosensor array image calculating means for calculating an image to be focussed on a first virtual photosensor array in accordance with images focussed on said first and second photosensor arrays, said first virtual photosensor array being disposed along a line extending through the optical axes of said first and second lenses on the side of said first lens, and for calculating an image to be focussed on a second virtual photosensor array in accordance with images focussed on said third and fourth photosensor arrays, said second virtual photosensor array being disposed along a line extending through the optical axes of said first and second lenses on the side of said second lens;

means for detecting a phase difference between images focussed on said first and second virtual photosensor arrays; and means for calculating distance data to the subject in accordance with the phase difference detected by said phase difference detecting means, wherein a line extending through said first and fourth photosensor arrays intersects with a line extending through said second and third photosensor arrays.

36. A range finder according to claim 35, wherein said third and fourth photosensor arrays share the same photosensor array.

37. A range finder according to claim 35, wherein said virtual photosensor array image calculating means calculates the image in accordance with an angle between a line extending through said first and second lenses and a line extending through said second and third photosensor arrays and an angle between the line extending through said first and second lenses and a line extending through said first and fourth photosensor arrays.

38. A range finder according to claim 35, wherein said phase difference detecting means detects the first and second phase differences through correlation calculation.

39. A range finding method for a range finder having: first and second lenses for focussing an image of a subject via spatially different optical paths; first and second photosensor arrays each having a plurality of pixels for photoelectric conversion, an image being focussed by said first lens; third and fourth photosensor arrays each having a plurality of pixels for photoelectric conversion, wherein a line extending through said first and fourth photosensor arrays intersects with a line extending through said second and third photosensor arrays, the range finding method comprising the steps of:

calculating an image to be focussed on a first virtual photosensor array in accordance with images focussed on said first and second photosensor arrays, said first virtual photosensor array being disposed along a line extending through the optical axes of said first and second lenses on the side of said first lens, and for calculating an image to be focussed on a second virtual photosensor array in accordance with images focussed on said third and fourth photosensor arrays, said second virtual photosensor array being disposed along a line extending through the optical axes of said first and second lenses on the side of said second lens;

detecting a phase difference between images focussed on said first and second virtual photosensor arrays; and calculating distance data to the subject in accordance with the phase difference detected by said phase difference detecting means.

40. A range finding method according to claim 39, wherein said third and fourth photosensor arrays share the same photosensor array.

41. A range finding method according to claim 39, wherein said step of calculating the virtual photosensor array image calculates the image in accordance with an angle between a line extending through said first and second lenses and a line extending through said second and third photosensor arrays and an angle between the line extending through said first and second lenses and a line extending through said first and fourth photosensor arrays.

42. A range finding method according to claim 39, wherein said step of detecting the phase difference detects the phase difference through correlation calculation.

* * * * *